(12) United States Patent
Sato et al.

(10) Patent No.: US 10,934,445 B2
(45) Date of Patent: Mar. 2, 2021

(54) INK JET INK COMPOSITION AND IMAGE FORMING METHOD

(71) Applicant: FUJIFILM CORPORATION, Tokyo (JP)

(72) Inventors: Noriaki Sato, Kanagawa (JP); Ichiro Koyama, Kanagawa (JP); Shota Suzuki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 79 days.

(21) Appl. No.: 16/270,555

(22) Filed: Feb. 7, 2019

(65) Prior Publication Data

US 2019/0169453 A1    Jun. 6, 2019

Related U.S. Application Data

(63) Continuation of application No. PCT/JP2017/025986, filed on Jul. 18, 2017.

(30) Foreign Application Priority Data

Aug. 31, 2016 (JP) ................. 2016-169840
Dec. 27, 2016 (JP) ................. 2016-252732

(51) Int. Cl.
| | | |
|---|---|---|
| *C09D 11/38* | (2014.01) | |
| *C08G 18/32* | (2006.01) | |
| *C08G 18/38* | (2006.01) | |
| *C09D 11/023* | (2014.01) | |
| *C08G 18/75* | (2006.01) | |
| *C09D 11/101* | (2014.01) | |
| *C08G 18/67* | (2006.01) | |
| *C08G 18/76* | (2006.01) | |
| *C08G 18/08* | (2006.01) | |

(Continued)

(52) U.S. Cl.
CPC .......... *C09D 11/38* (2013.01); *C08G 18/0823* (2013.01); *C08G 18/0866* (2013.01); *C08G 18/3212* (2013.01); *C08G 18/3215* (2013.01); *C08G 18/3234* (2013.01); *C08G 18/348* (2013.01); *C08G 18/381* (2013.01); *C08G 18/3848* (2013.01); *C08G 18/3872* (2013.01); *C08G 18/675* (2013.01); *C08G 18/755* (2013.01); *C08G 18/757* (2013.01); *C08G 18/758* (2013.01); *C08G 18/7642* (2013.01); *C09D 11/023* (2013.01); *C09D 11/101* (2013.01); *C09D 11/322* (2013.01); *B41M 7/009* (2013.01); *B41M 7/0072* (2013.01)

(58) Field of Classification Search
CPC ..... C09D 11/38; C09D 11/023; C09D 11/101; C09D 11/322; C08G 18/3234; C08G 18/3215; C08G 18/381; C08G 18/3848; C08G 18/3872; C08G 18/758; C08G 18/675; C08G 18/7642; C08G 18/3212; C08G 18/755; C08G 18/0866; C08G 18/348; C08G 18/0823; C08G 18/757; B41M 7/009; B41M 7/0072

See application file for complete search history.

(56) References Cited

U.S. PATENT DOCUMENTS

| | | |
|---|---|---|
| 2001/0001103 A1 | 5/2001 | Noguchi et al. |
| 2003/0144375 A1* | 7/2003 | Wu .................. C09D 11/30 523/160 |

(Continued)

FOREIGN PATENT DOCUMENTS

| | | |
|---|---|---|
| EP | 2233536 A1 | 9/2010 |
| JP | S55-065211 A | 5/1980 |

(Continued)

OTHER PUBLICATIONS

English language translation of the following: Office action dated Jun. 11, 2019 from the JPO in a Japanese patent application No. 2018-537010 corresponding to the instant patent application.

(Continued)

*Primary Examiner* — Alexander C Kollias
(74) *Attorney, Agent, or Firm* — SOLARIS Intellectual Property Group, PLLC

(57) ABSTRACT

There are provided an ink jet ink composition including water; and particles including a chain polymer including Unit (1), Unit (2), and a hydrophilic group and a polymerizable group, and an image forming method. $Cy^1$ and $Cy^2$ each independently represent a divalent organic group having 3 to 30 carbon atoms including a ring, $Y^1$ and $Y^2$ each independently represent an oxygen atom, a sulfur atom, or a $-NR^1-$ group, $R^1$ represents a hydrogen atom or a hydrocarbon group having 1 to 10 carbon atoms, *1 in Unit (1) represents a bonding position to a structural unit other than Unit (1), and *2 in Unit (2) represents a bonding position to a structural unit other than Unit (2).

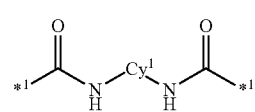

(1)

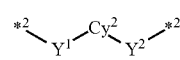

(2)

20 Claims, No Drawings

(51) Int. Cl.
*C08G 18/34* (2006.01)
*C09D 11/322* (2014.01)
*B41M 7/00* (2006.01)

(56) References Cited

U.S. PATENT DOCUMENTS

| | | | |
|---|---|---|---|
| 2012/0225968 A1* | 9/2012 | Nakano | C08F 299/06 522/16 |
| 2013/0053485 A1* | 2/2013 | Misawa | C09D 11/324 524/104 |
| 2013/0108841 A1* | 5/2013 | Denda | C09D 11/38 428/195.1 |
| 2014/0002556 A1 | 1/2014 | Sato et al. | |
| 2018/0264719 A1* | 9/2018 | Rolland | B33Y 50/00 |

FOREIGN PATENT DOCUMENTS

| | | |
|---|---|---|
| JP | H10-168151 A | 6/1998 |
| JP | H11-116881 A | 4/1999 |
| JP | 2002-80767 A | 3/2002 |
| JP | 2011-523428 A | 8/2011 |
| JP | 2012-149228 A | 8/2012 |
| JP | 2013-237781 A | 11/2013 |
| JP | 5884320 B2 | 3/2016 |
| WO | 2009115489 A1 | 9/2009 |
| WO | 2009/137753 A1 | 11/2009 |
| WO | 2016/052053 A1 | 4/2016 |

OTHER PUBLICATIONS

International Search Report issued in International Application No. PCT/JP2017/025986 dated Sep. 12, 2017.
Written Opinion of the ISA issued in International Application No. PCT/JP2017/025986 dated Sep. 12, 2017.
Extended European Search Report dated Aug. 1, 2019, issued in corresponding EP Patent Application No. 17845926.9.
Office action dated Dec. 19, 2019, from the IPO in a Indian patent application No. 201947007175 corresponding to the instant patent application.

* cited by examiner

INK JET INK COMPOSITION AND IMAGE FORMING METHOD

CROSS-REFERENCE TO RELATED APPLICATIONS

This application is a continuation application of International Application No. PCT/JP2017/025986, filed Jul. 18, 2017, the disclosure of which is incorporated herein by reference in its entirety. Further, this application claims priority from Japanese Patent Application No. 2016-169840, filed Aug. 31, 2016 and Japanese Patent Application No. 2016-252732, filed Dec. 27, 2016, the disclosures of which are incorporated herein by reference in their entirety.

BACKGROUND OF THE INVENTION

1. Field of the Invention

The present disclosure relates to an ink jet ink composition and an image forming method.

2. Description of the Related Art

In the related art, there has been known an ink jet ink composition including a polymer having a urethane structure and water, and having photocuring properties.

For example, there has been known an ink composition for ink jet recording which has excellent rub resistance and excellent adhesiveness, also has excellent curing properties, and has a specific chemical structure, the ink composition for ink jet recording including: at least one of urethane (meth)acrylate having a weight-average molecular weight of 1,000 to 10,000 or crosslinking urethane (meth)acrylate having a structural unit including this urethane (meth)acrylate; a ultraviolet curable resin other than the urethane (meth)acrylate and the crosslinking urethane (meth)acrylate; a photoradical polymerization initiator; and water (for example, see JP2013-237781A).

There has been known an ink jet ink composition which is excellent in curing properties due to ultraviolet irradiation in presence of water and a solvent, jetting stability such as dot omission or flight deflection, and preservation stability of ink, the ink jet ink composition including: a pigment; a water-soluble organic solvent; a surfactant; a compound that has a specific chemical structure and that includes at least one of urethane (meth)acrylate having a weight-average molecular weight of 1,000 to 10,000 or crosslinking urethane (meth)acrylate having a constitutional unit including this urethane (meth)acrylate, and a radical polymerizable group; a photoradical polymerization initiator; and water (for example, There has been known an ink jet ink composition that is excellent in jetting stability such as dot omission or flight deflection, nozzle clogging recoverability after long-term standing, and preservation stability of ink and satisfactory curing properties due to ultraviolet irradiation, the ink jet ink composition at least containing: a first radical polymerizable compound in which solubility to water of 100 g at 20° C. is 1 g or greater, a photocurable aqueous emulsion, and water, in which the photocurable aqueous emulsion is an emulsion of amphiphilic linear-type urethane (meth)acrylate including a second radical polymerizable compound in which solubility to water of 100 g at 20° C. is less than 1 g and a photoradical polymerization initiator, and in which the ink jet ink composition includes 1 to 30 mass % of the first radical polymerizable compound with respect to the total mass of the ink jet ink composition (for example, see JP5884320B).

There has been known an aqueous ink composition for active energy ray curable-type ink jet recording that has excellent adhesion to various recording media, excellent abrasion resistance, and excellent water resistance, less odor, less skin irritation, and satisfactory jetting stability, the aqueous ink composition for active energy ray curable-type ink jet recording containing: a polyurethane compound containing a group having an active energy ray curable unsaturated double bond; a basic compound; a colorant; a water-soluble organic solvent; and water, in which the polyurethane compound has a carboxyl group and a sum of groups having the double bond is 1.0 to 5.0 equivalent/kg (for example, see JP2002-80767A).

There are known gel particles that are excellent in dispersibility and redispersibility in a case where solidification occurs, that are highly sensitively cured, and that have a film (image) that has excellent film hardness, the gel particles having a polymerizable group, and a three-dimensional crosslinked structure including at least one bond selected from a urethane bond and a urea bond, and including a photopolymerization initiator, and also there is known an ink composition including these gel particles and water (for example, see WO2016/052053A).

SUMMARY OF THE INVENTION

However, the ink jet ink compositions disclosed in JP2013-237781A, JP2012-149228A, JP5884320B, and JP2002-80767A are required to have an improved adhesiveness between a formed image and a plastic base material in some cases.

The ink jet ink compositions disclosed in JP2013-237781A, JP2012-149228A, JP5884320B, and JP2002-80767A are required to have improved dispersion stability in some cases.

An ink jet ink composition including particles having a structure different from that of the gel particles disclosed in WO2016/052053A is required in some cases.

An object of an aspect of the present disclosure is to provide an ink jet ink composition that can form an image having excellent adhesiveness to a plastic base material and excellent dispersion stability.

An object of another aspect of the present disclosure is to provide an image forming method using the ink jet ink composition.

Specific means for achieving the above objects includes the following aspects.

<1> An ink jet ink composition comprising:
water; and particles including a chain polymer including Structural Unit (1), Structural Unit (2), and a hydrophilic group and a polymerizable group.

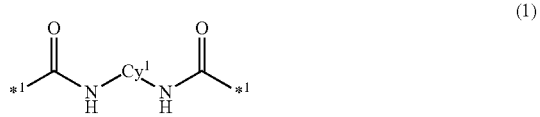

In Structural Units (1) and (2), $Cy^1$ and $Cy^2$ each independently represent a divalent organic group having 3 to 30 carbon atoms including a cyclic structure, $Y^1$ and $Y^2$ each independently represent an oxygen atom, a sulfur atom, or a $-NR^1-$ group, $R^1$ represents a hydrogen atom or a hydrocarbon group having 1 to 10 carbon atoms.

*1 in Structural Unit (1) represents a bonding position to a structural unit other than Structural Unit (1), and *2 in Structural Unit (2) represents a bonding position to a structural unit other than Structural Unit (2).

<2> The ink jet ink composition according to <1>, in which a total content of Structural Units (1) and (2) is 60 mass % or greater with respect to a total amount of the chain polymer.

<3> The ink jet ink composition according to <1> or <2>, in which, in a case where a total millimolar number of the cyclic structure included in Structural Units (1) and (2) in 1 g of the chain polymer is defined as a ring value of the chain polymer, the ring value of the chain polymer is 3.00 mmol/g or greater.

<4> The ink jet ink composition according to any one of <1> to <3>, in which at least one of $Cy^1$ or $Cy^2$ includes an aliphatic ring as the cyclic structure.

<5> The ink jet ink composition according to any one of <1> to <4>, in which at least one of $Cy^1$ or $Cy^2$ includes two or more cyclic structures.

<6> The ink jet ink composition according to any one of <1> to <5>, in which at least one of $Cy^1$ or $Cy^2$ includes Bisaryl Structure (A).

$$*-Ar^1\text{-}L\text{-}Ar^2-* \quad (A)$$

In Bisaryl Structure (A), $Ar^1$ and $Ar^2$ each independently represent an arylene group, L represents a single bond or a divalent linking group, and two *'s each represent a bonding position.

<7> The ink jet ink composition according to <6>, in which at least one of $Ar^1$ or $Ar^2$ is an arylene group substituted with at least one halogen atom.

<8> The ink jet ink composition according to <6> or <7>, in which any one of $Cy^1$ and $Cy^2$ includes an aliphatic ring, and the other of $Cy^1$ and $Cy^2$ includes Bisaryl Structure (A).

<9> The ink jet ink composition according to <8>, in which, in the chain polymer, a molar ratio of the structural unit including Bisaryl Structure (A) to the structural unit including an aliphatic ring is 0.10 to 1.00.

<10> The ink jet ink composition according to any one of <1> to <9>, in which the hydrophilic group is at least one selected from the group consisting of a carboxy group and a salt of a carboxy group.

<11> The ink jet ink composition according to <10>, in which, in a case where a total millimolar number of the carboxy group and the salt of a carboxy group in 1 g of the chain polymer is defined as an acid value of the chain polymer, the acid value of the chain polymer is 0.30 mmol/g to 1.50 mmol/g.

<12> The ink jet ink composition according to any one of <1> to <11>, in which a weight-average molecular weight of the chain polymer is 10,000 to 100,000.

<13> The ink jet ink composition according to any one of <1> to <12>, in which the polymerizable group of the particles is a photopolymerizable group, and in which the particles include a photopolymerizable compound as a compound having the photopolymerizable group.

<14> The ink jet ink composition according to <13>, in which at least one kind of the photopolymerizable compound includes one or more cyclic structures and two or more (meth)acryloyl groups in a molecule.

<15> The ink jet ink composition according to <13> or <14>, in which the chain polymer has a photopolymerizable group.

<16> The ink jet ink composition according to any one of <1> to <15>, in which the particles include an ethylenic double bond and, in which in a case where a millimolar number of the ethylenic double bond in 1 g of a solid content of the particles is defined as the C=C value of the particles, a C=C value of the particles is 0.30 mmol/g or greater.

<17> The ink jet ink composition according to any one of <1> to <12>, in which the polymerizable group of the particles is a thermopolymerizable group, and in which the particles include a thermopolymerizable compound as a compound including the thermopolymerizable group.

<18> The ink jet ink composition according to any one of <1> to <17>, in which a solid content amount of the particles is 50 mass % or greater with respect to a solid content amount of the ink jet ink composition.

<19> The ink jet ink composition according to any one of <1> to <18>, in which a content of the chain polymer is 20 mass % or greater with respect to a solid content amount of the particles.

<20> An image forming method including: applying the ink jet ink composition according to any one of <1> to <19> to a plastic base material by an ink jet method; and curing the ink jet ink composition applied to the plastic base material.

According to an aspect of the present disclosure, it is possible to provide an ink jet ink composition that can form an image having excellent adhesiveness to a plastic base material and that has excellent dispersion stability.

According to another aspect of the present disclosure, it is possible to provide an image forming method using the ink jet ink composition.

DESCRIPTION OF THE PREFERRED EMBODIMENTS

In the present specification, a numerical range described by using "to" means a range including numerical values provided before and after "to" as a lower limit and an upper limit.

In the present specification, unless described otherwise, in a case where a plurality of materials corresponding to each component exist in a composition, an amount of respective components in the composition means a total amount of the plurality of the corresponding materials existing in the composition.

With respect to the numerical ranges described in steps in the present specification, an upper limit or a lower limit described in a certain numerical range may be substituted with an upper limit or a lower limit of a numerical range in another stepwise description or may be substituted with values indicated in the examples.

In the present specification, with respect to the expression "step", in addition to an independent step, even in a case where a step is not clearly differentiated from the other steps, if a desired purpose of the step is achieved, the step is included in this expression.

In the present specification, "light" is a concept of including active energy rays such as γ rays, β rays, electron beams, ultraviolet rays, and visible rays.

In the present specification, ultraviolet rays may also be referred to as "ultra violet (UV) light".

In the present specification, the light generated from a light emitting diode (LED) light source may be referred to as "LED light".

In the present specification, "(meth)acrylic acid" is a concept of including both acrylic acid and methacrylic acid, and "(meth)acrylate" is a concept of including both acrylate and methacrylate, and "(meth)acryloyl group" is a concept of including both an acryloyl group and a methacryloyl group.

[Ink Jet Ink Composition]

The ink jet ink composition (hereinafter, simply referred to as "ink") of the present disclosure is an ink jet ink composition and contains water and particles including a chain polymer including Structural Unit (1), Structural Unit (2), and a hydrophilic group and a polymerizable group.

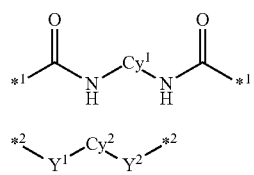

In Structural Units (1) and (2), $Cy^1$ and $Cy^2$ each independently represent a divalent organic group having 3 to 30 carbon atoms including a cyclic structure, $Y^1$ and $Y^2$ each independently represent an oxygen atom, a sulfur atom, or a —$NR^1$— group, $R^1$ represents a hydrogen atom or a hydrocarbon group having 1 to 10 carbon atoms.

*1 in Structural Unit (1) represents a bonding position to a structural unit other than Structural Unit (1), and *2 in Structural Unit (2) represents a bonding position to a structural unit other than Structural Unit (2).

In the present disclosure, a chain polymer means a polymer including a main chain in which respective structural units are bonded to each other in a chain shape.

The chain polymer may have a side chain that is branched from the main chain. That is, the chain polymer may have a branched structure.

According to the ink of the present disclosure, an image which is excellent in adhesiveness to a plastic base material (hereinafter, referred to as a "base material") can be formed.

The ink of the present disclosure is excellent in dispersion stability.

In the present specification, the "dispersion stability of ink" means dispersion stability of the particles in the ink.

In the present specification, the "image" means a general film formed by ink and includes not only a pattern image (for example, a character, a symbol, or a figure) but also a solid image.

The reason that the effect of the adhesiveness is exhibited is assumed as follows. However, the ink of the present disclosure is not limited by the following reasons.

The particles in the ink include a chain polymer.

The chain polymer includes Structural Units (1) and (2). That is, the chain polymer included in the particles includes a hydrophobic and rigid cyclic structure, and thus it is considered that the chain polymer has hydrophobic and rigid properties.

The particles in the ink includes a polymerizable group (as described below, this polymerizable group may be or may not be covalently bonded to a chain polymer).

It is considered that, in a case where an image is formed by using ink containing the above particles and the formed image is cured, particles including hydrophobic and rigid chain polymer are bonded to each other by a polymerizable group, and thus a hydrophobic and rigid image is formed. It is considered that the fact that the image is hydrophobic and rigid contributes to the effect of the adhesiveness of the image to the base material.

In the following examples, adhesiveness between the image formed by the ink and the base material is evaluated by evaluating the adhesiveness between the cured film formed by the ink and the base material.

The reason that the effect of the dispersion stability is exhibited is assumed as follows, but the ink in the present disclosure is not limited to the following reasons.

The chain polymer in the particles has a hydrophilic group. For example, the chain polymer has a hydrophilic group as a side chain to a hydrophobic main chain.

As described above, it is considered that the chain polymer has hydrophobic and rigid properties.

It is considered that, the effect of the dispersion stability is exhibited by dispersing the particles including a hydrophobic and rigid chain polymer due to an action of the hydrophilic group.

It is considered that, since the chain polymer has a hydrophobic and rigid cyclic structure, hydrolysis of the chain polymer is suppressed, and thus the dispersion stability of the particles is maintained.

It is considered that, also in a case where the particles include components (a polymerizable compound, a photopolymerization initiator, and the like described below) in addition to the chain polymer, since all of the particles are hydrophobic, the hydrolysis of these components are suppressed, and thus dispersion stability of the particles is maintained.

In the following examples, the dispersion stability (that is, dispersion stability of particles in ink) of the ink is evaluated by evaluating jettability of the ink and preservation stability of the ink.

According to the ink of the present disclosure, it is possible to form an image which has excellent hardness.

As the reason that it is possible to form an image excellent in hardness by the ink of the present disclosure, the same reason that the effect of the adhesiveness is exhibited is considered.

As a result of the research of the present inventors, it is clear that, in the ink of the present disclosure, the decrease of the curing properties of the ink is suppressed even in a case where the ink has been left over time, compared with ink (for example, ink disclosed in JP2013-237781A, JP2012-149228A, and JP5884320B) containing well-known urethane (meth)acrylate. The suppression of the decrease in the curing properties of the ink in a case where the ink has been left over time is also described to say that "time curability of the ink is excellent" or "time curability of the ink is improved".

The reason that the effect is exhibited is not clear, but it is considered that, in the ink of the present disclosure that contains particles including a hydrophobic and rigid chain polymer, permeation of water to the particles can be suppressed, and thus the hydrolysis of the components (a chain polymer, a polymerizable compound used if necessary, and the like) of the particles can be suppressed also in a case where the ink has been left over time.

The chain polymer included in the particles according to the present disclosure can be easily formed, compared with the three-dimensional crosslinked structure of the particles (for example, gel particles disclosed in WO2016/052053A) having a three-dimensional crosslinked structure. For example, the chain polymer according to the present disclosure can be formed of fewer kinds of monomers compared with the three-dimensional crosslinked structure. In a case where the chain polymer according to the present disclosure is formed, it is not necessary to synthesize a trifunctional or higher functional isocyanate compound required for forming the three-dimensional crosslinked structure.

Therefore, the ink of the present disclosure can be easily manufactured without substantially forming a three-dimensional crosslinked structure, compared with the ink (for example, ink disclosed in WO2016/052053A) containing particles having a three-dimensional crosslinked structure.

The ink of the present disclosure is suitable for the use of forming an image on a plastic base material.

Examples of the plastic in the plastic base material include a polyvinyl chloride (PVC) resin, cellulose diacetate, cellulose triacetate, cellulose propionate, cellulose butyrate, cellulose acetate butyrate, cellulose nitrate, polyethylene terephthalate (PET), polyethylene (PE), polystyrene (PS), polypropylene (PP), polycarbonate (PC), and polyvinyl acetal, and an acrylic resin.

The plastic base material may be subjected to a corona treatment.

According to the ink of the present disclosure, an image which is excellent in adhesiveness can be formed not only on a general plastic base material such as a PET base material but also on a base material that is difficult to secure adhesiveness to the image in the image formation by aqueous ink.

In the image formation by aqueous ink, examples of the base material that is difficult to secure adhesiveness to the image include a hydrophobic base material that does not have a polar group.

Examples of the hydrophobic base material that does not have a polar group include a PS base material, a corona-treated PP base material (also may be referred to as "corona PP"), a PE base material, and a paper base material laminated with PE.

The ink of the present disclosure may be used in the use of the image formation on a base material in addition to the plastic base material.

Examples of the base material other than the plastic base material include a textile base material.

Examples of a material of the textile base material include natural fibers such as cotton, silk, hemp, and wool; chemical fibers such as viscose rayon and lyocell; synthetic fibers such as polyester, polyamide, and acryl; and a mixture of at least two selected from the group consisting of natural fiber, chemical fiber, and synthetic fiber.

Examples of the textile base material include a textile base material disclosed in paragraphs 0039 to 0042 of WO2015/158592A.

Hereinafter, respective components that are included in the ink of the present disclosure are described.

<Specific Particles>

The ink of the present disclosure includes a chain polymer (also referred to as a "specific chain polymer" in the present specification) including at least one of a urethane bond or a urea bond and a hydrophilic group and contains particles (also referred to as "specific particles" in the present specification) including a polymerizable group.

In the ink of the present disclosure, the specific particles are a dispersoid dispersed in an aqueous medium (dispersion medium) including water.

If the ink of the present disclosure contains specific particles, each of the aforementioned effects (the improvement of the dispersion stability of the ink, the improvement of the adhesiveness of the image to the base material, and the like) are exhibited.

(Polymerizable Group)

The specific particles include a polymerizable group.

The polymerizable group contributes to curing of the image due to light, heat, and infrared rays.

The polymerizable group may be or may not be covalently bonded to a specific chain polymer.

The fact that the specific particles include a polymerizable group that is not covalently bonded to a specific chain polymer means that the specific particles include a compound (that is, a polymerizable compound) having a polymerizable group.

The fact that the specific particles include a polymerizable group that is covalently bonded to a specific chain polymer means that the specific chain polymer includes a polymerizable group.

In a case where the specific chain polymer includes a polymerizable group, the polymerizable group may be included in at least one of Structural Units (1) and (2) in the specific chain polymer or may be included in a portion other than Structural Units (1) and (2).

As the polymerizable group, a photopolymerizable group or a thermopolymerizable group is preferable.

The photopolymerizable group is preferably a radical polymerizable group, more preferably a group including an ethylenic double bond, and even more preferably a group including at least one of a vinyl group or a 1-methylvinyl group. In view of radical polymerization reactivity and hardness of the formed film, as the radical polymerizable group, a (meth)acryloyl group is particularly preferable.

As the thermopolymerizable group, an epoxy group, an oxetanyl group, an aziridinyl group, an azetidinyl group, a ketone group, an aldehyde group, and a blocked isocyanate group are preferable.

The particles may contain a kind of polymerizable group or may contain two or more kinds thereof.

The fact that the particles have a polymerizable group can be recognized, for example, by fourier transform infrared spectroscopy (FT-IR) analysis.

In view of improving the hardness of the image, in the ink of the present disclosure, it is preferable that the specific particles include a polymerizable compound (for example, a photopolymerizable compound), and it is more preferable that the specific particles include a polymerizable compound (for example, a photopolymerizable compound) and the specific chain polymer includes a polymerizable group (for example, a photopolymerizable group).

In a case where the specific particles include a polymerizable compound (for example, a photopolymerizable compound), and a specific chain polymer includes a polymerizable group (for example, a photopolymerizable group), water resistance and alcohol resistance of the image can be further improved.

In view of the improvement of the hardness of the image, the specific particles preferably include an ethylenic double bond.

In a case where a millimolar number of an ethylenic double bond in 1 g of the solid content of the specific particles is defined as a C=C value of the specific particles, in view of improvement of the hardness of the image, a C=C value of the specific particles is preferably 0.10 mmol/g or greater, more preferably 0.30 mmol/g or greater, even more preferably 1.00 mmol/g or greater, even more preferably 2.00 mmol/g or greater, and even more preferably 2.50 mmol/g or greater.

Meanwhile, in view of the time curability improvement (that is, decrease suppression of the curing properties of the ink due to elapse of time) of the ink, a C=C value of the specific particles is preferably 7.00 mmol/g or less, more preferably 6.50 mmol/g or less, and even more preferably 5.00 mmol/g or less.

In a case where the specific particles do not include a solvent, the solid content (or a solid content amount) of the specific particles means a total amount of the specific particles. In a case where the specific particles include a solvent, the solid content means a total amount obtained by removing a solvent from the specific particles.

The specific chain polymer preferably includes an ethylenic double bond, in view of the improvement of the hardness of the image.

In a case where the millimolar number of the ethylenic double bond in 1 g of the specific chain polymer is defined as a C=C value of the specific chain polymer, in view of the improvement of the hardness of the image, the C=C value of the specific chain polymer is preferably 0.05 mmol/g or greater, more preferably 0.10 mmol/g or greater, even more preferably 0.30 mmol/g or greater, and particularly preferably 0.50 mmol/g or greater.

In view of the improvement of the water resistance and the alcohol resistance of the image, the C=C value of the specific chain polymer is preferably 0.05 mmol/g or greater, more preferably 0.10 mmol/g or greater, even more preferably 0.30 mmol/g or greater, even more preferably 0.50 mmol/g or greater, even more preferably 0.60 mmol/g or greater, and particularly preferably 0.70 mmol/g or greater.

Meanwhile, in view of improving time curability (that is, suppressing decrease of curing properties of the ink by the elapse of time) of the ink, the C=C value of the specific chain polymer is preferably 4.00 mmol/g or less, more preferably 3.00 mmol/g or less, even more preferably 2.00 mmol/g or less, and particularly preferably 1.50 mmol/g or less.

(Specific Chain Polymer)

The specific particles include a specific chain polymer (that is, a chain polymer including Structural Units (1) and (2) and a hydrophilic group).

—Structural Units (1) and (2)—

Structural Units (1) and (2) are as below.

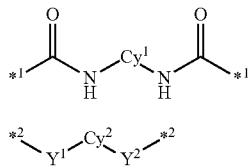

In Structural Units (1) and (2), $Cy^1$ and $Cy^2$ each independently represent a divalent organic group having 3 to 30 carbon atoms including a cyclic structure, $Y^1$ and $Y^2$ each independently represent an oxygen atom, a sulfur atom, or a —$NR^1$— group, $R^1$ represents a hydrogen atom or a hydrocarbon group having 1 to 10 carbon atoms.

*1 in Structural Unit (1) represents a bonding position to a structural unit other than Structural Unit (1), and *2 in Structural Unit (2) represents a bonding position to a structural unit other than Structural Unit (2).

Here, the expression "*1 in Structural Unit (1) represents a bonding position to a structural unit other than Structural Unit (1)" means that Structural Unit (1) is not directly bonded to each other in the specific chain polymer.

The structural unit other than Structural Unit (1) that is bonded at the position of *1 in Structural Unit (1) may be used singly or two or more kinds thereof may be used in combination.

The structural unit other than Structural Unit (1) is not particularly limited, but the examples thereof include Structural Unit (2). In a case where the specific chain polymer includes Structural Unit (3) described below, the structural unit other than Structural Unit (1) also includes Structural Unit (3). In a case where the specific chain polymer includes a structural unit derived from a diol compound, a structural unit derived from a diamine compound, or a structural unit derived from a dithiol compound in addition to Structural Units (2) and (3), examples of the structural unit other than Structural Unit (1) include these structural units.

The expression "*2 in Structural Unit (2) represents a bonding position to a structural unit other than Structural Unit (2)" means that Structural Unit (2) is not directly bonded to each other in the specific chain polymer.

The structural unit other than Structural Unit (2) that is bonded at the position of *2 in Structural Unit (2) may be used singly or two or more kinds thereof may be used in combination.

The structural unit other than Structural Unit (2) is not particularly limited, and examples thereof include Structural Unit (1). In a case where the specific polymer includes a structural unit derived from an isocyanate compound other than Structural Unit (1), the structural unit other than Structural Unit (2) include a structural unit derived from an isocyanate compound other than Structural Unit (1).

$Y^1$ and $Y^2$ each independently represents an oxygen atom, a sulfur atom, or an —$NR^1$— group, and $R^1$ represents a hydrogen atom or a hydrocarbon group having 1 to 10 carbon atoms.

$R^1$ is preferably a hydrogen atom or a hydrocarbon group having 1 to 6 carbon atoms and more preferably a hydrogen atom or a hydrocarbon group having 1 to 3 carbon atoms.

$Y^1$ and $Y^2$ each independently and preferably represent an oxygen atom or an —$NR^1$— group, and more preferably an oxygen atom.

The "cyclic structure" in $Cy^1$ and $Cy^2$ means an aliphatic ring, an aromatic ring, or a heterocyclic ring. That is, a divalent organic group represented by $Cy^1$ and $Cy^2$ includes at least one of an aliphatic ring, an aromatic ring, or a heterocyclic ring.

The concept of "including a cyclic structure" in $Cy^1$ and $Cy^2$ includes all of including at least one single ring, including at least one fused ring including two or more single rings, including at least one bridged ring including two or more single rings, and including at least one spiro ring including two or more single rings.

A heteroatom in the heterocyclic ring is preferably an oxygen atom, a sulfur atom, or a nitrogen atom and more preferably a nitrogen atom.

The number of carbon atoms of the divalent organic group represented by $Cy^1$ or $Cy^2$ is 3 to 30 but is preferably 5 to 30.

The divalent organic group represented by $Cy^1$ or $Cy^2$ includes a cyclic structure but may include a structure (a linear structure, a branched structure, and the like) other than the cyclic structure.

The divalent organic group represented by $Cy^1$ or $Cy^2$ may include a polymerizable group.

The cyclic structure in $Cy^1$ and $Cy^2$ may be substituted with at least one substituent.

Examples of the substituent include a halogen atom, a halogenated alkyl group, an alkyl group, and a heteroatom containing group.

Examples of the substituent include a halogen atom, a halogenated alkyl group, an alkyl group, and a heteroatom containing group.

The halogen atom as the substituent is preferably a fluorine atom, a chlorine atom, a bromine atom, or an iodine atom and more preferably a fluorine atom, a chlorine atom, or a bromine atom.

The halogenated alkyl group as the substituent is preferably an alkyl group having 1 to 6 carbon atoms having at least one halogen atom. A preferable range of the halogen atom in a halogenated alkyl group is the same as the preferable range of the halogen atom as the substituent.

The alkyl group as the substituent is preferably an alkyl group having 1 to 6 carbon atoms.

The heteroatom containing group as the substituent is preferably an alkoxy group having 1 to 6 carbon atoms.

In view of effectively exhibiting the effect of improvement of the time curability of the ink, at least one of $Cy^1$ or $Cy^2$ preferably includes two or more cyclic structures.

In the present specification, the number of cyclic structures means the number of rings (that is, single rings).

Accordingly, the concept of "including two or more cyclic structures" not only includes including two or more single rings that are not a portion of a fused ring, a bridged ring, and a spiro ring but also includes including one fused ring, including one bridged ring, and including one spiro ring.

In view of effectively exhibiting the effect of dispersion stability and adhesiveness, at least one of $Cy^1$ or $Cy^2$ preferably includes an aliphatic ring.

In view of effectively exhibiting the effect of dispersion stability and adhesiveness, at least one of $Cy^1$ or $Cy^2$ preferably includes a 5-membered or 6-membered cyclic structure (preferably an aliphatic ring or an aromatic ring, and particularly preferably an aliphatic ring).

Here, the concept of "including a 5-membered or 6-membered cyclic structure" includes including a fused ring including a 5-membered or 6-membered single ring, including a bridged ring including a 5-membered or 6-membered single ring, and including a spiro ring including a 5-membered or 6-membered single ring.

Examples of $Cy^1$ in Structural Unit (1) include Groups (C1-1) to (C1-16), but $Cy^1$ is not limited to the following groups. * in Groups (C1-1) to (C1-16) represents a bonding position.

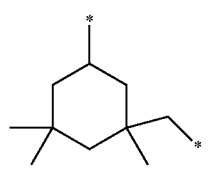

(C1-1)

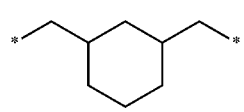

(C1-2)

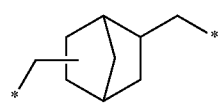

(C1-3)

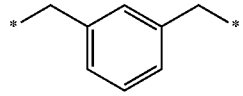

(C1-4)

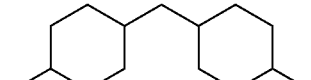

(C1-5)

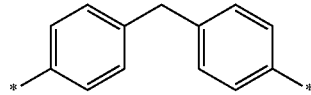

(C1-6)

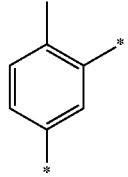

(C1-7)

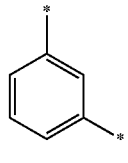

(C1-8)

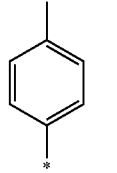

(C1-9)

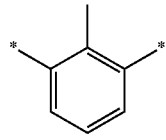

(C1-10)

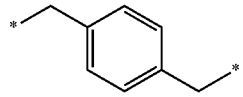

(C1-11)

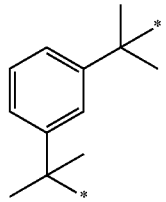

(C1-12)

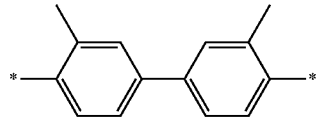

(C1-13)

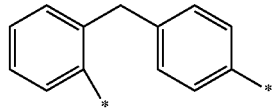

(C1-14)

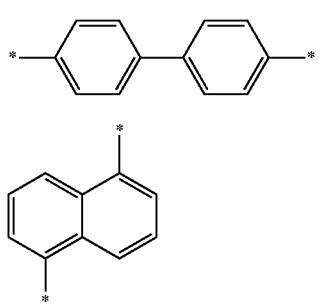

In view of improving adhesiveness between an image and a plastic base material, $Cy^1$ in Structural Unit (1) is even more preferably any one of Groups (C1-1) to (C1-7) and particularly preferably any one of Groups (C1-1) to (C1-3) and (C1-5).

In view of improving the water resistance and the alcohol resistance of the image, $Cy^1$ in Structural Unit (1) is preferably Group (C1-6), (C1-13), (C1-14), or (C1-15).

Examples of $Cy^2$ in Structural Unit (2) include Groups (C2-1) to (C2-26), but $Cy^2$ is not limited to the following groups. * in Groups (C2-1) to (C2-26) represents a bonding position.

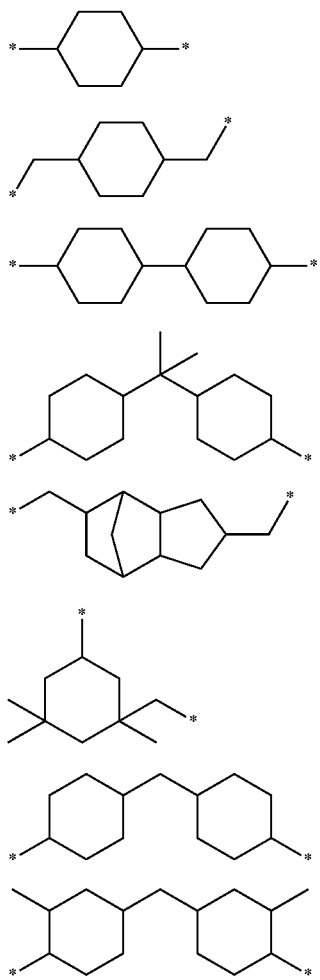

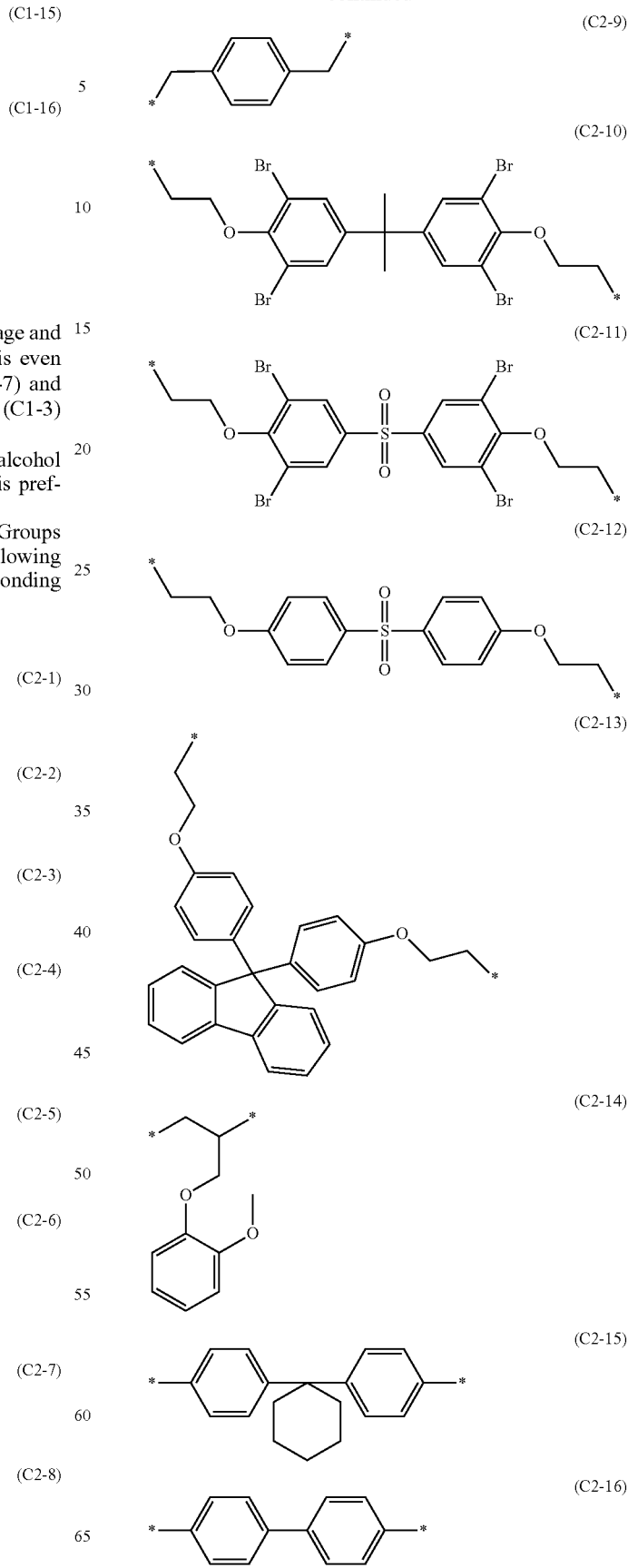

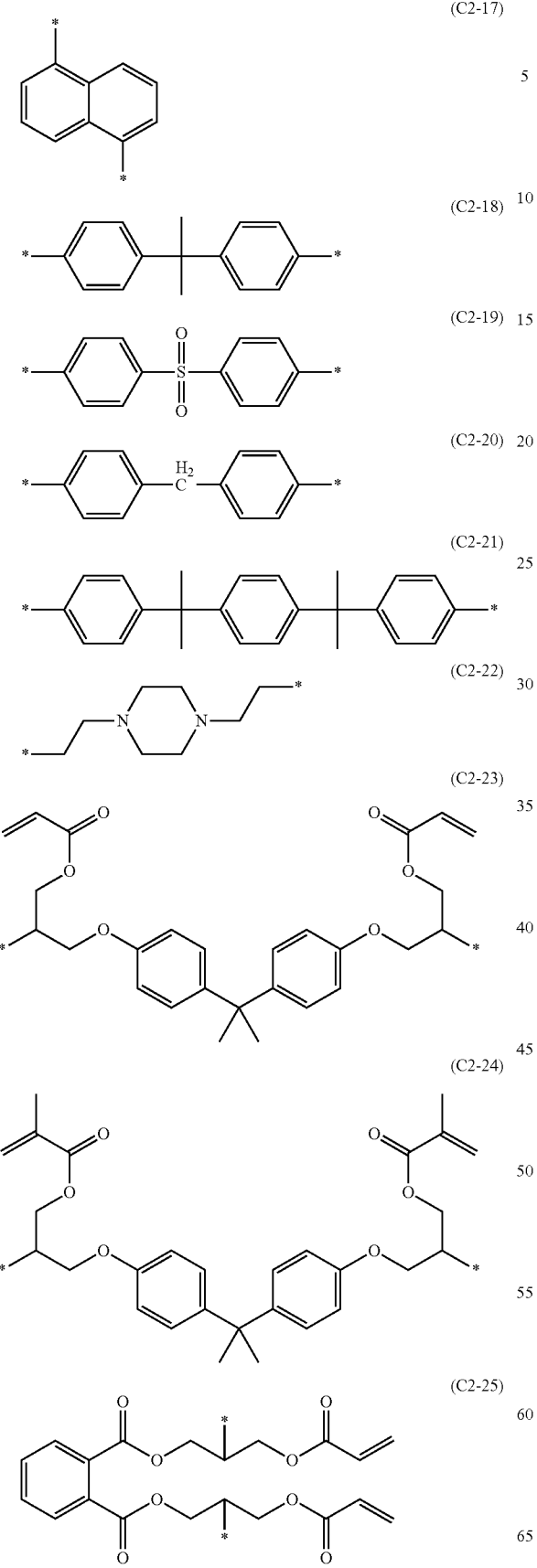

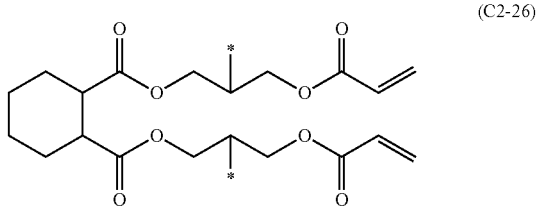

In view of improving the water resistance and the alcohol resistance of the image, $Cy^2$ in Structural Unit (2) is preferably Group (C2-10), (C2-11), (C2-12), (C2-13), (C2-15), (C2-16), (C2-18), (C2-19), (C2-20), (C2-21), (C2-23), or (C2-24), more preferably Group (C2-10), (C2-11), (C2-12), (C2-19), (C2-23), or (C2-24), and particularly preferably Group (C2-10) or (C2-11).

—Compound for Forming Unit (1)—

Examples of the compound (below, also referred to as a "compound for forming Unit (1)" or a "compound for Unit (1)") for forming Structural Unit (1) include a diisocyanate compound.

The compound for forming Unit (1) may have a polymerizable group. The compound for forming Unit (1) according to an aspect having a polymerizable group functions as a polymerizable group introducing compound described below.

Specific examples (Exemplary Compounds (1-1) to (1-20)) of the compound for forming Unit (1) are provided below, but the compound for forming Unit (1) is not limited to the specific example below.

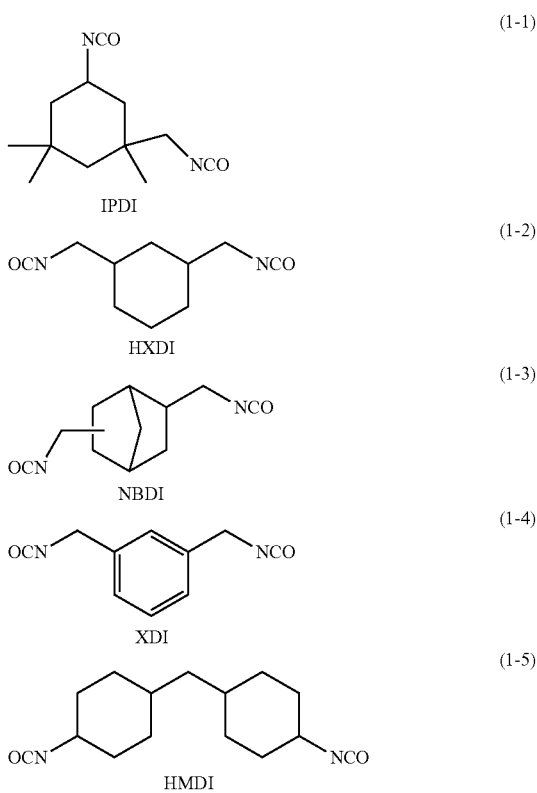

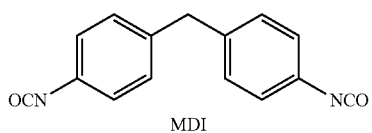
(1-6) MDI

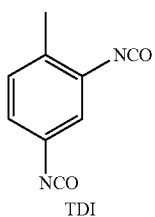
(1-7) TDI

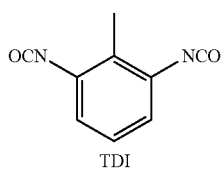
(1-8) TDI

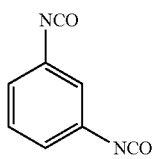
(1-9)

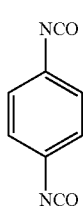
(1-10)

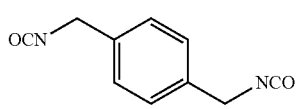
(1-11)

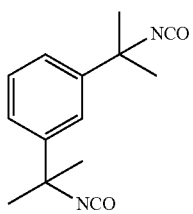
(1-12)

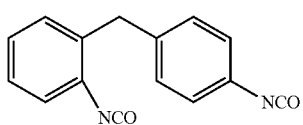
(1-13)

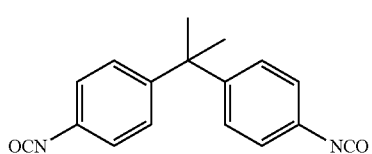
(1-14)

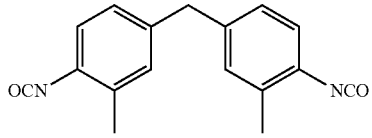
(1-15)

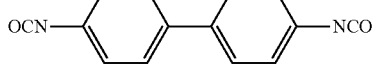
(1-16)

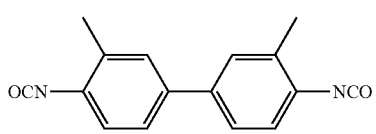
(1-17)

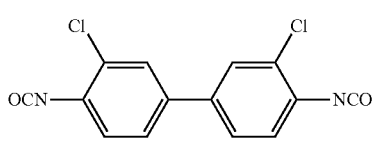
(1-18)

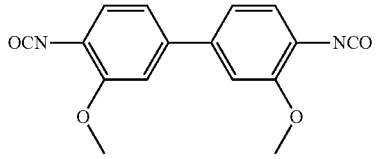
(1-19)

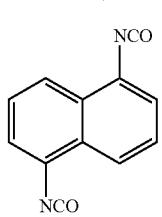
(1-20)

—Compound for Forming Unit (2)—

Examples of a compound (below, also referred to as a "compound for forming Unit (2)" and a "compound for Unit (2)") for forming Structural Unit (2) include a diol compound, a diamine compound, and a dithiol compound.

The compound for forming Unit (2) may have a polymerizable group. The compound for forming Unit (2) in an aspect of having a polymerizable group also functions as a polymerizable group introducing compound described below.

Specific examples (Exemplary Compounds (2-1) to (2-28)) of the compound for forming Unit (2) are provided below, but the compound for forming Unit (2) is not limited to the specific examples below.

(2-1)

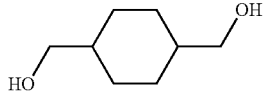
(2-2)

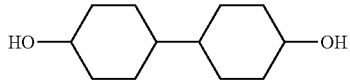
(2-3)

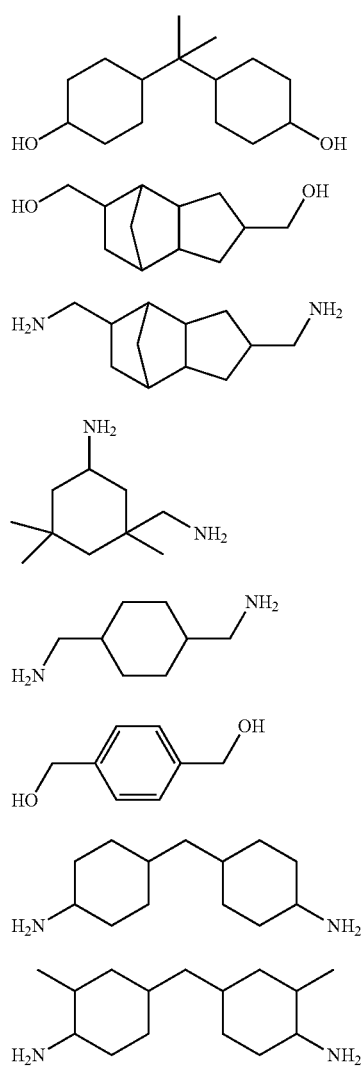
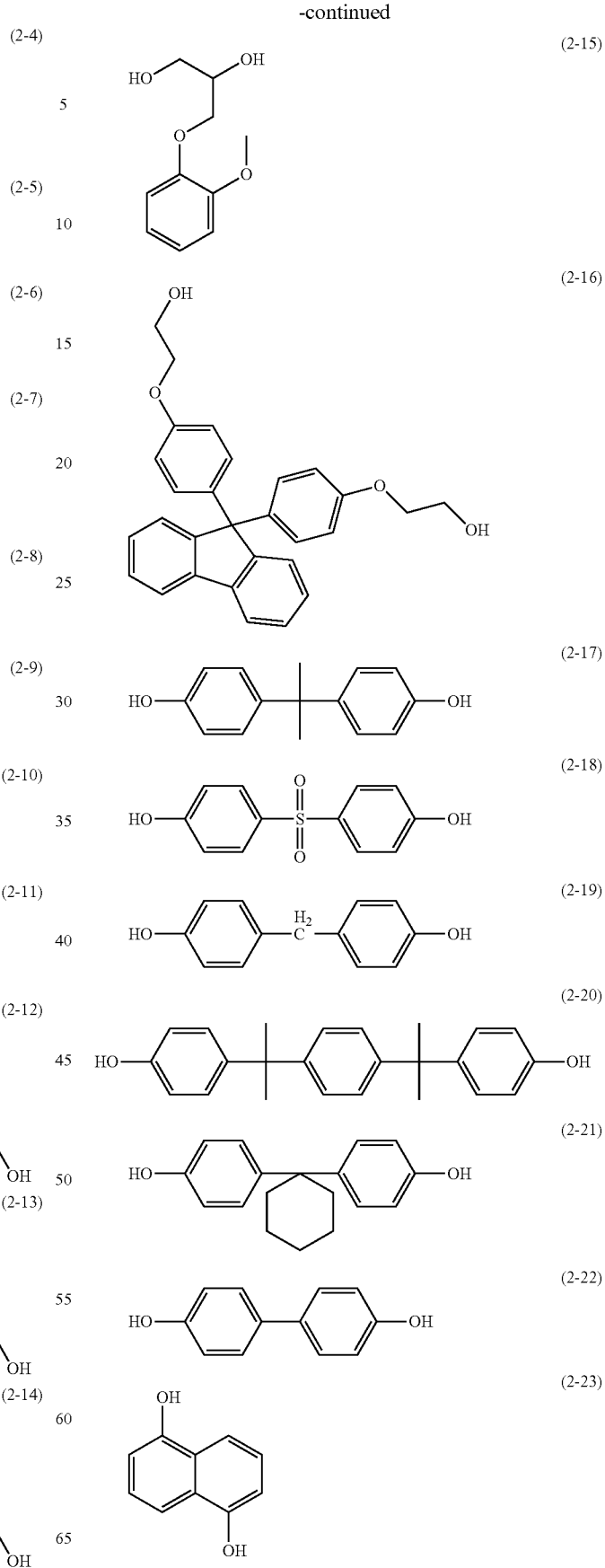

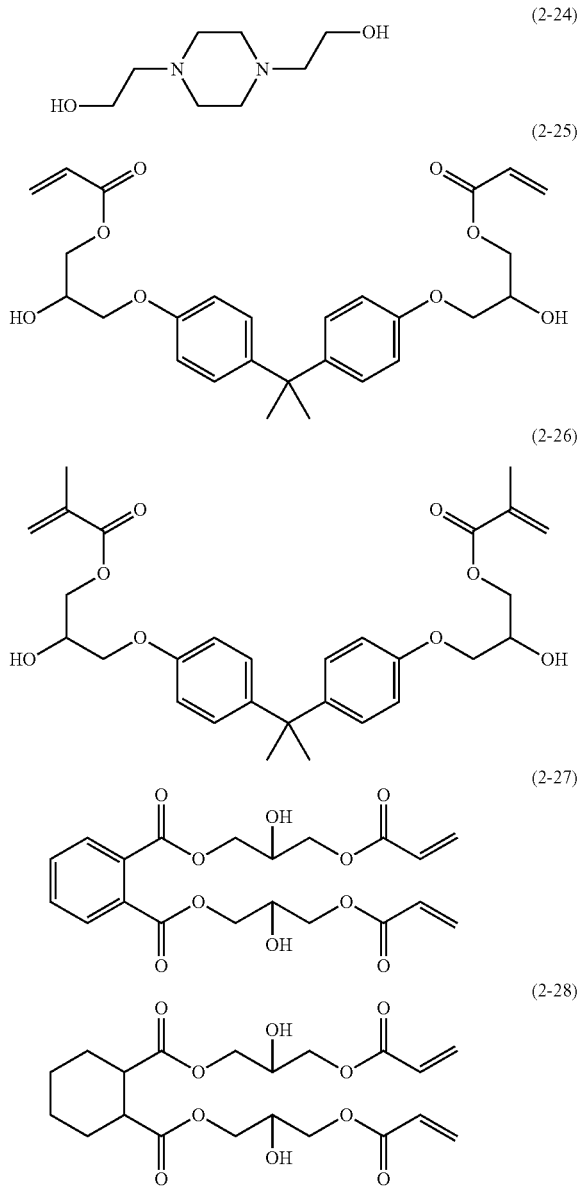

A total amount of Structural Units (1) and (2) with respect to the total amount of the specific chain polymer is preferably 50 mass % or greater. Accordingly, the ratio of the cyclic structure in a specific chain polymer becomes great, and thus the aforementioned effects of the dispersion stability and adhesiveness are effectively exhibited.

In view of effectively exhibiting the effect of the dispersion stability and the adhesiveness, the total amount of Structural Units (1) and (2) with respect to the total amount of the specific chain polymer is preferably 60 mass % or greater and more preferably 70 mass % or greater.

The upper limit of the total amount of Structural Units (1) and (2) with respect to the total amount of the specific chain polymer is not particularly limited, but the upper limit is, for example, 98 mass % and preferably 95 mass %.

In a case where a total millimolar number of the cyclic structure included in Structural Units (1) and (2) in 1 g of the specific chain polymer is defined as a ring value of the specific chain polymer, the ring value of the specific chain polymer is preferably 3.00 mmol/g or greater. Accordingly, the effects of the dispersion stability and the adhesiveness are effectively exhibited.

The ring value of the specific chain polymer is more preferably 4.00 mmol/g or greater.

The upper limit of the ring value of the specific chain polymer is, for example, 9.00 mmol/g.

The ring value of the specific chain polymer can be obtained by the following equation.

Ring value of specific chain polymer (mmol/g)= (((Content of Structural Unit (1) with respect to total amount of specific chain polymer (mass %)/100)×the number of cyclic structures in Structural Unit (1)/molecular weight of Structural Unit (1))+((content of Structural Unit (2) with respect to total amount of specific chain polymer (mass %)/100)×the number of cyclic structures in Structural Unit (2)/molecular weight of Structural Unit (2)))×1,000

In view of improving water resistance and alcohol resistance of the image, at least one of $Cy^1$ or $Cy^2$ in the specific chain polymer preferably includes Bisaryl Structure (A).

$$*-Ar^1-L-Ar^2-* \quad (A)$$

In Bisaryl Structure (A), $Ar^1$ and $Ar^2$ each independently represent an arylene group, L represents a single bond or a divalent linking group, and two *'s each represent a bonding position.

In a case where Bisaryl Structure (A) is included in Structural Unit (1), Bisaryl Structure (A) may be directly bonded to a nitrogen atom in Structural Unit (1) or may be bonded via a linking group (hereinafter, referred to as Linking Group LA).

Linking Group LA is preferably a substituted or unsubstituted oxyalkylene group having 1 to 10 carbon atoms (preferably having 1 to 8 carbon atoms), or a substituted or unsubstituted carbonyloxyalkylene group having 1 to 10 carbon atoms (preferably having 1 to 8 carbon atoms). The number of carbon atoms described herein means the number of carbon atoms in the entire body including a substituent.

The substituent in a substituted oxyalkylene group having 1 to 10 carbon atoms and a substituted carbonyloxyalkylene group having 1 to 10 carbon atoms include an alkoxy group, an acyloxy group, and a (meth)acryloyloxy group, and a (meth)acryloyloxy group is particularly preferable.

Specific examples of Linking Group LA are provided below. In the specific examples below, ** represents a bonding position to an arylene group in Bisaryl Structure (A), and * represents a bonding position to a nitrogen atom in Structural Unit (1).

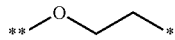

(LA-1)

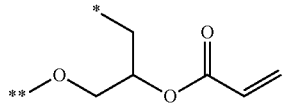

(LA-2)

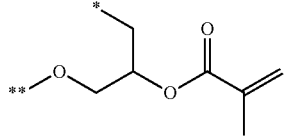

(LA-3)

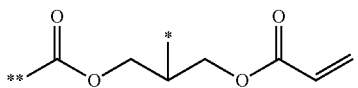
(LA-4)

In a case where Bisaryl Structure (A) is included in Structural Unit (2), Bisaryl Structure (A) may be directly bonded to $Y^1$ or $Y^2$ in Structural Unit (2) and may be bonded via a linking group (hereinafter, also referred to as Linking Group LB).

The linking group is preferably a substituted or unsubstituted oxyalkylene group having 1 to 10 carbon atoms (preferably having 1 to 8 carbon atoms) or a substituted or unsubstituted carbonyloxyalkylene group having 1 to 10 carbon atoms (preferably having 1 to 8 carbon atoms). The number of carbon atoms described herein means the number of carbon atoms in the entire body including a substituent.

The substituent in the substituted oxyalkylene group having 1 to 10 carbon atoms and the substituted carbonyloxyalkylene group having 1 to 10 carbon atoms include an alkoxy group, an acyloxy group and a (meth)acryloyloxy group, and a (meth)acryloyloxy group is particularly preferable.

Specific examples of Linking Group LB are provided below. In the specific examples below, ** represents a bonding position to an arylene group in Bisaryl Structure (A), and * represents a bonding position to $Y^1$ or $Y^2$ in Structural Unit (2).

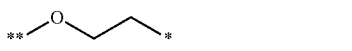
(LB-1)

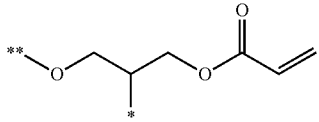
(LB-2)

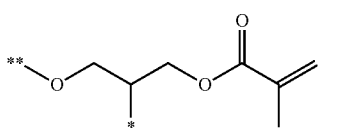
(LB-3)

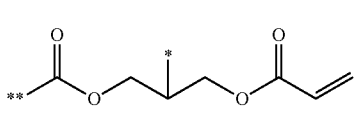
(LB-4)

In Bisaryl Structure (A), the arylene groups represented by $Ar^1$ and $Ar^2$ each may be an unsubstituted arylene group and may be an arylene group substituted with at least one substituent.

Examples of the substituent include a halogen atom, a halogenated alkyl group, an alkyl group, and a heteroatom containing group.

The halogen atom as the substituent is preferably a fluorine atom, a chlorine atom, a bromine atom, or an iodine atom and is more preferably a fluorine atom, a chlorine atom, or a bromine atom.

The halogenated alkyl group as the substituent is preferably an alkyl group having 1 to 6 carbon atoms having at least one halogen atom. The preferable range of the halogen atom in a halogenated alkyl group is the same as the preferable range of the halogen atom as the substituent.

The alkyl group as the substituent is preferably an alkyl group having 1 to 6 carbon atoms.

The heteroatom containing group as the substituent is preferably an alkoxy group having 1 to 6 carbon atoms, more preferably a methoxy group or an ethoxy group, and particularly preferably a methoxy group.

At least one of $Ar^1$ or $Ar^2$ in Bisaryl Structure (A) is preferably an unsubstituted arylene group, an arylene group substituted with at least one halogen atom, an arylene group substituted with at least one halogenated alkyl group, and an arylene group substituted with at least one alkoxy group having 1 to 6 carbon atoms (preferably a methoxy group or an ethoxy group and particularly preferably a methoxy group), more preferably an arylene group substituted with at least one halogen atom, an arylene group substituted with at least one halogenated alkyl group, or an arylene group substituted with at least one alkoxy group having 1 to 6 carbon atoms (preferably a methoxy group or an ethoxy group and particularly preferably a methoxy group), and particularly preferably an arylene group substituted with at least one halogen atom.

In Bisaryl Structure (A), an arylene group represented by $Ar^1$ and $Ar^2$ is preferably a phenylene group or a naphthylene group and more preferably a phenylene group in view of improving the water resistance and the alcohol resistance of the image.

In Bisaryl Structure (A), divalent linking group represented by L is preferably a linking group included in a bisphenol structure. Specifically, a sulfonyl group (a —$SO_2$— group), a divalent hydrocarbon group having 1 to 10 carbon atoms or a divalent halogenated hydrocarbon group having 1 to 10 carbon atoms is more preferable.

As the divalent hydrocarbon group having 1 to 10 carbon atoms as L, any one of a methylene group (—$CH_2$— group), a methyl methylene group (—$CHCH_3$— group), a dimethyl methylene group (—$C(CH_3)_2$— group), an ethylmethylmethylene group (—$C(CH_3)(C_2H_5)$— group), a diethylmethylene group (—$C(CH_3)_2$— group), a phenyl methylene group (—$CH(C_6H_5)$— group), a phenylmethylmethylene group (—$C(C_6H_5)(CH_3)$— group), a diphenylmethylene group (—$C(C_6H_5)_2$— group), and groups listed below (*represents the bonding position) is preferable.

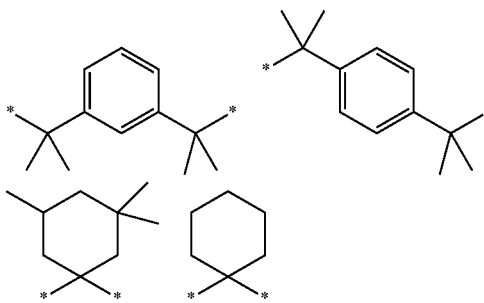

As a divalent halogenated hydrocarbon group having 1 to 10 carbon atoms as L, any one of the groups listed below (*represents the bonding position) is preferable.

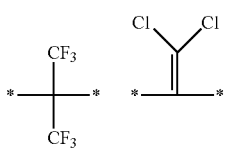

In view of improving the water resistance and the alcohol resistance of the image as L, a sulfonyl group (—SO$_2$— group) or a dimethylmethylene group (—C(CH$_3$)$_2$— group) is preferable, and a sulfonyl group (—SO$_2$— group) is more preferable.

As Bisaryl Structure (A), in view of improving the water resistance and the alcohol resistance of the image, Bisaryl Structure (A2) is preferable.

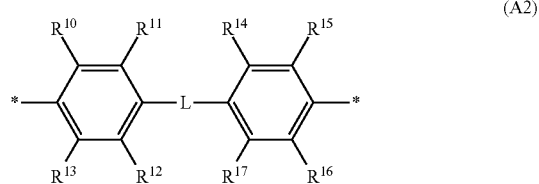

(A2)

In Bisaryl Structure (A2), $R^{10}$ to $R^{17}$ each independently represent a hydrogen atom or a substituent, L represents a single bond or a divalent linking group, and the two *'s each represent a bonding position.

In Bisaryl Structure (A2), the substituent represented by $R^{10}$ to $R^{17}$ is the same as the substituent that is included in $Ar^1$ and $Ar^2$ in Bisaryl Structure (A).

At least one of $R^{10}$ to $R^{17}$ is more preferably a halogen atom, a halogenated alkyl group having 1 to 6 carbon atoms, and an alkoxy group having 1 to 6 carbon atoms (preferably a methoxy group or an ethoxy group, particularly preferably a methoxy group), and particularly preferably a halogen atom.

L in Bisaryl Structure (A2) is the same as L in Bisaryl Structure (A), a preferable aspect of L in Bisaryl Structure (A2) is also the same as that of L in Bisaryl Structure (A).

In view of compatibility between the adhesiveness of the image to the plastic base material and the water resistance and the alcohol resistance of the image, it is preferable that one of $Cy^1$ and $Cy^2$ includes an aliphatic ring, and the other of $Cy^1$ and $Cy^2$ includes Bisaryl Structure (A).

A particularly preferable aspect in this case is an aspect in which $Cy^1$ includes an aliphatic ring, and $Cy^2$ includes Bisaryl Structure (A).

In a case where one of $Cy^1$ and $Cy^2$ includes an aliphatic ring, and the other of $Cy^1$ and $Cy^2$ includes Bisaryl Structure (A), in view of improving the water resistance and the alcohol resistance of the image, the molar ratio of the structural unit including Bisaryl Structure (A) to the structural unit including an aliphatic ring in a chain polymer is preferably 0.10 to 1.00, more preferably 0.10 to 0.80, even more preferably 0.10 to 0.70, and particularly preferably 0.10 to 0.60.

In a case where one of $Cy^1$ and $Cy^2$ includes an aliphatic ring, and the other of $Cy^1$ and $Cy^2$ includes Bisaryl Structure (A), the content of the structural unit including an aliphatic ring in a chain polymer is preferably 10 mass % to 80 mass %, more preferably 20 mass % to 60 mass %, and even more preferably 30 mass % to 50 mass % with respect to the total amount of the chain polymer.

—Hydrophilic Group—

The specific chain polymer includes a hydrophilic group.

The hydrophilic group included in the specific chain polymer contributes to dispersion stability of the ink.

The hydrophilic group is preferably an anionic group or a nonionic group, and is more preferably an anionic group in view of excellent effects of improving the dispersion stability.

For example, in a case where an anionic group and a nonionic group which have the same molecular weight are compared with each other, an anionic group has a more excellent effect of improving the dispersion stability. That is, an anionic group (particularly preferably, at least one selected from the group consisting of a carboxy group and a salt of a carboxy group) can sufficiently exhibit the effect of improving the dispersion stability even in a case where the molecular weight thereof is small.

Examples of the nonionic group include a group having a polyether structure, and a monovalent group including a polyalkyleneoxy group is preferable.

The anionic group may be an anionic group that is not neutralized or may be an anionic group that is neutralized.

Examples of the anionic group that is not neutralized include a carboxy group, a sulfo group, a sulfate group, a phosphonic acid group, and a phosphate group.

Examples of the anionic group that is neutralized include a salt of a carboxy group, a salt of a sulfo group, a salt of a sulfate group, a salt of a phosphonic acid group, and a salt of a phosphate group.

In the present specification, the expression "a carboxy group is neutralized" indicates that a carboxy group as an anionic group has a form of "a salt" (for example, "—COONa"). The same is applied to the sulfo group, the sulfate group, the phosphonic acid group, and the phosphate group as the anionic group.

For example, the neutralization can be performed by using alkali metal hydroxide (for example, sodium hydroxide, and potassium hydroxide), organic amine (for example, triethylamine).

In view of dispersion stability, the anionic group that is included in the specific chain polymer is preferably at least one selected from the group consisting of a carboxy group, a salt of a carboxy group, a sulfo group, a salt of a sulfo group, a sulfate group, a salt of a sulfate group, a phosphonic acid group, a salt of a phosphonic acid group, a phosphate group, and a salt of a phosphate group and more preferably at least one selected from the group consisting of a carboxy group and a salt of a carboxy group.

The "salt" in the salt of a carboxy group, the salt of a sulfo group, the salt of a sulfate group, the salt of a phosphonic acid group, and the salt of a phosphate group is preferably alkali metal salt or organic amine salt and more preferably alkali metal salt.

Alkali metal in the alkali metal salt is preferably K or Na.

In a case where the specific chain polymer includes an anionic group (for example, at least one selected from the group consisting of a carboxy group and a salt of a carboxy group) as a hydrophilic group, a millimolar number (for example, a total millimolar number of a carboxy group and a salt of a carboxy group) of an anionic group in 1 g of a specific chain polymer is defined as an acid value of a specific chain polymer, an acid value of the specific chain polymer is preferably 0.10 mmol/g to 2.00 mmol/g and more preferably 0.30 mmol/g to 1.50 mmol/g, in view of dispersion stability.

In a case where the specific chain polymer has an anionic group as a hydrophilic group, a degree of neutralization of an anionic group of a chain polymer is preferably 50% to 100% and more preferably 70% to 90%.

Here, a degree of neutralization refers to a ratio of the "number of anionic groups that are neutralized" to the sum of the number of "anionic groups that are not neutralized" (for example, a carboxy group) and the number of anionic groups that are neutralized (for example, a salt of a carboxy group) in the specific chain polymer contained in the ink (that is, a ratio [the number of anionic groups that are neutralized/(the number of anionic groups that are not neutralized+the number of anionic groups that are neutralized)]).

A degree of neutralization (%) of the specific chain polymer is measured by neutralization titration.

In the present specification, a degree of neutralization (%) of the specific chain polymer is obtained as below.

First, a water dispersion (for example, ink) of the specific particles including a specific chain polymer which is a measurement target is prepared.

Centrifugation is performed on 50 g of the prepared water dispersion under the conditions of 80,000 rpm (round per minute; the same is applied below) and 40 minutes. A supernatant obtained by the centrifugation is removed so as to collect a precipitate (specific particles).

About 0.5 g of the collected specific particles are weighed in a container 1, and a weighed value W1 (g) is recorded. Subsequently, a mixed solution of 54 mL of tetrahydrofuran (THF) and 6 mL of distilled water is added, and the weighed specific particles are diluted so as to obtain Neutralization Degree Measuring Sample 1.

Titration is performed on obtained Neutralization Degree Measuring Sample 1 by using a 0.1 N (=0.1 mol/L) sodium hydroxide aqueous solution as a titrant, and a required amount of titrant to an equivalent point is recorded as F1 (mL). In a case where a plurality of equivalent points are obtained in the titration, a value of the equivalent point at the maximum titration amount is used. Here, the "maximum titration amount F1 (mL)" corresponds to an amount of anionic groups that are not neutralized (for example, —COOH) among anionic groups included in the specific particles.

About 0.5 g of the collected specific particles were weighed in a container 2, and a weighed value W2 (g) was recorded. Subsequently, 60 mL of acetic acid is added, and the weighed specific particles are diluted so as to obtain Neutralization Degree Measuring Sample 2.

Titration is performed on obtained Neutralization Degree Measuring Sample 2 by using a 0.1 N (=0.1 mol/L) perchloric acid acetic acid solution as a titrant, and a required amount of titrant to an equivalent point is recorded as F2 (mL). In a case where a plurality of equivalent points are obtained in the titration, a value of the equivalent point at the maximum titration amount is used. Here, the "maximum titration amount F2 (mL)" corresponds to an amount of anionic groups that are neutralized (for example, —COONa) among anionic groups included in the specific particles.

The degree of neutralization (%) of anionic groups is obtained based on the measured values of "F1 (mL)" and "F2 (mL)" according to the following equation.

$F1$ (mL)×normality of sodium hydroxide aqueous solution (0.1 mol/L)/$W1$ (g)+$F2$ (mL)×normality of perchloric acid acetic acid solution (0.1 mol/L)/$W2$ (g)=total amount of anionic group included in specific particles (total amount of anionic groups that are neutralized and anionic groups that are not neutralized) (mmol/g)  (1)

$F2$ (mL)×normality of perchloric acid acetic acid solution (0.1 mol/L)/$W2$ (g)=amount of anionic groups that are neutralized among anionic groups included in specific particles (mmol/g)  (2)

Degree of neutralization (%)=(2)/(1)×100

The nonionic group as the hydrophilic group is preferably a group having a polyether structure and more preferably a monovalent group including a polyalkyleneoxy group.

—Structural Unit having Hydrophilic Group—

The specific chain polymer preferably includes a structural unit having a hydrophilic group.

The structural unit having a hydrophilic group is preferably formed by using a hydrophilic group introducing compound described below as a raw material.

The structural unit having a hydrophilic group is particularly preferably Structural Unit (3) below, which is a structural unit having an anion group.

(3)

In Structural Unit (3), $R^{X1}$ represents a hydrogen atom or an alkyl group having 1 to 10 carbon atoms, A represents an anionic group, and *3 represents a bonding position to a structural unit other than Structural Unit (3).

Here, the expression "*3 represents a bonding position to a structural unit other than Structural Unit (3)" means that Structural Units (3) are not directly bonding to each other in the specific chain polymer.

The structural unit other than Structural Unit (3) that is bonded at a position of *3 in Structural Unit (3) may be used singly or two or more kinds thereof may be used in combination.

The structural unit other than Structural Unit (3) is not particularly limited, but examples thereof include Structural Unit (1). In a case where the specific polymer includes a structural unit derived from an isocyanate compound other than Structural Unit (1), examples of the structural unit other than Structural Unit (3) include a structural unit derived from an isocyanate compound other than Structural Unit (1).

Examples of the anionic group represented by A are the same as the above anionic examples.

The anionic group represented by A is preferably a carboxy group or a salt of a carboxy group.

The specific chain polymer may include Structural Unit (3) in an aspect in which A is a carboxy group and Structural Unit (3) in an aspect in which A is a salt of a carboxy group.

The content of a structural unit (for example, Structural Unit (3)) having a hydrophilic group with respect to a total amount of the specific chain polymer is preferably 3 mass % to 30 mass % and more preferably 5 mass % to 20 mass %.

The content of the structural unit having an anionic group with respect to the total amount of the specific chain polymer may be adjusted by considering an acid value (mmol/g) of the specific chain polymer.

—Hydrophilic Group Introducing Compound—

The introduction of the hydrophilic group to the specific chain polymer can be performed by using a hydrophilic group introducing compound.

Among the hydrophilic group introducing compounds, examples of an anionic group introducing compound include amino acid such as α-amino acid (specifically, ricin, alanine, arginine, asparagine, aspartic acid, cysteine, glutamine, glutamic acid, glycine, histidine, isoleucine, leucine, methionine, phenylalanine, proline, serine, threonine, tryptophan, tyrosine, and valine).

Examples of an anionic group introducing compound include specific examples below in addition to the above α-amino acid.

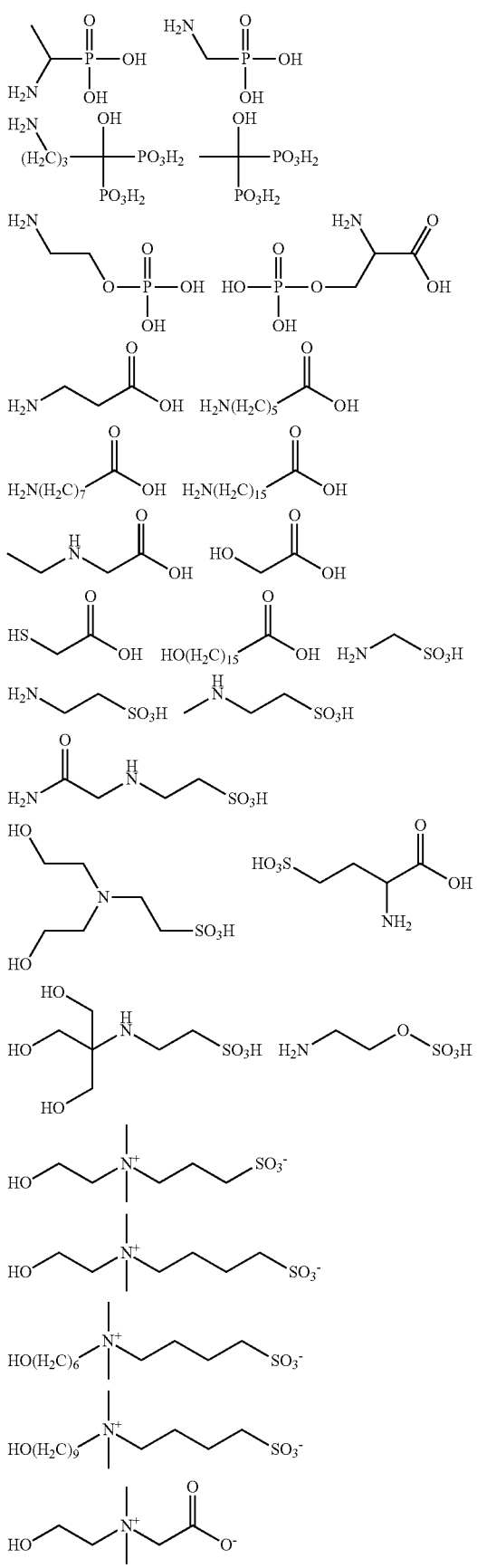
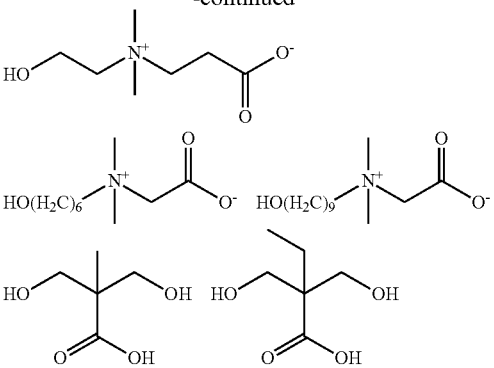

As the anionic group introducing compound, at least a portion of an anionic group may be neutralized by using an inorganic base such as sodium hydroxide and potassium hydroxide; and an organic base such as triethylamine.

Among the hydrophilic group introducing compound, the nonionic group introducing compound is preferably a compound having a polyether structure and more preferably a compound having a polyoxyalkylene group.

—Polymerizable Group Introducing Compound—

In a case where the specific chain polymer includes a polymerizable group, the introduction of the polymerizable group to the specific chain polymer can be performed by using a polymerizable group introducing compound.

As the polymerizable group introducing compound, a compound having a polymerizable group and an active hydrogen group can be used. Here, the active hydrogen group refers to a hydroxy group, an amino group, or a thiol group.

As the polymerizable group introducing compound, a compound having one or more polymerizable groups and two or more active hydrogen groups is preferably used.

The method of introducing a polymerizable group to a specific chain polymer is not particularly limited. However, in a case where the specific chain polymer is synthesized, a method of reacting the compound for forming Unit (1) (for example, a diisocyanate compound), the compound for forming Unit (2) (for example, a diol compound), and the polymerizable group introducing compound (a hydrophilic group introducing compound, if necessary) with each other is preferable.

As described above, in a case where at least one of the compound for forming Unit (1) or the compound for forming Unit (2) includes a polymerizable group, a compound including a polymerizable group among the at least one of the compound for forming Unit (1) or the compound for forming Unit (2) functions as a polymerizable group introducing compound.

In this case, as the method of introducing a polymerizable group to a specific chain polymer, a method of reacting the compound for forming Unit (1), the compound for forming Unit (2) (if necessary, a polymerizable group introducing compound that is not corresponding to the compound for forming Unit (1) and the compound for forming Unit (2) and/or a hydrophilic group introducing compound) in a case where a specific chain polymer is synthesized is preferable.

As the polymerizable group introducing compound, for example, compounds disclosed in paragraphs 0075 to 0089 of WO2016/052053A can be used.

As the polymerizable group introducing compound, a compound represented by Formula (ma) is preferable.

$$L^1Lc_mZ_n \quad \text{(ma)}$$

In Formula (ma), $L^1$ represents an m+n-valent linking group, m and n each independently represent an integer selected from 1 to 100, and Lc represents a monovalent ethylenically unsaturated group, and Z represents an active hydrogen group.

$L^1$ is preferably a divalent or greater valent aliphatic group, a divalent or greater valent aromatic group, a divalent or greater valent heterocyclic ring group, —O—, —S—, —NH—, —N<, —CO—, —SO—, —SO$_2$—, or a combination thereof.

m and n each independently and preferably represents 1 to 50, more preferably represents 2 to 20, even more preferably 3 to 10, and particularly preferably represents 3 to 5.

Examples of the monovalent ethylenically unsaturated group represented by Lc include an allyl group, a vinyl group, an acryloyl group, and a methacryloyl group.

Z is preferably OH, SH, NH, or NH$_2$, more preferably OH or NH$_2$, and even more preferably OH.

Examples of the polymerizable group introducing compound are provided below, but the invention is not limited to these structures. n in Compounds (ma-3) and (ma-12), for example, represents an integer selected from 1 to 90.

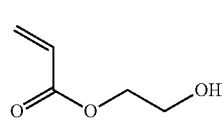
(ma-1)

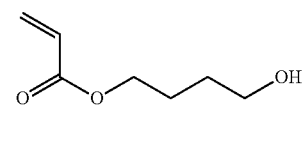
(ma-2)

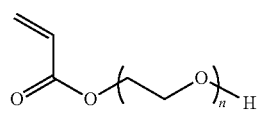
(ma-3)

(ma-4)

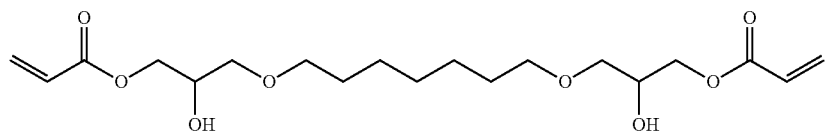
(ma-5)

DA-250

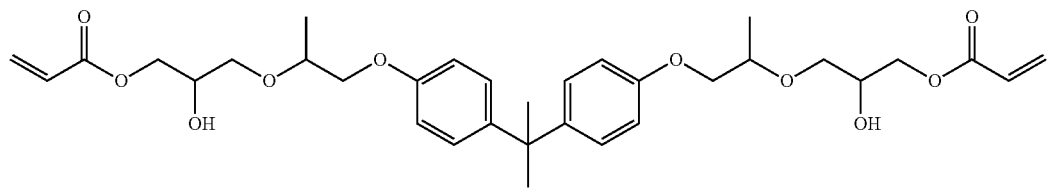
(ma-6)

DA-314  DA-911M

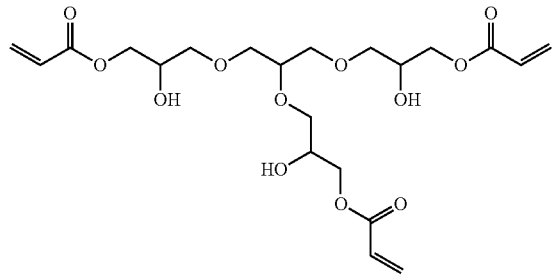
(ma-7)

DA-920

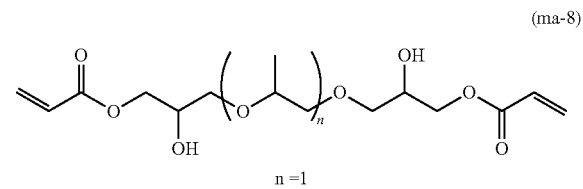
(ma-8)

n = 1

DA-931

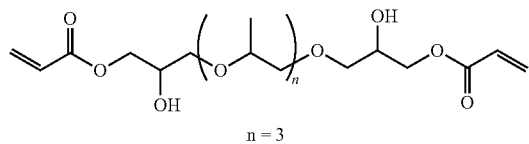
(ma-9)

n = 3

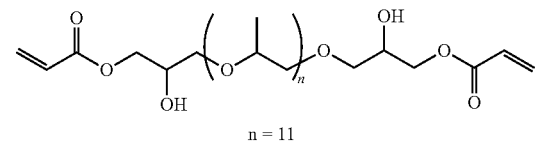
(ma-10)

n = 11

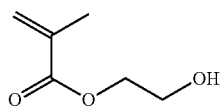
(ma-11)

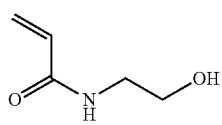
(ma-13)

SR399E

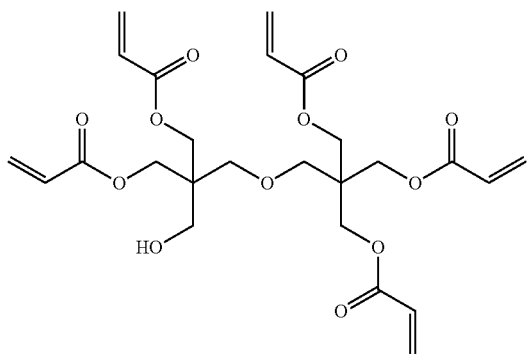
(ma-15)

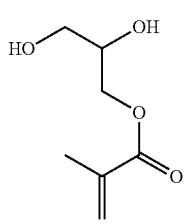
(ma-17)

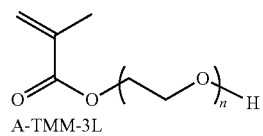
(ma-12)

A-TMM-3L

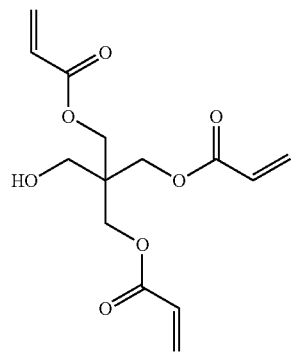
(ma-14)

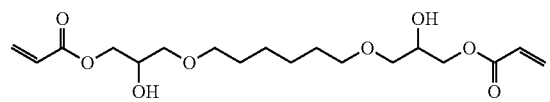
(ma-16)

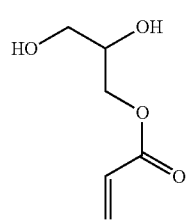
(ma-18)

The polymerizable group introducing monomer may be used singly or two or more kinds thereof may be used in combination.

In the manufacturing of an isocyanate compound to which a polymerizable group is introduced, polyisocyanate (that is, trifunctional or higher functional isocyanate compound) and a polymerizable group introducing monomer are preferably reacted with each other in a ratio in which the number of moles of the active hydrogen group of the polymerizable group introducing monomer is 0.01 times to 0.3 times (more preferably 0.02 times to 0.25 times, and even more preferably 0.03 times to 0.2 times) of the number of moles of the isocyanate group of polyisocyanate.

In view of dispersion stability (that is, dispersion stability of the specific particles) of the ink, a weight-average molecular weight of the chain polymer is preferably 5,000 to 150,000, more preferably 7,000 to 100,000, even more preferably 8,000 to 70,000, and particularly preferably 10,000 to 50,000.

In the present specification, the weight-average molecular weight (Mw) means a value measured by gel permeation chromatography (GPC).

In the measurement of Mw by gel permeation chromatography (GPC), HLC (registered trademark)-8020GPC (Tosoh Corporation) is used as a determination device, three items of TSKgel (registered trademark) Super Multipore HZ-H (4.6 mm ID×15 cm, Tosoh Corporation) are used as a column, and tetrahydrofuran (THF) is used as an eluant. As the conditions of the measurement, the sample concentration is 0.45 mass %, the flow rate is 0.35 ml/min, the sample injection amount is 10 μl, and the measurement temperature is 40° C., and the measurement is performed by using an RI detector.

The calibration curves are manufactured from eight samples of "Standard Sample TSK standard, polystyrene": "F-40", "F-20", "F-4", "F-1", "A-5000", "A-2500", "A-1000", and "n-propylbenzene" of Tosoh Corporation.

The content of the specific chain polymer is preferably 10 mass % or greater and more preferably 20 mass % or greater with respect to the solid content amount of the specific particles.

In a case where the content of the specific chain polymer is 10 mass % or greater with respect to the solid content amount of the specific particles, the dispersion stability of the ink (that is, the dispersion stability of the specific particles) is improved.

The content of the specific chain polymer may be 100 mass % with respect to the solid content amount of the specific particles, but is preferably 80 mass % or less, more preferably 70 mass % or less, and particularly preferably 50 mass % or less.

The specific particles may contain other polymers in addition to the specific chain polymer without deteriorating the effect of the ink of the present disclosure.

Examples of the other polymers include a chain polymer other than the specific chain polymer and a polymer having a three-dimensional crosslinked structure.

Here, in view of effectively exhibiting the effect of the ink of the present disclosure, the ratio of the specific chain polymer occupied in the entire polymer component of the specific particles is preferably 80 mass % to 100 mass %, more preferably 90 mass % to 100 mass %, even more preferably 95 mass % to 100 mass %, and ideally 100 mass %.

(Polymerizable Compound)

The specific particles preferably includes a polymerizable compound (for example, a photopolymerizable compound or a thermopolymerizable compound) as a compound having a polymerizable group (for example, a photopolymerizable group or a thermopolymerizable group). According to this aspect, the curing sensitivity of the image and the hardness of the film are improved.

In a case where the specific particles include a polymerizable compound, the polymerizable compound included in the specific particles may be used singly or two or more kinds thereof may be used in combination. In a case where the specific particles include a polymerizable compound, the polymerizable group of the polymerizable compound functions as the polymerizable group of the specific particles.

In an aspect in which the specific particles include a polymerizable compound, the specific chain polymer may have a polymerizable group.

As the polymerizable compound included in the specific particles, a compound disclosed in paragraphs 0097 to 0105 of WO2016/052053A may be used.

As the polymerizable compound that is included in the specific particles, a photopolymerizable compound that is polymerized due to the irradiation with light or a thermopolymerizable compound that is polymerized due to the heating or the irradiation with infrared rays is preferable. As the photopolymerizable compound, a radical polymerizable compound having an ethylenic double bond that can be radically polymerized is preferable.

A polymerizable compound that is included in the specific particles may be any one of a polymerizable monomer, a polymerizable oligomer, and a polymerizable polymer, but is preferably a polymerizable monomer in view of improvement of the curing sensitivity of the film and the hardness of the film. Among these, the more preferable polymerizable compound is a photopolymerizable monomer included in the concept of the photopolymerizable compound and a thermopolymerizable monomer included in the concept of the thermopolymerizable compound.

In a case where the specific particles include a photopolymerizable compound as the polymerizable compound, the specific particles preferably include photopolymerization initiators described below.

In a case where the specific particles include a thermopolymerizable compound as the polymerizable compound, it is preferable that the specific particles include a photothermal conversion agent, a thermal curing accelerator, or a photothermal conversion agent and a thermal curing accelerator described below.

The content (a total amount in a case where two or more kinds are included) of the polymerizable compound (preferably a polymerizable monomer; the same is applied below.) that is included in the specific particles is preferably 10 mass % to 90 mass %, more preferably 20 mass % to 80 mass %, and even more preferably 30 mass % to 70 mass % with respect to the solid content amount of the specific particles, in view of improving the curing sensitivity of the film and the hardness of the film.

In view of improving the adhesiveness of the image to the base material, at least one kind of polymerizable compound (for example, a photopolymerizable compound) included in the specific particles is preferably a polymerizable compound (hereinafter, also referred to as a "cyclic polymerizable compound") having a cyclic structure.

In view of improving the adhesiveness of the image to the base material, at least one kind of polymerizable compound (for example, photopolymerizable compounds) included in the specific particles is preferably a polymerizable compound (hereinafter, also referred to as a "difunctional or higher functional cyclic polymerizable compound") including one or more cyclic structures and two or more (meth) acryloyl groups in one molecule.

Examples of the difunctional or higher functional cyclic polymerizable compound include tricyclodecanedimethanol di(meth)acrylate, bisphenol A ethylene oxide (EO) adduct di(meth)acrylate, bisphenol A propylene oxide (PO) adduct di(meth)acrylate, ethoxylated bisphenol A di(meth)acrylate, alkoxylated dimethylol tricyclodecane di(meth)acrylate, alkoxylated cyclohexanone dimethanol di(meth)acrylate, and cyclohexanone dimethanol di(meth)acrylate.

In a case where the specific particles include a polymerizable compound, the ratio of the difunctional or higher functional cyclic polymerizable compound occupied in the entire polymerizable compound is preferably 10 mass % to 100 mass %, more preferably 30 mass % to 100 mass %, and particularly preferably 40 mass % to 100 mass %.

The specific particles may include a difunctional or less functional polymerizable compound (preferably a difunctional or less functional polymerizable monomer; the same is applied below.) and a trifunctional or higher functional polymerizable compound (preferably a trifunctional or higher functional polymerizable monomer; the same is applied below.).

In a case where the specific particles include a difunctional or less functional polymerizable compound and a trifunctional or higher functional polymerizable compound, a difunctional or less functional polymerizable compound contributes to the adhesiveness of the film to the base material and the trifunctional or higher functional polymerizable compound contributes to the improvement of the hardness of the film.

The molecular weight of the polymerizable compound as the weight-average molecular weight is preferably 100 to 100,000, more preferably 100 to 30,000, even more preferably 100 to 10,000, even more preferably 100 to 4,000, even more preferably 100 to 2,000, even more preferably 100 to 1,000, even more preferably 100 to 900, even more preferably 100 to 800, and particularly preferably 150 to 750.

The weight-average molecular weight of the polymerizable compound is a value measured by gel permeation chromatography (GPC). The measuring method is as described above.

—Polymerizable Monomer—

Examples of the polymerizable monomer that is included in the specific particles include a photopolymerizable monomer that is polymerized and cured by the irradiation with light and a thermopolymerizable monomer that is polymerized and cured by the heating and the irradiation with infrared rays.

In a case where a photopolymerizable monomer is included as the polymerizable compound, an aspect including photopolymerization initiators described below is preferable. In a case where the thermopolymerizable monomer is included as the polymerizable compound, an aspect including a photothermal conversion agent, a thermal curing accelerator, or a photothermal conversion agent and a thermal curing accelerator described below is preferable.

<Photopolymerizable Monomer>

The photopolymerizable monomer can be selected from a polymerizable monomer having a radically polymerizable ethylenically unsaturated bond (that is, a radical polymerizable monomer) and a polymerizable monomer having a cationically polymerizable cationic polymerizable group (that is, a cationic polymerizable monomer).

Examples of the radical polymerizable monomer include an acrylate compound, a methacrylate compound, a styrene compound, a vinyl naphthalene compound, an N-vinyl heterocyclic compound, unsaturated polyester, unsaturated polyether, unsaturated polyamide, and unsaturated urethane.

The radical polymerizable monomer is preferably a compound having an ethylenically unsaturated group.

In a case where the specific particles include a radical polymerizable monomer, the specific particles may include only one kind of radical polymerizable monomers and may include two or more kinds thereof.

Examples of the acrylate compound include a monofunctional acrylate compound such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate (PEA), bis(4-acryloxypolyethoxyphenyl) propane, oligoester acrylate, epoxy acrylate, isobornyl acrylate (IBOA), dicyclopentenyl acrylate, dicyclopentenyloxyethyl acrylate, dicyclopentanyl acrylate, cyclic trimethylolpropane formal acrylate, 2-(2-ethoxyethoxy) ethyl acrylate, 2-(2-vinyloxyethoxy) ethyl acrylate, octyl acrylate, decyl acrylate, isodecyl acrylate, lauryl acrylate, 3,3,5-trimethyl cyclohexyl acrylate, 4-t-butyl cyclohexyl acrylate, isoamyl acrylate, stearyl acrylate, isoamyl stearyl acrylate, isostearyl acrylate, 2-ethylhexyl diglycol acrylate, 2-hydroxybutyl acrylate, 2-acryloyloxyethylhydrophthate, ethoxydiethylene glycol acrylate, methoxydiethylene glycol acrylate, methoxy polyethylene glycol acrylate, methoxypropylene glycol acrylate, 2-hydroxy-3-phenoxypropyl acrylate, vinyl ether acrylate, 2-acryloyloxyethyl succinate, 2-acryloyloxyphthate, 2-acryloxyethyl-2-hydroxyethyl phthalate, lactone-modified acrylate, acryloyl morpholine, acrylamide, and substituted acrylamide (for example, N-methylol acrylamide, and diacetone acrylamide);

a difunctional acrylate compound such as polyethylene glycol diacrylate, polypropylene glycol diacrylate, polytetramethylene glycol diacrylate, 1,3-butylene glycol diacrylate, 1,4-butanediol diacrylate, 1,6-hexanediol diacrylate (HDDA), 1,9-nonanediol diacrylate (NDDA), 1,10-decanediol diacrylate (DDDA), 3-methyl pentanediol diacrylate (3MPDDA), neopentyl glycol diacrylate, tricyclodecanedimethanol diacrylate, bisphenol A ethylene oxide (EO) adduct diacrylate, bisphenol A propylene oxide (PO) adduct diacrylate, ethoxylated bisphenol A diacrylate, hydroxypineopentyl glycol diacrylate, propoxylated neopentyl glycol diacrylate, alkoxylated dimethylol tricyclodecane diacrylate, polytetramethylene glycol diacrylate, alkoxylated cyclohexanone dimethanol diacrylate, alkoxylated hexanediol diacrylate, dioxane glycol diacrylate, cyclohexanone dimethanol diacrylate, diethylene glycol diacrylate, neopentyl glycol diacrylate, tetraethylene glycol diacrylate, dipropylene glycol diacrylate, tripropylene glycol diacrylate (TPGDA), and neopentyl glycol propylene oxide adduct diacrylate; and a trifunctional or higher functional acrylate compound such as trimethylolpropane triacrylate, pentaerythritol triacrylate, dipentaerythritol tetraacrylate, ethoxylated isocyanuric acid triacrylate, ε-caprolactone-modified tris-(2-acryloxyethyl) isocyanurate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone-modified trimethylolpropane triacrylate, pentaerythritol tetraacrylate, pentaerythritol ethoxy tetraacrylate, glycerin propoxy triacrylate, ethoxylated dipentaerythritol hexaacrylate, caprolactam modified dipentaerythritol hexaacrylate, propoxylated glycerin triacrylate, ethoxylated trimethylolpropane triacrylate, and propoxylated trimethylolpropane triacrylate.

Examples of the methacrylate compound include a monofunctional methacrylate compound such as methyl methacrylate, n-butyl methacrylate, allyl methacrylate, glycidyl methacrylate, benzyl methacrylate, dimethylaminomethyl methacrylate, methoxy polyethylene glycol methacrylate, methoxytriethylene glycol methacrylate, hydroxyethyl methacrylate, phenoxyethyl methacrylate, and cyclohexyl methacrylate; and a difunctional methacrylate compound such as polyethylene glycol dimethacrylate, polypropylene glycol dimethacrylate, 2,2-bis(4-methacryloxypolyethoxyphenyl) propane, and tetraethylene glycol dimethacrylate.

Examples of the styrene compound include styrene, p-methylstyrene, p-methoxystyrene, β-methylstyrene, p-methyl-β-methylstyrene, α-methylstyrene, and p-methoxy-β-methylstyrene.

Examples of the vinyl naphthalene compound include 1-vinylnaphthalene, methyl-1-vinylnaphthalene, β-methyl-1-vinylnaphthalene, 4-methyl-1-vinylnaphthalene, and 4-methoxy-1-vinylnaphthalene.

Examples of the N-vinyl heterocyclic compound include N-vinylcarbazole, N-vinyl pyrrolidone, N-vinyl ethyl acetamide, N-vinylpyrrole, N-vinylphenothiazine, N-vinylacetanilide, N-vinyl ethyl acetamide, N-vinyl succinimide, N-vinyl phthalimide, N-vinyl caprolactam, and N-vinylimidazole.

Examples of the other radical polymerizable monomers include N-vinylamide such as allyl glycidyl ether, diallyl phthalate, triallyl trimellitate, and N-vinylformamide.

Among these radical polymerizable monomers, the difunctional or less functional radical polymerizable monomer is preferably at least one selected from 1,6-hexanediol diacrylate (HDDA), 1,9-nonanediol diacrylate (NDDA), 1,10-decanediol diacrylate (DDDA), 3-methyl pentanediol diacrylate (3MPDDA), neopentyl glycol diacrylate, tricyclodecanedimethanol diacrylate, diethylene glycol diacrylate, tetraethylene glycol diacrylate, dipropylene glycol diacrylate, tripropylene glycol diacrylate (TPGDA), cyclohexanone dimethanol diacrylate, alkoxylated hexanediol diacrylate, polyethylene glycol diacrylate, and polypropylene glycol diacrylate.

The trifunctional or higher functional radical polymerizable monomer is preferably at least one selected from trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone-modified trimethylolpropane triacrylate, pentaerythritol tetraacrylate, pentaerythritol ethoxytetraacrylate, glycerin propoxy triacrylate, ethoxylated dipentaerythritol hexaacrylate, caprolactam modified dipentaerythritol hexaacrylate, propoxylated glycerin triacrylate, ethoxylated trimethylolpropane triacrylate, and propoxylated trimethylolpropane triacrylate.

Examples of the combination of the difunctional or less functional radical polymerizable monomer and the trifunctional or higher functional radical polymerizable monomer include a combination of a difunctional acrylate compound and a trifunctional acrylate compound, a combination of a difunctional acrylate compound and a pentafunctional acrylate compound, and a combination of a monofunctional acrylate compound and a tetrafunctional acrylate compound.

The radical polymerizable monomer is preferably a monomer having a cyclic structure; more preferably a preferred compound group of difunctional or higher functional cyclic polymerizable compounds described above, cyclohexyl acrylate, tetrahydrofurfuryl acrylate, benzyl acrylate, isobornyl acrylate, dicyclopentenyl acrylate, dicyclopentenyloxyethyl acrylate, dicyclopentanyl acrylate, ethoxylated isocyanuric acid triacrylate, and ε-caprolactone-modified tris-(2-acryloxyethyl) isocyanurate; even more preferably a preferred compound group of difunctional or higher functional cyclic polymerizable compounds described above, dicyclopentenyl acrylate, dicyclopentenyloxyethyl acrylate, and dicyclopentanyl acrylate; and particularly preferably a preferred compound group of difunctional or higher functional cyclic polymerizable compounds described above.

In addition to the radical polymerizable monomers exemplified above, commercially available products disclosed in "Crosslinking Agent Handbook" edited by Shinzo Yamashita (1981, Taiseisha Ltd.); "UV-EB Curing Handbook (Raw Materials)" edited by Kiyomi Kato (1985, Kobunshi Kankokai), 79 pages of "Application of UV-EB Curing Technology and Market" edited by RadTech Japan, (1989, CMC Publishing Co., Ltd.); and "Polyester Resin Handbook" written by Eiichi Takiyama (1988, Nikkan Kogyo Shimbun, Ltd.) and radical-polymerizable or crosslinkable monomers, oligomers, and polymers well-known in the related art can be used.

Examples of the cationic polymerizable monomer include an epoxy compound, a vinyl ether compound, and an oxetane compound.

As the cationic polymerizable monomer, a compound having at least one of olefin, thioether, acetal, thioxane, thietan, aziridine, an N heterocyclic ring, an O heterocyclic ring, an S heterocyclic ring, a P heterocyclic ring, aldehyde, lactam, or a cyclic ester group is preferable.

As the cationic polymerizable monomer, compounds disclosed in "Advances in Polymer Science" of J. V. Crivello, et al., 62, pages 1 to 47 (1984), "Handbook of Epoxy Resins" of Lee, et al., McGraw Hill Book Company, New York (1967), and "Epoxy Resin Technology" of P. F. Bruins, (1968) may be used.

As the photopolymerizable monomer, photocurable polymerizable monomers used in the photopolymerizable composition disclosed in JP1995-159983A (JP-H07-159983A), JP1995-31399B (JP-H07-31399B), JP1996-224982A (JP-H08-224982A), JP1998-863A (JP-H10-863A), JP1997-134011A (JP-H09-134011A), JP2004-514014A are known, and these can be applied as the polymerizable monomer that is included in the specific particles.

As the photopolymerizable monomer, commercially available products on the market may be used.

Examples of the commercially available products of the photopolymerizable monomer include AH-600 (difunctional), AT-600 (difunctional), UA-306H (hexafunctional), UA-306T (hexafunctional), UA-306I (hexafunctional), UA-510H (decafunctional), UF-8001G (difunctional), DAUA-167 (difunctional), LIGHT ACRYLATE NPA (difunctional), and LIGHT ACRYLATE 3EG-A (difunctional) (above, KYOEISHA Chemical Co., Ltd.), SR339A (PEA, monofunctional), SR506 (IBOA, monofunctional), CD262 (difunctional), SR238 (HDDA, difunctional), SR341 (3MPDDA, difunctional), SR508 (difunctional), SR306H (difunctional), CD560 (difunctional), SR833S (difunctional), SR444 (trifunctional), SR454 (trifunctional), SR492 (trifunctional), SR499 (trifunctional), CD501 (trifunctional), SR502 (trifunctional), SR9020 (trifunctional), CD9021 (trifunctional), SR9035 (trifunctional), SR494 (tetrafunctional), and SR399E (pentafunctional) (above, Sartomer), A-NOD-N (NDDA, difunctional), A-DOD-N (DDDA, difunctional), A-200 (difunctional), APG-400 (difunctional), A-BPE-10 (difunctional), A-BPE-20 (difunctional), A-9300 (trifunctional), A-9300-1CL (trifunctional), A-TMPT (trifunctional), A-TMM-3L (trifunctional), A-TMMT (tetrafunctional), and AD-TMP (tetrafunctional) (above, Shin-Nakamura Chemical Co., Ltd.), UV-7510B (trifunctional) (The Nippon Synthetic Chemical Industry Co., Ltd.), and KAYARAD DPCA-30 (hexafunctional) and KAYARAD DPEA-12 (hexafunctional)(above, Nippon Kayaku Co., Ltd.).

As the polymerizable monomer, commercially available products of NPGPODA (neopentyl glycol propylene oxide adduct diacrylate), SR531, SR285, and SR256 (above, Sartomer), A-DHP (dipentaerythritol hexaacrylate, Shin-Nakamura Chemical Co., Ltd.), ARONIX (registered trademark) M-156 (Toagosei Co., Ltd.), V-CAP (BASF SE), and VISCOAT #192 (Osaka Organic Chemical Industry Ltd.) are suitably used.

Among these commercially available products, particularly, SR506, SR833S, A-9300, and A-9300-CL which are photopolymerizable monomers having a cyclic structure are preferable and SR833S is particularly preferable.

<Thermopolymerizable Monomer>

The thermopolymerizable monomer can be selected from the group consisting of polymerizable monomers that can be polymerized due to the heating or the irradiation with infrared rays. Examples of the thermopolymerizable monomer include compounds such as epoxy, oxetane, aziridine, azetidine, ketone, aldehyde, and blocked isocyanate.

Among the above, examples of the epoxy compound include a difunctional or less epoxy compound such as 1,4-butanediol diglycidyl ether, 3-(bis(glycidyloxymethyl)methoxy)-1,2-propanediol, limonene oxide, 2-biphenyl glycidyl ether, 3,4-epoxycyclohexylmethyl-3',4'-epoxycyclohexane carboxylate, epoxide-derived from epichlorohydrin-bisphenol S, epoxidized styrene, epoxide derived from epichlorohydrin-bisphenol F, epoxide derived from epichlorohydrin-bisphenol A, epoxidized novolac, and an alicyclic diepoxide; and a trifunctional or higher epoxy compound such as polyglycidyl ester of polybasic acid, polyglycidyl ether of polyol, polyglycidyl ether of polyoxyalkylene glycol, polyglycidyl ester of aromatic polyol, a urethane polyepoxy compound, and polyepoxy polybutadiene.

Examples of the oxetane compound include 3-ethyl-3-hydroxymethyl-1-oxetane, 1,4-bis[3-ethyl-3-oxetanylmethoxy) methyl] benzene, 3-ethyl-3-phenoxymethyl-oxetane, bis([1-ethyl (3-oxetanyl)] methyl) ether, 3-ethyl-3-[(2-ethylhexyloxy) methyl] oxetane, 3-ethyl-[(triethoxysilylpropoxy) methyl] oxetane, and 3,3-dimethyl-2-(p-methoxyphenyl)-oxetane.

Examples of the blocked isocyanate compound include a compound obtained by inactivating an isocyanate compound with a blocking agent (active hydrogen-containing compound).

Examples of the isocyanate compound include commercially available isocyanate such as hexamethylene diisocyanate, isophorone diisocyanate, toluyl diisocyanate, xylylene diisocyanate, hexamethylene diisocyanate trimer, trimethyl hexylene diisocyanate, diphenylmethane diisocyanate, dicyclohexylmethane diisocyanate, hydrogenated xylylene diisocyanate, TAKENATE (registered trademark; Mitsui Chemicals, Inc.), DURANATE (registered trademark; Asahi Kasei Corporation), and Bayhydur (registered trademark; Bayer AG), and a difunctional or higher isocyanate obtained by combining these are preferable.

Examples of the blocking agent include lactam [for example, ε-caprolactam, δ-valerolactam, and γ-butyrolactam], oxime [for example, acetooxime, methyl ethyl ketoxime (MEK oxime), methyl isobutyl ketoxime (MIBK oxime), and cyclohexanone oxime], amine [for example, aliphatic amine (dimethylamine, diisopropylamine, di-n-propylamine, diisobutylamine, and the like), alicyclic amine (methylhexylamine, dicyclohexylamine, and the like), and aromatic amine (aniline, diphenylamine, and the like)], aliphatic alcohol [for example, methanol, ethanol, 2-propanol, and n-butanol], phenol and alkyl phenol [for example, phenol, cresol, ethyl phenol, n-propyl phenol, isopropylphenol, n-butylphenol, octylphenol, nonylphenol, xylenol, diisopropyl phenol, and di-t-butylphenol], imidazole [for example, imidazole and 2-methylimidazole], pyrazole [for example, pyrazole, 3-methylpyrazole, and 3,5-dimethylpyrazole], imine [for example, ethyleneimine and polyethyleneimine], active methylene [for example, dimethyl malonate, diethyl malonate, diisopropyl malonate, acetylacetone, methyl acetoacetate, and ethyl acetoacetate], blocking agents described in JP2002-309217A and JP2008-239890A, and mixtures of two or more of these. Among these, the blocking agent is preferably oxime, lactam, pyrazole, active methylene, and amine.

As the blocked isocyanate compound, commercially available products on the market may be used. For example, Trixene (registered trademark) BI7982, BI7641, BI7642, BI7950, BI7960, and BI7991 (Baxenden Chemicals LTD), and Bayhydur (registered trademark; Bayer AG) are suitably used. A compound group disclosed in paragraph 0064 of WO2015/158654A is suitably used.

The specific particles including a polymerizable monomer can be manufactured, for example, by emulsifying a mixture obtained by mixing an oil phase component including a specific chain polymer and a polymerizable monomer with a water phase component.

The molecular weight of the polymerizable monomer as the weight-average molecular weight is preferably 100 to 4,000, more preferably 100 to 2,000, even more preferably 100 to 1,000, even more preferably 100 to 900, even more preferably 100 to 800, and particularly preferably 150 to 750.

The weight-average molecular weight of the polymerizable monomer is a value measured by gel permeation chromatography (GPC). The measuring method is as described above.

(Photopolymerization Initiator)

The specific particles may include at least one of photopolymerization initiators.

In a case where the polymerizable group of the specific particles is a photopolymerizable group (preferably a radical polymerizable group) (particularly, in a case where the specific particles include a photopolymerizable compound (even more preferably a radical polymerizable compound)), the specific particles preferably include at least one kind of photopolymerization initiator.

In a case where the specific particles include a photopolymerization initiator, an image in which sensitivity to active energy rays increases, hardness is excellent, and adhesiveness to a base material is excellent can be obtained.

Specifically, in a case where the specific particles include a photopolymerization initiator, one specific particle has both of the polymerizable group and the photopolymerization initiator. Therefore, since the distance between the polymerizable group and the photopolymerization initiator becomes short, the curing sensitivity of the film (hereinafter, simply referred to as "sensitivity") is improved compared with a case where a photocurable composition in the related art is used. As a result, a film in which the hardness is excellent and adhesiveness to the base material is excellent is formed.

In a case where the specific particles include a photopolymerization initiator, a photopolymerization initiator (for example, a photopolymerization initiator in which solubility to water is 1.0 mass % or less at 25° C.) which has high sensitivity but which has been hardly used due to low dispersibility to water and low solubility in the related art can be used. Accordingly, the selection of the photopolymerization initiator to be used is expanded, and thus the selection of the light source is also expanded. Therefore, curing sensitivity is improved than that in the related art.

Specific examples of the photopolymerization initiator which has high sensitivity but which has been hardly used due to low dispersibility to water and low solubility in the related art include a carbonyl compound and an acylphosphine oxide compound described below, and an acylphosphine oxide compound is preferable.

As described above, the ink of the present disclosure can be caused to be contained in the ink of the present disclosure which is an aqueous composition, by causing a material having low solubility to water to be included in the specific particles. This is also one of the advantages of the ink of the present disclosure.

The ink in an aspect in which the specific particles include a photopolymerization initiator has excellent preservation stability compared with the photocurable composition in the related art. It is considered that the reason is that, if the photopolymerization initiator is included in the specific particles, the aggregation or sedimentation of the photopolymerization initiator is suppressed.

As the photopolymerization initiator that is included in the specific particles, a well-known photopolymerization initiator can be suitably selected to be used.

The photopolymerization initiator is a compound that generates a radical which is a polymerization initiating species by absorbing light (that is, active energy rays).

As the photopolymerization initiator, a well-known compound can be used. However, preferable examples of the photopolymerization initiator include (a) a carbonyl compound such as aromatic ketone, (b) an acylphosphine oxide compound, (c) an aromatic onium salt compound, (d) organic peroxide, (e) a thio compound, (f) a hexaarylbiimidazole compound, (g) a ketoxime ester compound, (h) a borate compound, (i) an azinium compound, (j) a metallocene compounds, (e) an active ester compound, (1) a compound having a carbon halogen bond, and (m) an alkylamine compound.

As these photopolymerization initiators, the compounds of (a) to (m) may be used singly or two or more kinds thereof may be used in combination.

Preferable examples of (a) a carbonyl compound such as aromatic ketone, (b) an acylphosphine oxide compound, and (e) a thio compound include compounds having a benzophenone skeleton or a thioxanthone skeleton disclosed in pp. 77 to 117 of "RADIATION CURING IN POLYMER SCIENCE AND TECHNOLOGY", J. P. FOUASSIER, and J. F. RABEK (1993).

More preferable examples thereof include an α-thiobenzophenone compound disclosed in JP1972-6416B (JP-S47-6416B), a benzoin ether compound disclosed in JP1972-3981B (JP-S47-3981B), an α-substituted benzoin compound disclosed in JP1972-22326B (JP-S47-22326B), a benzoin derivative disclosed in JP1972-23664B (JP-S47-23664B), aroylphosphonic acid ester disclosed in JP1982-30704A (JP57-30704A), dialkoxybenzophenone disclosed in JP1985-26483B (JP-S60-26483B), benzoin ethers disclosed in JP1985-26403B (JP-S60-26403B) and JP1987-81345A (JP-S62-81345A), α-aminobenzophenones disclosed in JP1989-34242B (JP-H01-34242B), U.S. Pat. No. 4,318,791B, and EP0284561A1, p-di(dimethylaminobenzoyl) benzene disclosed in JP1990-211452A (JP-H02-211452A), thio-substituted aromatic ketone disclosed in JP1986-194062A (JP-S61-194062A), acylphosphine sulfide disclosed in JP1990-9597B (JP-H02-9597B), acylphosphine disclosed in JP1990-9596B (JP-H02-9596B), thioxanthones disclosed in JP1988-61950B (JP-S63-61950B), and coumarins disclosed in JP1984-42864B (JP-S59-42864B).

Polymerization initiators disclosed in JP2008-105379A or JP2009-114290A are also preferable.

Examples of the commercially available products of the photopolymerization initiator include IRGACURE (registered trademark) 184, 369, 500, 651, 819, 907, 1000, 1300, 1700, and 1870, DAROCUR (registered trademark) 1173, 2959, 4265, and ITX, LUCIRIN (registered trademark) TPO [above, all are manufactured by BASF SE], ESACURE (registered trademark) KT037, KT046, KIP150, and EDB [above, all are manufactured by The Lamberti Group], H-Nu (registered trademark) 470 and 470X [above, all are manufactured by Spectra Group Limited], Omnipol TX and 9210 [above, all are manufactured by IGM Resins B. V.], and SPEEDCURE 7005, 7010, and 7040 [above, manufactured by LAMBSON Ltd.].

Among these photopolymerization initiators, (a) a carbonyl compound such as aromatic ketone and (b) an acylphosphine oxide compound are more preferable, and specific examples thereof include bis(2,4,6-trimethylbenzoyl)-phenylphosphine oxide (for example, IRGACURE (registered trademark) 819 manufactured by BASF SE.), 2-(dimethylamine)-1-(4-morpholinophenyl)-2-benzyl-1-butanone (for example, IRGACURE (registered trademark) 369 manufactured by BASF SE.), 2-methyl-1-(4-methylthiophenyl)-2-morpholinopropan-1-one (for example, IRGACURE (registered trademark) 907 manufactured by BASF SE), 1-hydroxy-cyclohexyl-phenyl-ketone (for example, IRGACURE (registered trademark) 184 manufactured by BASF SE), 2,4,6-trimethylbenzoyl-diphenyl-phosphine oxide (for example, DAROCUR (registered trademark) TPO and LUCIRIN (registered trademark) TPO (both manufactured by BASF SE)).

Among these in view of sensitivity improvement and adaptability to LED light, an inclusion photopolymerization initiator is preferably (b) acylphosphine oxide compound and more preferably a monoacylphosphine oxide compound (particularly preferably, 2,4,6-trimethylbenzoyl-diphenylphosphine oxide) and a bisacylphosphine oxide compound (particularly preferably, bis(2,4,6-trimethylbenzoyl)-phenylphosphine oxide).

The wavelength of the LED light is preferably 355 nm, 365 nm, 385 nm, 395 nm, or 405 nm.

In view of migration suppression, as the photopolymerization initiator, a polymer-type photopolymerization initiator is also preferable.

Examples of the polymer-type photopolymerization initiator include Omnipol TX, 9210; and SPEEDCURE 7005, 7010, and 7040 described above.

The specific particles including a photopolymerization initiator can be manufactured, for example, by emulsifying a mixture obtained by mixing an oil phase component including a specific chain polymer and a photopolymerization initiator with a water phase component.

The content of the photopolymerization initiator is preferably 0.1 mass % to 25 mass %, more preferably 0.5 mass % to 20 mass %, and even more preferably 1 mass % to 15 mass % with respect to the solid content amount of the specific particles.

(Sensitizer)

The specific particles may include at least one kind of sensitizer.

In a case where the specific particles include at least one kind of photopolymerization initiators, the specific particles preferably include at least one kind of sensitizers.

In a case where the specific particles contains a sensitizer, the decomposition of the photopolymerization initiator due to the active energy ray irradiation can be promoted.

The sensitizer is a material that absorbs specific active energy rays and becomes an electron excited state. The sensitizer that becomes an electron excited state comes into contact with the photopolymerization initiator and generates actions such as the electron transfer, the energy transfer, and the heat generation. Accordingly, the chemical changes of the photopolymerization initiator, that is, decomposition and generation of radicals, acids, or bases are promoted.

Examples of the sensitizer include benzophenone, thioxanthone, isopropyl thioxanthone, anthraquinone, a 3-acylcoumarin derivative, terphenyl, styryl ketone, 3-(aroylmethylene) thiazoline, camphorquinone, eosin, rhodamine, and erythrosine.

As the sensitizer, a compound represented by Formula (i) disclosed in JP2010-24276A and a compound represented by Formula (I) disclosed in JP1994-107718A (JP-H06-107718A) can be suitably used.

Among these, in view of adaptability to LED light and reactivity with a photopolymerization initiator, the sensitizer is preferably at least one selected from thioxanthone, isopropyl thioxanthone, and benzophenone, more preferably at least one selected from thioxanthone and isopropyl thioxanthone, and even more preferably isopropyl thioxanthone.

In a case where the specific particles include a sensitizer, the sensitizer may be used singly and two or more kinds thereof may be used in combination.

In a case where the specific particles include a sensitizer, the content of the sensitizer is preferably 0.1 mass % to 20 mass %, more preferably 0.2 mass % to 15 mass %, and even more preferably 0.3 mass % to 10 mass % with respect to the solid content amount of the specific particles.

The specific particles including a photopolymerization initiator and a sensitizer can be manufactured, for example, by emulsifying a mixture obtained by mixing an oil phase component including a specific chain polymer, a photopolymerization initiator, and a sensitizer with a water phase component.

(Photothermal Conversion Agent)

In a case where the specific particles include a thermopolymerizable compound (preferably a thermopolymerizable monomer) as the polymerizable compound, the specific particles may include at least one kind of photothermal conversion agent.

The photothermal conversion agent is a compound that absorbs infrared rays, generates heat, polymerizes and cures a thermopolymerizable compound. As the photothermal conversion agent, well-known compounds can be used.

The photothermal conversion agent is preferably an infrared ray absorbing agent. Examples of the infrared ray absorbing agent include polymethylindolium, indian cyanine green, a polymethine coloring agent, a croconium coloring agent, a cyanine coloring agent, a merocyanine coloring agent, a squarylium coloring agent, a chalcogenopyrroylidylidene coloring agent, a metal thiolate complex coloring agent, a bis(chalcogenopyrylo) polymethine coloring agent, an oxyindolizine coloring agent, a bisaminoallyl polymethine coloring agent, an indolizine coloring agent, a pyrylium coloring agent, a quinoid coloring agent, a quinone coloring agent, a phthalocyanine coloring agent, a naphthalocyanine coloring agent, an azo coloring agent, an azomethine coloring agent, and carbon black.

The specific particles including the photothermal conversion agent, for example, by emulsifying a mixture obtained by mixing an oil phase component including a specific chain polymer and a photothermal conversion agent with a water phase component.

The photothermal conversion agent may be used singly and two or more kinds thereof may be used in combination.

The content of the photothermal conversion agent is preferably 0.1 mass % to 25 mass %, more preferably 0.5 mass % to 20 mass %, and even more preferably 1 mass % to 15 mass % with respect to the solid content amount of the specific particles.

(Thermal Curing Accelerator)

In a case where the specific particles include a thermopolymerizable compound (preferably a thermopolymerizable monomer) as the polymerizable compound, the specific particles may include at least one kind of thermal curing accelerator.

The thermal curing accelerator is a compound that catalytically promotes the thermal curing reaction of the thermopolymerizable compound (preferably a thermopolymerizable monomer).

As the thermal curing accelerator, a well-known compound can be used. The thermal curing accelerator is preferably a compound that generates an acid, a base, or an acid or a base by heating, and examples thereof include carboxylic acid, sulfonic acid, phosphoric acid, fatty alcohol, phenol, aliphatic amine, aromatic amine, imidazole (for example, phenyl imidazole, 2-methylimidazole), and pyrazole.

The specific particles including the thermal curing accelerator can be manufactured, for example, by emulsifying a mixture obtained by mixing an oil phase component including a specific chain polymer and a thermal curing accelerator with a water phase component.

The thermal curing accelerator may be used singly and two or more kinds thereof may be used in combination.

The content of the thermal curing accelerator is preferably 0.1 mass % to 25 mass %, more preferably 0.5 mass % to 20 mass %, and even more preferably 1 mass % to 15 mass % with respect to the solid content amount of the specific particles.

In the ink of the present disclosure, the solid content amount of the specific particles is preferably 50 mass % or greater, more preferably 60 mass % or greater, even more preferably 70 mass % or greater, even more preferably 80 mass % or greater, and even more preferably 85 mass % or greater with respect to the solid content amount of the ink.

Accordingly, the dispersion stability is improved, and adhesiveness between the image and the base material is improved.

In the ink of the present disclosure, the solid content amount of the specific particles is preferably 1 mass % to 50 mass %, more preferably 3 mass % to 40 mass %, and even more preferably 5 mass % to 30 mass % with respect to the total amount of the ink.

In a case where the solid content amount of the specific particles is 1 mass % or greater with respect to the total amount of the ink, the adhesiveness between the image and the base material is improved.

In a case where the solid content amount of the specific particles is 50 mass % or less with respect to the total amount of the ink, the dispersion stability of the ink is improved.

The volume-average dispersed particle diameter of the specific particles is not particularly limited. However, in view of dispersion stability, the volume-average dispersed particle diameter is preferably 0.01 µm to 10.0 µm, more preferably 0.01 µm to 5 µm, even more preferably 0.05 µm to 1 µm, even more preferably 0.05 µm to 0.5 µm, and even more preferably 0.05 µm to 0.3 µm.

In the present specification, the expression "volume-average dispersed particle diameter" refers to a value measured by a light scattering method. The measuring of the volume-average dispersed particle diameter of the specific particles by the light scattering method is performed by using, for example, LA-960 (Horiba, Ltd.).

<Water>

The ink of the present disclosure contains water.

Water is a dispersion medium to specific particles (dispersoid).

The content of water in the ink of the present disclosure is not particularly limited. However, the content of water is preferably 10 mass % to 99 mass %, more preferably 20 mass % to 95 mass %, even more preferably 30 mass % to 90 mass %, and particularly preferably 50 mass % to 90 mass % with respect to the total amount of the ink.

<Coloring Material>

The ink of the present disclosure may be ink (so-called "coloration ink") containing at least one kind of coloring material and may be ink (so-called "clear ink") not containing a coloring material.

In a case where the ink contains a coloring material, the coloring material is preferably contained outside the specific particles (that is, the specific particles do not include a coloring material).

The coloring material is not particularly limited and arbitrarily selected from well-known coloring materials such as a pigment, a water-soluble dye, and a dispersed dye.

Among these, in view of excellent weather fastness and rich color reproducibility, it is more preferable to include a pigment.

The pigment is not particularly limited, and can be appropriately selected according to the purpose thereof. Examples thereof include well-known organic pigments and well-known inorganic pigments, and examples thereof include resin particles dyed with dyes, commercially available pigment dispersions, and surface-treated pigments (for example, a pigment obtained by dispersing a pigment in water, a liquid compound, an insoluble resin or the like as a dispersion medium, or a pigment obtained by treating the surface of a pigment with a resin or a pigment derivative).

Examples of the organic pigment and the inorganic pigment include a yellow pigment, a red pigment, a magenta pigment, a blue pigment, a cyan pigment, a green pigment, an orange pigment, a purple pigment, a brown pigment, a black pigment, and a white pigment.

In a case where the pigment is used as the coloring material, a pigment dispersing agent may be used, if necessary.

In a case where the pigment is used as the coloring material, a self-dispersible pigment having a hydrophilic group on the pigment particle surface may be used as the pigment.

With respect to the coloring material and the pigment dispersing agent, paragraphs 0180 to 0200 of JP2014-040529A and paragraphs 0122 to 0129 of WO2016/052053A can be suitably referred to.

In a case where the ink of the present disclosure contains the coloring material, the content of the coloring material is preferably 0.1 mass % to 20 mass %, more preferably 0.5 mass % to 10 mass %, and particularly preferably 0.5 mass % to 5 mass % with respect to the ink total amount.

<Other Components>

The ink of the present disclosure may contain other components in addition to those described above, if necessary.

The other components may be included in the specific particles or may not be included in the specific particles.

(Organic Solvent)

The ink of the present disclosure may contain an organic solvent.

In a case where the ink of the present disclosure contains an organic solvent, the adhesiveness between the image and the base material can be improved.

In a case where the ink of the present disclosure contains an organic solvent, the content of the organic solvent is preferably 0.1 mass % to 10 mass % and more preferably 0.1 mass % to 5 mass % with respect to the total amount of the ink.

Specific examples of the organic solvent are as below.

Alcohols (for example, methanol, ethanol, propanol, isopropanol, butanol, isobutanol, secondary butanol, tertiary butanol, pentanol, hexanol, cyclohexanol, and benzyl alcohol), Polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexane triol, thiodiglycol, and 2-methylpropane diol), Polyhydric alcohol ethers (for example, ethylene glycol monomethyl ether, ethylene glycol monoethyl ether, ethylene glycol monobutyl ether, diethylene glycol monoethyl ether, diethylene glycol monoethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether), Amines (for example, ethanolamine, diethanolamine, triethanolamine, N-methyldiethanolamine, N-ethyldiethanolamine, morpholine, N-ethyl morpholine, ethylenediamine, diethylenediamine, triethylenetetramine, tetraethylenepentamine, polyethyleneimine, pentamethyldiethylenetriamine, and tetramethylpropylenediamine), Amides (for example, formamide, N,N-dimethylformamide, and N,N-dimethylacetamide), Heterocyclic rings (for example, 2-pyrrolidone, N-methyl-2-pyrrolidone, cyclohexyl pyrrolidone, 2-oxazolidone, 1,3-dimethyl-2-imidazolidinone, and γ-butyrolactone), Sulfoxides (for example, dimethyl sulfoxide), Sulfones (for example, sulfolane), and Others (urea, acetonitrile, and acetone)

(Surfactant)

The ink of the present disclosure may contain at least one kind of surfactant.

In a case where the ink of the present disclosure contains the surfactant, wettability of the ink to the base material is improved.

Examples of the surfactant include higher fatty acid salt, alkyl sulfate, alkyl ester sulfate, alkyl sulfonate, alkyl benzene sulfonate, sulfosuccinate, naphthalene sulfonate, alkyl phosphate, polyoxyalkylene alkyl ether phosphate, polyoxyalkylene alkyl phenyl ether, polyoxyethylene polyoxypropylene glycol, glycerin ester, sorbitan ester, polyoxyethylene fatty acid amide, and amine oxide.

Among these, the surfactant is preferably at least one kind of surfactant selected from alkyl sulfate, alkyl sulfonate, and alkyl benzene sulfonate and is particularly preferably alkyl sulfate.

In view of dispersibility of the specific particles, the surfactant is preferably alkyl sulfate having alkyl chain length of 8 to 18 and more preferably at least one selected from sodium dodecyl sulfate (SDS, alkyl chain length: 12) and sodium cetyl sulfate (SCS, alkyl chain length: 16).

Examples of the other surfactant in addition to the surfactant described above include those disclosed in JP1987-173463A (JP-S62-173463A) and JP1987-183457A (JP-S62-183457A). Examples of the other surfactant include nonionic surfactants such as polyoxyethylene alkyl ethers, polyoxyethylene alkyl allyl ethers, acetylene glycols, polyoxyethylene/polyoxypropylene block copolymers, and siloxanes.

Examples of the surfactant include organofluoro compounds.

The organofluoro compound is preferably hydrophobic. Examples of the organofluoro compound include a fluorine-containing surfactant, an oily fluorine compound (for example, fluorine oil), and a solid-like fluorine compound resin (for example, a tetrafluoroethylene resin), and include those disclosed in (columns 8 to 17) of JP1982-9053B (JP-S57-9053B), and JP1987-135826A (JP-S62-135826A).

The ink of the present disclosure may not substantially contain a surfactant (for example, an anionic surfactant) in order to contain specific particles which are excellent in dispersion stability.

Here, the expression "do not substantially contain a surfactant" indicates that the content is less than 1 mass % with respect to the total amount of the ink (preferably less than 0.1 mass %).

The aspect in which the ink does not substantially contain an anionic surfactant has the advantage of suppressing foaming of ink, the advantage of improving the water resistance of an image, and the advantage of suppressing whitening due to bleed-out after image formation. Particularly, in a case where a pigment dispersion having an anionic dispersible group is used for preparation of ink, there is an advantage of increasing the ionic concentration in the system by the anionic surfactant, decreasing the ionization degree of the anionic pigment dispersant, and suppressing the decrease of the dispersibility of the pigment.

(Polymerization Inhibitor)

The ink of the present disclosure may contain a polymerization inhibitor.

In a case where the ink of the present disclosure contains a polymerization inhibitor, the preservation stability of the ink can be improved.

Examples of the polymerization inhibitor include p-methoxyphenol, quinones (for example, hydroquinone, benzoquinone, and methoxybenzoquinone), phenothiazine, catechols, alkylphenols (for example, dibutyl hydroxy toluene (BHT)), alkyl bisphenols, zinc dimethyldithiocarbamate, copper dimethyldithiocarbamate, copper dibutyldithiocarbamate, copper salicylate, thiodipropionic acid esters, mercaptobenzimidazole, phosphites, 2,2,6,6-tetramethylpiperidine-1-oxyl (TEMPO), 2,2,6,6-tetramethyl-4-hydroxypiperidine-1-oxyl (TEMPOL), cupferron Al, and tris(N-nitroso-N-phenylhydroxylamine) aluminum salt.

Among these, at least one selected from p-methoxyphenol, catechols, quinones, alkylphenols, TEMPO, TEMPOL, cupferron Al, and tris(N-nitroso-N-phenylhydroxylamine) aluminum salt is preferable, and at least one selected from p-methoxyphenol, hydroquinone, benzoquinone, BHT, TEMPO, TEMPOL, cupferron Al, and tris(N-nitroso-N-phenylhydroxylamine) aluminum salt is more preferable.

(Ultraviolet Absorbing Agent)

The ink of the present disclosure may contain a ultraviolet absorbing agent.

In a case where the ink of the present disclosure contains a ultraviolet absorbing agent, the weather fastness of the image can be improved.

Examples of the ultraviolet absorbing agent include a well-known ultraviolet absorbing agent, for example, a benzotriazole-based compound, a benzophenone compound, a triazine compound, and a benzoxazole compound.

In view of the hardness of an image, the adhesiveness between an image and a base material, and the jettability control of the ink, the ink of the present disclosure may contain a polymerizable compound, a photopolymerization initiator, and a resin outside the specific particles, if necessary.

These components preferably have water solubility or water dispersibility.

Here, the expression "water solubility" indicates properties in which the dissolution amount with respect to 100 g of distilled water at 25° C. exceeds 1 g, in a case where drying is performed at 105° C. for two hours.

The expression "water dispersibility" indicate properties of water insoluble and dispersible in water. Here, the expression "water insoluble" indicates properties in which the dissolution amount with respect to 100 g of distilled water at 25° C. is 1 g or less, in a case where drying is performed at 105° C. for two hours.

The expression "ink contains a polymerizable compound outside specific particles" means that the ink contains a polymerizable compound that is not included in specific particles. The same is applied in a case where a photopolymerization initiator, a water-soluble resin, and a water dispersibility resin are contained outside specific particles.

Examples of the polymerizable compound contained outside the specific particles include polymerizable compounds in paragraphs 0148 to 0156 of WO2016/052053A.

Examples of the polymerizable compound that is contained outside the specific particles include a compound having an ethylenically unsaturated group and a radical polymerizable compound such as acrylonitrile, styrene, unsaturated polyester, unsaturated polyether, unsaturated polyamide, and unsaturated urethane.

Among these, the polymerizable compound that is contained outside the specific particles is preferably a compound having an ethylenically unsaturated group and particularly preferably a compound having a (meth)acryloyl group.

In view of the water solubility or the water dispersibility, the polymerizable compound that is contained outside the specific particles is preferably a compound having at least one selected from the group consisting of an amide structure, a polyethylene glycol structure, a polypropylene glycol structure, a carboxyl group, and a salt of a carboxy group.

In view of the water solubility or the water dispersibility, the polymerizable compound that is contained outside the specific particles is preferably at least one selected from (meth)acrylate, sodium (meth)acrylate, potassium (meth)acrylate, N,N-dimethylacrylamide, N,N-diethylacrylamide, morpholine acrylamide, N-2-hydroxyethyl (meth)acrylamide, N-vinyl pyrrolidone, N-vinyl caprolactam, 2-hydroxyethyl (meth)acrylate, 3-hydroxypropyl (meth)acrylate, 2-hydroxypropyl (meth)acrylate, glycerin monomethacrylate, N-[tris(3-acryloylaminopropyloxymethylene) methyl] acrylamide, diethylene glycol bis(3-acryloylaminoproyl) ether, polyethylene glycol di(meth)acrylate, polypropylene glycol di(meth)acrylate, compounds represented by Formulae (a) to (d), and ethoxylated trimethylolpropane triacrylate (for example, SR9035 manufactured by Sartomer) and more preferably at least one selected from (meth)acrylate, N,N-dimethylacrylamide, N-2-hydroxyethyl (meth)acrylamide, 2-hydroxyethyl (meth)acrylate, glycerin monomethacrylate, N-[tris(3-acryloylaminopropyloxymethylene) methyl] acrylamide, diethylene glycol bis(3-acryloylaminoproyl) ether, polyethylene glycol di(meth)acrylate, polypropylene glycol di(meth)acrylate, compounds represented by Formulae (a) to (d), and ethoxylated trimethylolpropane triacrylate (for example, SR9035 manufactured by Sartomer).

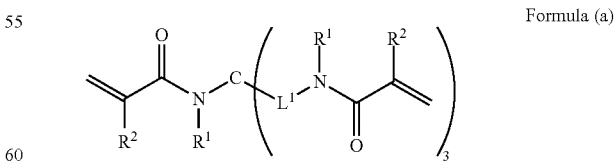

Formula (a)

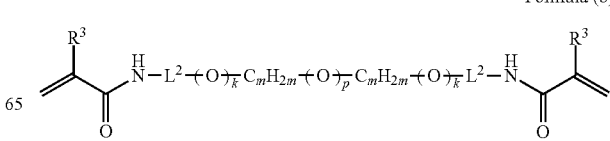

Formula (b)

Formula (c)

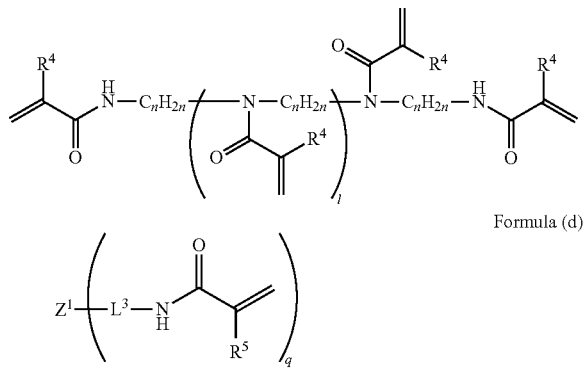

Formula (d)

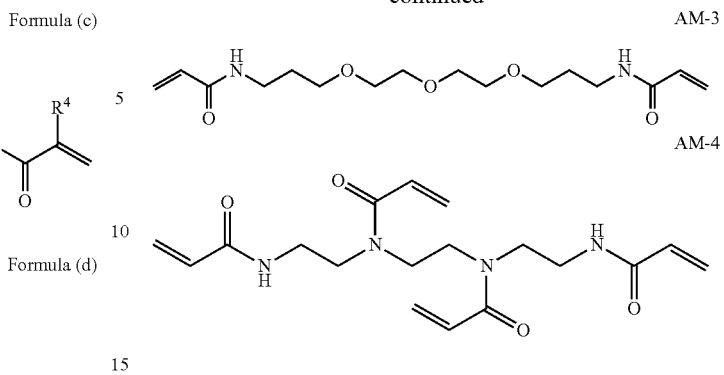

In Formula (a), a plurality of $R^1$'s each independently represent a hydrogen atom, an alkyl group, an aryl group, or a heterocyclic ring group, a plurality of $R^2$'s each independently represent a hydrogen atom or a methyl group, and a plurality of $L^1$ each independently represent a single bond or a divalent linking group.

In Formula (b), a plurality of $R^3$'s each independently represent a hydrogen atom or a methyl group, a plurality of $L^2$'s each independently represent an alkylene group having 1 to 8 carbon atoms, a plurality of k's and p's each independently represent 0 or 1, and a plurality of m's each independently an integer of 0 to 8, and, here, at least one of k's or p's is 1.

In Formula (c), a plurality of $R^4$'s each independently represent a hydrogen atom or a methyl group, a plurality of n's each independently an integer of 1 to 8, and l represents an integer of 0 or 1.

In Formula (d), $Z^1$ represents a residue obtained by removing q hydrogen atoms from a hydroxyl group of polyol, q represents an integer of 3 to 6, a plurality of $R^5$'s each independently represent a hydrogen atom or a methyl group, and a plurality of $L^3$'s each independently represent an alkylene group having 1 to 8 carbon atoms.

The specific examples of the compound represented by Formulae (a) to (d) include compounds represented by AM-1 to AM-4.

AM-1

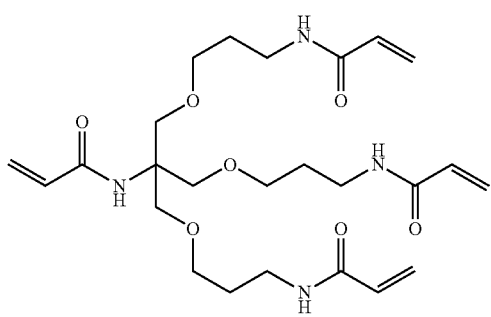

AM-2

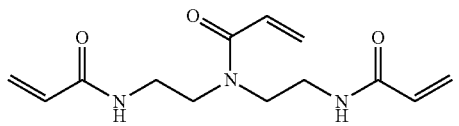

AM-3

AM-4

AM-1 to AM-4 can be synthesized by a method disclosed in JP5591858B.

With respect to the photopolymerization initiator and the resin that are contained outside the specific resin, paragraphs 0139 to 0147 and 0157 of WO2016/052053A are suitably referred to.

<Preferable Physical Properties of Ink>

In a case where the ink is at 25° C. to 50° C., the viscosity of the ink of the present disclosure is preferably 3 mPa·s to 15 mPa·s and more preferably 3 mPa·s to 13 mPa·s. Particularly, the viscosity of the ink of the present disclosure in a case where the ink is at 25° C. is preferably 50 mPa·s or less. In a case where the viscosity of the ink, higher jettability can be realized.

The viscosity of the ink is a value measured by using a viscometer (VISCOMETER TV-22, Toki Sangyo Co., Ltd.).

<Preferable Method of Manufacturing Ink (Manufacturing Method A)>

The method of manufacturing the ink of the present disclosure is not particularly limited, but Manufacturing Method A is suitable.

That is, the suitable method (hereinafter, also referred to as a "manufacturing method of the present disclosure") of manufacturing the ink of the present disclosure has a step of mixing an oil phase component including an organic solvent and a specific chain polymer with a water phase component including water, performing emulsification, and forming specific particles.

As the oil phase component, an oil phase component including a specific chain polymer having a polymerizable group and an organic solvent or an oil phase component including a specific chain polymer that does not have a polymerizable group, an organic solvent and a polymerizable compound is used.

The oil phase component including a specific chain polymer having a polymerizable group and an organic solvent may include a polymerizable compound or may not include a polymerizable compound.

As the oil phase component, an oil phase component including a specific chain polymer having a photopolymerizable group, an organic solvent, and a photopolymerization initiator (and a photopolymerizable compound, if necessary), an oil phase component including a specific chain polymer that does not have a polymerizable group, an organic solvent, a photopolymerizable compound, and a photopolymerization initiator, and an oil phase component including a specific chain polymer having a thermopolymerizable group and an organic solvent (and, thermal curing accelerator, if necessary), or an oil phase component including a specific chain polymer that does not have a polymerizable group, an organic solvent, and a thermopolymerizable compound (and a thermal curing accelerator, if necessary) is preferably used.

In the step of forming specific particles, specific particles are formed by mixing the oil phase component described above and a water phase component and emulsifying the obtained mixture. The formed specific particles functions as a dispersoid in the manufactured ink.

Water in the water phase component functions as a dispersion medium in the manufactured ink.

Examples of the organic solvent included in the oil phase component include ethyl acetate and methyl ethyl ketone.

In the course of forming the specific particles and after the forming of the specific particles, at least portion of the organic solvent is preferably removed.

The oil phase component can include respective components described in the section of "ink".

A preferable aspect of the respective components in the oil phase component is as described in the section of "ink".

The respective components in the oil phase component may be simply mixed, or all of the components are simultaneously mixed, or the respective components may be mixed in several portions.

The water phase component is not particularly limited, as long as the water phase component includes water, and the water phase component may be only water.

At least one of the oil phase component or the water phase component contains a basic compound, as a neutralizing agent with respect to an anionic group that is not neutralized (such as a carboxy group, a sulfo group, a phosphate group, a phosphonic acid group, and a sulfate group). Accordingly, in the course of the forming of the specific particles, the neutralized anionic group (that is, an anionic group in the form of a salt; for example, a salt of a carboxy group, a salt of a sulfo group, a salt of a phosphate group, a salt of a phosphonic acid group, and a salt of a sulfate group) can be formed.

In a case where the basic compound (neutralizing agent) is used, the basic compound (neutralizing agent) preferably contains at least the water phase component.

Examples of the basic compound include an inorganic base such as sodium hydroxide and potassium hydroxide, and an organic base such as triethylamine. Among these, the basic compound is preferably an inorganic salt group such as sodium hydroxide and potassium hydroxide.

Examples of the salt in an anionic group which is a form of a salt include an alkali metal salt such as sodium salt and potassium salt; and an organic amine salt such as triethylamine salt. Among these, the salt in an anionic group which is a form of a salt is preferably alkali metal salt such as sodium salt and potassium salt.

A total amount obtained by removing an organic solvent and water from the oil phase component and the water phase component in the manufacturing method of the present disclosure corresponds to a solid content amount of the specific particles in the manufactured ink.

With respect to the preferable range of the used amount of the respective components that are used in the manufacturing method of the present disclosure, the section of "ink" described above can be referred to. In a case of reference, in the section of "ink" described above, the "content" and the "solid content amount of the specific particles" are respectively substituted to the "used amount" and the "total amount obtained by removing an organic solvent and water from the oil phase component and the water phase component".

In the step of forming the specific particles, the method of mixing the oil phase component with the water phase component is not particularly limited, but examples thereof include mixing by stirring.

In the step of forming the specific particles, the emulsifying method is not particularly limited, but examples thereof include emulsification by an emulsifying device such as a homogenizer (for example, a dispersing machine).

The rotation speed of the dispersing machine in the emulsification is, for example, 5,000 rpm to 20,000 rpm and preferably 10,000 rpm to 15,000 rpm.

The rotation time in the emulsification is, for example, 1 minute to 120 minutes, preferably 3 minutes to 60 minutes, more preferably 3 minutes to 30 minutes, and even more preferably 5 minutes to 15 minutes.

The emulsification in the step of forming the specific particles may be performed under heating.

The specific particles can be effectively formed by performing emulsification under heating.

At least a portion of the organic solvent in the oil phase component is easily removed from the mixture by performing emulsification under heating.

The heating temperature in the case of performing emulsification under heating is preferably 35° C. to 70° C. and more preferably 40° C. to 60° C.

The step of forming the specific particles may include an emulsifying step of emulsifying a mixture (for example, in the temperature of less than 35° C.) and a heating step of heating emulsion (for example, in the temperature of 35° C. or higher) obtained in the emulsifying step.

In the aspect of including an emulsifying step and a heating step, particularly in the heating step, the specific particles can be effectively formed.

In an aspect of including an emulsifying step and a heating step, particularly in the heating step, at least a portion of the organic solvent in the oil phase component is easily removed from the mixture.

The heating temperature in the heating step is preferably 35° C. to 70° C. and more preferably 40° C. to 60° C.

The heating time in the heating step preferably six hours to 50 hours, more preferably 12 hours to 40 hours, and even more preferably 15 hours to 35 hours.

The manufacturing method of the present disclosure may have other steps in addition to the step of forming the specific particles, if necessary.

Examples of the other step include a step of adding other components (pigments and the like) after the step of forming the specific particles.

The other added components (pigments and the like) are as described as the other components that are contained in the ink.

[Image Forming Method]

The image forming method of the present disclosure includes a step (hereinafter, also referred to as an "applying step") of applying the ink of the present disclosure described above to a base material by an ink jet method and a step (hereinafter, also referred to as a "curing step") of curing an ink jet ink composition applied to the base material.

The image forming method of the present disclosure may have other steps, if necessary.

According to the image forming method of the present disclosure, an image which is excellent in the adhesiveness to a base material is formed on the base material. This image is also excellent in hardness.

(Applying Step)

The applying step is a step of applying the ink of the present disclosure to the base material by the ink jet method. As the base material, a plastic base material described above can be used.

The application of the ink by the ink jet method can be performed by using a well-known ink jet recording device.

The ink jet recording device is not particularly limited, and a well-known ink jet recording device that can achieve the desired resolution can be arbitrarily selected to be used.

Examples of the ink jet recording device include an ink supply system, a temperature sensor, and a device with heating means.

The ink supply system includes, for example, a source tank including the ink of the present disclosure, a supply pipe, an ink supply tank immediately before an ink jet head, a filter, and a piezo type ink jet head. The piezo type ink jet head can be derived so as to ejecting multisize dots of preferably 1 pl to 100 pl and more preferably 8 pl to 30 pl, in the resolution of preferably 320 dot per inch (dpi)×320 dpi to 4,000 dpi×4,000 dot per inch (dpi), more preferably 400 dpi×400 dpi to 1,600 dpi×1,600 dpi, and even more preferably 720 dpi×720 dpi. dpi represents the number of dots per 2.54 cm (1 inch).

(Curing Step)

The curing step is a curing step of curing ink applied to a base material.

The crosslinking reaction (that is, polymerization reaction) of the specific particles proceeds in this curing step, and thus the adhesiveness between the image and the base material and the hardness of the image can be improved.

With respect to the curing step, in a case where the ink includes a photopolymerizable compound (and, preferably a photopolymerization initiator), a curing step (hereinafter, Curing Step A) of curing ink by irradiation with active energy rays (light) is preferable, and in a case where ink includes a thermopolymerizable compound, a curing step (hereinafter, Curing Step B) of curing ink by performing heating or irradiation with infrared rays is preferable.

—Curing Step A—

Curing Step A is a step of curing ink by irradiating the ink applied to the base material with active energy rays.

In Curing Step A, in a case where the ink applied to the base material is irradiated with the active energy rays, photocrosslinking reaction (that is, photopolymerization reaction) of the specific particles in the ink proceeds, and thus the adhesiveness between the image and the base material and the hardness of the image can be improved.

Examples of the active energy rays that is used in Curing Step A include ultraviolet rays (UV light), visible rays, and electron beams. Among these, UV light is preferable.

The peak wavelength of the active energy rays (light) is preferably 200 nm to 405 nm, more preferably 220 nm to 390 nm, and even more preferably 220 nm to 385 nm.

The peak wavelength is preferably 200 nm to 310 nm and more preferably 200 nm to 280 nm.

Exposure surface illuminance in a case where irradiation with active energy rays (light) is performed is, for example, 10 mW/cm$^2$ to 2,000 mW/cm$^2$ and preferably 20 mW/cm$^2$ to 1,000 mW/cm$^2$.

As the source of generating the active energy rays (light), a mercury lamp, a metal halide lamp, a UV fluorescence lamp, gas laser, solid state laser, and the like are widely known.

Replacement of the light source exemplified above with a semiconductor ultraviolet light emitting device is extremely useful industrially and environmentally.

Among the semiconductor ultraviolet light emitting devices, light emitting diode (LED) and laser diode (LD) are small in size, high in lifetime, high in efficiency, and low in cost, and are expected as light sources.

As the light source, a metal halide lamp, an extra-high pressure mercury lamp, a high pressure mercury lamp, a medium pressure mercury lamp, a low pressure mercury lamp, an LED, or a blue-violet laser are preferable.

Among these, in a case where the sensitizer and the photopolymerization initiator are used in combination, an extra-high pressure mercury lamp that can perform irradiation with in a wavelength of 365 nm, 405 nm, or 436 nm, a high pressure mercury lamp that can perform irradiation with in a wavelength of 365 nm, 405 nm, or 436 nm, or LED that can perform irradiation with in a wavelength of 355 nm, 365 nm, 385 nm, 395 nm, or 405 nm is more preferable, and LED that can perform irradiation with in a wavelength of 355 nm, 365 nm, 385 nm, 395 nm, or 405 nm is most preferable.

In Curing Step A, the irradiation time of the active energy rays with respect to the ink applied to the base material is, for example, 0.01 seconds to 120 seconds and preferably 0.1 seconds to 90 seconds.

As the irradiation conditions and the basic irradiation method, the irradiation conditions and the basic irradiation method disclosed in JP1985-132767A (JP-S60-132767A) can be applied in the same manner.

As the method of irradiation with active energy rays, specifically, a method of providing light sources on both sides of a head unit with ink ejection device and scanning a head unit and a light source in a so-called shuttle system or a method of performing irradiation with active energy rays by an independent light source that is not accompanied by driving is preferable.

It is preferable that the irradiation of the active energy rays is performed in a certain time (for example, 0.01 seconds to 120 seconds and preferably 0.01 seconds to 60 seconds) after the ink is landed and dried by heating.

—Curing Step B—

Curing Step B is a step of curing ink by heating or irradiating the ink applied to a base material with infrared rays.

In Curing Step B, thermal crosslinking reaction (that is, thermal polymerization reaction) of the specific particles in the ink proceeds by heating or irradiating the ink applied to the base material with infrared rays and curing the ink by heating, and thus adhesiveness between the image and the base material and the hardness of the image can be improved.

Heating means of performing heating is not particularly limited, and examples thereof include a heat drum, hot air, an infrared lamp, infrared LED, an infrared heater, a heat oven, a heating plate, infrared laser, and an infrared dryer. Among these, since the ink can be effectively heated and cured, a light emitting diode (LED) having an emission wavelength in near infrared rays to far infrared rays having the maximum absorption wavelength in the wavelength of 0.8 μm to 1.5 μm or 2.0 μm to 3.5 μm, a heater that radiates near infrared rays to far infrared rays, a laser having an oscillation wavelength in near infrared rays to far infrared rays, and a dryer that radiates near infrared rays to far infrared rays are preferable.

The heating temperature in a case of heating is preferably 40° C. or higher, more preferably 40° C. to 200° C., and even more preferably 100° C. to 180° C. The heating temperature indicates a temperature of the ink composition on the base material and can be measured by a thermograph using an infrared thermographic device H2640 (manufactured by Nippon Avionics Co., Ltd.).

The heating time can be suitably set by adding the heating temperature, the composition of the ink, and the printing speed.

Curing Step B of heating and curing the ink applied to the base material may also function as a heating and drying step described below.

(Heating and Drying Step)

The image forming method may further have a heating and drying step after the applying step and the curing step, if necessary.

In the heating and drying step, it is preferable that water and the organic solvent used in combination as desired are dried by heating means from the ink ejected to the base material such that an image is fixed.

The heating means may dry water and the organic solvent used in combination as desired. The heating means is not particularly limited, but examples thereof include a heat drum, hot air, an infrared lamp, a heat oven, and heat plate heating.

The heating temperature is preferably 40° C. or higher, more preferably about 40° C. to 150° C., and even more preferably about 40° C. to 80° C.

The heating time can suitably set by adding the composition of the ink and the printing speed.

The ink fixed by heating is further subjected to light fixation by being irradiated with active energy rays in Curing Step A, if necessary. As described above, in Curing Step A, it is preferable to perform fixing with UV light.

EXAMPLES

The present disclosure is specifically described below with the examples, but the present disclosure is not limited to the following examples. Hereinafter, a "part" represents a part by mass, unless described otherwise.

[Synthesization of Specific Chain Polymer and Comparative Polymer]

Polymers P1 to P54 were synthesized as specific chain polymers, Polymers R1 and 2 were synthesized as comparative polymers (see Tables 4, 5, and 8 described below).

In the synthesization of these polymers, the compound for forming Unit (1), the compound for forming Unit (2), the hydrophilic group introducing compound, the polymerizable group introducing compound, and the other compounds were used as below. Each of these compounds is referred to as a chain polymer forming compound, in some cases.

All of the compounds for forming Unit (1) were isocyanate compounds (hereinafter, also referred to as "NCO").

All of the compounds for forming Unit (2) were diol compounds except for a-5. a-5 was a diamine compound.

The other compounds were used in the synthesization of Polymers P49, P50, P53, P54, R1, and R2.

| Name | Structure | Molecular weight | The number of cycles structures in one molecule |
|---|---|---|---|
| | Compound for forming Unit (1) | | |
| IPDI | 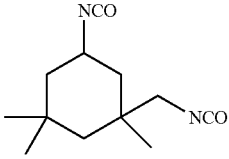<br>Chemical Formula: $C_{12}H_{18}N_2O_2$<br>Molecular Weight: 222.28<br>CLogP: 3.976 | 222.28 | 1 |
| HXDI | 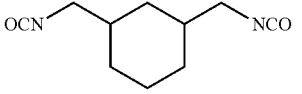<br>Chemical Formula: $C_{10}H_{14}N_2O_2$<br>Molecular Weight: 194.23<br>CLogP: 3.038 | 194.23 | 1 |
| HMDI | 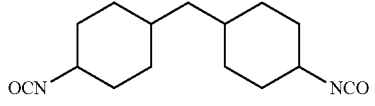<br>Chemical Formula: $C_{15}H_{22}N_2O_2$<br>Molecular Weight: 262.35<br>CLogP: 4.969 | 262.35 | 2 |

-continued

| Name | Structure | Molecular weight | The number of cycles structures in one molecule |
|------|-----------|------------------|--------------------------------------------------|
| XDI | OCN-CH₂-C₆H₄-CH₂-NCO (meta)<br>Chemical Formula: $C_{10}H_{8}N_{2}O_{2}$<br>Molecular Weight: 188.18<br>CLogP: 2.486 | 188.18 | 1 |
| | Compound for forming Unit (2) | | |
| a-1 | HOCH₂-cyclohexyl-CH₂OH<br>Chemical Formula: $C_{8}H_{16}O_{2}$<br>Molecular Weight: 144.21 | 144.21 | 1 |
| a-2 | HO-cyclohexyl-cyclohexyl-OH<br>Chemical Formula: $C_{12}H_{22}H_{2}$<br>Molecular Weight: 198.30 | 198.3 | 2 |
| a-3 | HOCH₂-(tricyclic)-CH₂OH<br>Chemical Formula: $C_{12}H_{20}O_{2}$<br>Molecular Weight: 196.29 | 196.29 | 3 |
| a-4 | HO-cyclohexyl-C(CH₃)₂-cyclohexyl-OH<br>Chemical Formula: $C_{15}H_{28}O_{2}$<br>Molecular Weight: 240.38<br>CLogP: 3.147 | 240.38 | 2 |
| a-5 | isophorone diamine (NH₂, CH₂NH₂ substituted trimethylcyclohexane)<br>Chemical Formula: $C_{10}H_{22}N_{2}$<br>Molecular Weight: 170.30 | 170.03 | 1 |
| b-1 | HOCH₂-C₆H₄-CH₂OH (para)<br>Chemical Formula: $C_{8}H_{10}O_{2}$<br>Molecular Weight: 138.16<br>CLogP: 0.066 | 138.16 | 1 |

-continued

| Name | Structure | Molecular weight | The number of cycles structures in one molecule |
|---|---|---|---|
| b-2 | Chemical Formula: $C_{19}H_{20}Br_4O_4$<br>Molecular Weight: 631.98<br>CLogP: 6.009 | 631.98 | 2 |
| b-3 | Chemical Formula: $C_{14}H_{14}O_4$<br>Molecular Weight: 246.26 | 246.26 | 2 |
| b-4 | Chemical Formula: $C_{16}H_{18}O_6S$<br>Molecular Weight: 338.38<br>CLogP: 1.08027 | 338.38 | 2 |
| b-5 | Chemical Formula: $C_{16}H_{14}Br_4O_6S$<br>Molecular Weight: 653.96<br>CLogP: 3.70013 | 653.96 | 2 |
| c-1 | Chemical Formula: $C_{10}H_{14}O_4$<br>Molecular Weight: 198.22<br>CLogP: 0.1018 | 198.22 | 1 |

| Name | Structure | Molecular weight | The number of cycles structures in one molecule |
|---|---|---|---|
| c-2 | ![structure] Chemical Formula: $C_8H_{18}N_2O_2$<br>Molecular Weight: 174.24<br>CLogP: −1.8725 | 174.24 | 1 |
| Polymerizable group introducing compound | | | |
| GLM | ![structure] Chemical Formula: $C_7H_{12}O_4$<br>Molecular Weight: 160.17 | 160.17 | 0 |
| D212 | ![structure] Chemical Formula: $C_{18}H_{30}O_8$<br>Molecular Weight: 374.43<br>CLogP: 1.0056 | 374.43 | 0 |
| Hydrophilic group introducing compound | | | |
| DMBA | ![structure] Chemical Formula: $C_6H_{12}O_4$<br>Molecular Weight: 148.16 | 148.16 | 0 |
| Other compounds | | | |
| HDDO (Comparative Diol) | ![structure] Chemical Formula: $C_{16}H_{34}O_2$<br>Molecular Weight: 258.44<br>CLogP: 5.184 | 258.44 | 0 |

| Name | Structure | Molecular weight | The number of cycles structures in one molecule |
|---|---|---|---|
| TMHDI (Comparative NCO) | OCN—⋯—NCO<br>Chemical Formula: $C_{11}H_{18}N_2O_2$<br>Molecular Weight: 210.27<br>CLogP: 3.711 | 210.27 | 0 |

<Synthesization of Polymer P1>

IPDI (73.4 g) which was the compound for forming Unit (1), DMBA (14.8 g) which was the hydrophilic group introducing compound, a-1 (31.0 g) which was the compound for forming Unit (2), and ethyl acetate (100 g) were put into a three-neck flask and were heated to 70° C. 0.2 g of NEOSTAN U-600 (inorganic bismuth catalyst manufactured by Nittoh Chemical Co. Ltd., hereinafter also referred to as "U-600") was added and stirred at 70° C. for 15 hours.

Subsequently, isopropyl alcohol (83.3 g) and ethyl acetate (150 g) were added thereto and were stirred at 70° C. for three hours. After stirring for three hours, the reaction solution was allowed to cool to room temperature, and the concentration was adjusted with ethyl acetate so as to obtain a 30 mass % solution of Polymer P1 (the solvent was a mixed solution of ethyl acetate/isopropyl alcohol).

An amount (mass %) of Units (1) and (2) with respect to the total amount of Polymer P1, a ring value (mmol/g) of Polymer P1, an acid value (mmol/g) of Polymer P1, a C=C value (mmol/g) of Polymer P1, and a weight-average molecular weight (Mw) of Polymer P1 are presented in Table 4 described below.

In Tables 4 to 9 described below, ring values (mmol/g) of the respective chain polymers, acid values (mmol/g) of the respective chain polymers, and C=C values (mmol/g) of the respective chain polymers all are calculated values, and weight-average molecular weights (Mw) of the respective chain polymers are measured values. The acid values (mmol/g) of the respective chain polymers can be obtained by neutralization titration.

<Synthesization of Polymers P2 to P52 and R1 and R2>

A 30 mass % solution of each of Polymers P2 to P52 and R1 and R2 was obtained in the same manner as the synthesization of Polymer P1 except for changing the chain polymer forming compounds as presented in Tables 4 and 5 described below.

The used amounts of the respective chain polymer forming compounds were amounts in which amounts (mass %) of Units (1) and (2) with respect to the polymer total amount, ring values of the polymer (mmol/g), acid values (mmol/g) of the polymer, and C=C values (mmol/g) of the polymer were values presented in Tables 4 and 5. The weight-average molecular weights (Mw) of the respective polymers were as presented in Tables 4 and 5.

<Synthesization of Polymers P53 and P54>

A 30 mass % solution of each of Polymer P53 and P54 was obtained in the same manner as in the synthesization of Polymer P1, except for changing the compound (chain polymer forming compound) forming the chain polymer as presented in Table 8 described below.

The used amounts of the respective chain polymer forming compounds were amounts in which amounts (mass %) of Units (1) and (2) with respect to the polymer total amount, ring values (mmol/g) of the polymer, and acid values (mmol/g) of the polymer were values as presented in Table 8.

The weight-average molecular weights (Mw) of the respective polymers were as presented in Table 8.

Specific used amounts of the chain polymer forming compounds used in the synthesization of each of Polymers P1 to P54 and R1 and R2 are presented in Tables 1 and 2.

In Tables 1 and 2, "For Unit (1)" means the "compound for forming Unit (1)", "For Unit (2)" means the "compound for forming Unit (2)", "For hydrophilic group" means the "hydrophilic group introducing compound", "For polymerizable group" means the "polymerizable group introducing compound", and the used amounts of the chain polymer forming compound are indicated by both of the mmol unit and the g unit (the same is applied in Table 3 and the following tables).

In Table 3, specific used amounts of the chain polymer forming compounds used in the synthesization of each of Polymers P55 to P60 described below are presented. Polymers P55 to P60 are also specific examples of the specific chain polymers.

TABLE 1

| | Kind of chain polymer forming compound | | | | Used amount of chain polymer forming compound (mmol) | | | | Used amount of chain polymer forming compound (g) | | | |
|---|---|---|---|---|---|---|---|---|---|---|---|---|
| Kind | For hydrophilic group | For Unit (1) and/or Comparative NCO | For Unit (2) or Comparative diol | For polymerizable group | For hydrophilic group | For Unit (1) and/or Comparative NCO | For Unit (2) or Comparative diol | For polymerizable group | For hydrophilic group | For Unit (1) and/or Comparative NCO | For Unit (2) or Comparative diol | For polymerizable group |
| P1 | DMBA | IPDI | a-1 | — | 100 | 330 | 215 | 0 | 14.8 | 73.4 | 31.0 | 0 |
| P2 | DMBA | IPDI | a-2 | — | 100 | 330 | 215 | 0 | 14.8 | 73.4 | 42.6 | 0 |

TABLE 1-continued

<table>
<tr><td colspan="11">Chain polymer</td></tr>
<tr><td></td><td colspan="4">Kind of chain polymer forming compound</td><td colspan="3">Used amount of chain polymer forming compound (mmol)</td><td colspan="3">Used amount of chain polymer forming compound (g)</td></tr>
<tr><td>Kind</td><td>For hydro-philic group</td><td>For Unit (1) and/or Compar-ative NCO</td><td>For Unit (2) or Compar-ative diol</td><td>For poly-merizable group</td><td>For hydro-philic group</td><td>For Unit (1) and/or Compar-ative NCO</td><td>For Unit (2) or Compar-ative diol</td><td>For poly-merizable group</td><td>For hydro-philic group</td><td>For Unit (1) and/or Compar-ative NCO</td><td>For Unit (2) or Compar-ative diol</td><td>For poly-merizable group</td></tr>
<tr><td>P3</td><td>DMBA</td><td>IPDI</td><td>a-3</td><td>—</td><td>100</td><td>330</td><td>215</td><td>0</td><td>14.8</td><td>73.4</td><td>42.2</td><td>0</td></tr>
<tr><td>P4</td><td>DMBA</td><td>IPDI</td><td>a-4</td><td>—</td><td>100</td><td>330</td><td>215</td><td>0</td><td>14.8</td><td>73.4</td><td>51.7</td><td>0</td></tr>
<tr><td>P5</td><td>DMBA</td><td>IPDI</td><td>a-5</td><td>—</td><td>100</td><td>330</td><td>215</td><td>0</td><td>14.8</td><td>73.4</td><td>36.6</td><td>0</td></tr>
<tr><td>P6</td><td>DMBA</td><td>IPDI</td><td>b-1</td><td>—</td><td>100</td><td>330</td><td>215</td><td>0</td><td>14.8</td><td>73.4</td><td>29.7</td><td>0</td></tr>
<tr><td>P7</td><td>DMBA</td><td>IPDI</td><td>b-2</td><td>—</td><td>100</td><td>330</td><td>215</td><td>0</td><td>14.8</td><td>73.4</td><td>135.9</td><td>0</td></tr>
<tr><td>P8</td><td>DMBA</td><td>IPDI</td><td>b-3</td><td>—</td><td>100</td><td>330</td><td>215</td><td>0</td><td>14.8</td><td>73.4</td><td>52.9</td><td>0</td></tr>
<tr><td>P9</td><td>DMBA</td><td>IPDI</td><td>b-4</td><td>—</td><td>100</td><td>330</td><td>215</td><td>0</td><td>14.8</td><td>73.4</td><td>72.8</td><td>0</td></tr>
<tr><td>P10</td><td>DMBA</td><td>IPDI</td><td>c-1</td><td>—</td><td>100</td><td>330</td><td>215</td><td>0</td><td>14.8</td><td>73.4</td><td>49.1</td><td>0</td></tr>
<tr><td>P11</td><td>DMBA</td><td>IPDI</td><td>c-2</td><td>—</td><td>100</td><td>330</td><td>215</td><td>0</td><td>14.8</td><td>73.4</td><td>57.7</td><td>0</td></tr>
<tr><td>P12</td><td>DMBA</td><td>HXDI</td><td>a-3</td><td>—</td><td>100</td><td>330</td><td>215</td><td>0</td><td>14.8</td><td>64.1</td><td>42.2</td><td>0</td></tr>
<tr><td>P13</td><td>DMBA</td><td>HXDI</td><td>b-1</td><td>—</td><td>100</td><td>330</td><td>215</td><td>0</td><td>14.8</td><td>64.1</td><td>29.7</td><td>0</td></tr>
<tr><td>P14</td><td>DMBA</td><td>HMDI</td><td>a-3</td><td>—</td><td>100</td><td>330</td><td>215</td><td>0</td><td>14.8</td><td>86.6</td><td>42.2</td><td>0</td></tr>
<tr><td>P15</td><td>DMBA</td><td>HMDI</td><td>b-1</td><td>—</td><td>100</td><td>330</td><td>215</td><td>0</td><td>14.8</td><td>86.6</td><td>29.7</td><td>0</td></tr>
<tr><td>P16</td><td>DMBA</td><td>XDI</td><td>a-2</td><td>—</td><td>100</td><td>330</td><td>215</td><td>0</td><td>14.8</td><td>62.1</td><td>42.6</td><td>0</td></tr>
<tr><td>P17</td><td>DMBA</td><td>XDI</td><td>b-1</td><td>—</td><td>100</td><td>330</td><td>215</td><td>0</td><td>14.8</td><td>62.1</td><td>29.7</td><td>0</td></tr>
<tr><td>P18</td><td>DMBA</td><td>IPDI</td><td>a-3</td><td>GLM</td><td>100</td><td>330</td><td>115</td><td>100</td><td>14.8</td><td>73.4</td><td>22.6</td><td>16.0</td></tr>
<tr><td>P19</td><td>DMBA</td><td>IPDI</td><td>a-3</td><td>D-212</td><td>100</td><td>330</td><td>115</td><td>100</td><td>14.8</td><td>73.4</td><td>22.6</td><td>37.4</td></tr>
<tr><td>P20</td><td>DMBA</td><td>IPDI</td><td>a-3</td><td>GLM</td><td>100</td><td>330</td><td>115</td><td>100</td><td>14.8</td><td>73.4</td><td>22.6</td><td>16.0</td></tr>
<tr><td>P21</td><td>DMBA</td><td>IPDI</td><td>b-2</td><td>GLM</td><td>100</td><td>330</td><td>115</td><td>100</td><td>14.8</td><td>73.4</td><td>15.9</td><td>16.0</td></tr>
<tr><td>P22</td><td>DMBA</td><td>IPDI</td><td>b-3</td><td>GLM</td><td>100</td><td>330</td><td>115</td><td>100</td><td>14.8</td><td>73.4</td><td>72.7</td><td>16.0</td></tr>
<tr><td>P23</td><td>DMBA</td><td>IPDI</td><td>a-3</td><td>GLM</td><td>100</td><td>330</td><td>195</td><td>20</td><td>14.8</td><td>73.4</td><td>38.3</td><td>3.2</td></tr>
<tr><td>P24</td><td>DMBA</td><td>IPDI</td><td>a-3</td><td>GLM</td><td>100</td><td>330</td><td>155</td><td>60</td><td>14.8</td><td>73.4</td><td>30.4</td><td>9.6</td></tr>
<tr><td>P25</td><td>DMBA</td><td>IPDI</td><td>a-3</td><td>GLM</td><td>100</td><td>330</td><td>95</td><td>120</td><td>14.8</td><td>73.4</td><td>18.6</td><td>19.2</td></tr>
<tr><td>P26</td><td>DMBA</td><td>IPDI</td><td>a-3</td><td>GLM</td><td>100</td><td>330</td><td>55</td><td>160</td><td>14.8</td><td>73.4</td><td>10.8</td><td>25.6</td></tr>
<tr><td>P27</td><td>DMBA</td><td>IPDI</td><td>a-3</td><td>—</td><td>25</td><td>330</td><td>290</td><td>0</td><td>3.7</td><td>73.4</td><td>56.9</td><td>0</td></tr>
<tr><td>P28</td><td>DMBA</td><td>IPDI</td><td>a-3</td><td>—</td><td>65</td><td>330</td><td>250</td><td>0</td><td>9.6</td><td>73.4</td><td>49.1</td><td>0</td></tr>
<tr><td>P29</td><td>DMBA</td><td>IPDI</td><td>a-3</td><td>—</td><td>135</td><td>330</td><td>180</td><td>0</td><td>20.0</td><td>73.4</td><td>35.3</td><td>0</td></tr>
<tr><td>P30</td><td>DMBA</td><td>IPDI</td><td>a-3</td><td>—</td><td>165</td><td>330</td><td>150</td><td>0</td><td>24.4</td><td>73.4</td><td>29.4</td><td>0</td></tr>
<tr><td>P31</td><td>DMBA</td><td>IPDI</td><td>a-3</td><td>—</td><td>195</td><td>330</td><td>120</td><td>0</td><td>28.9</td><td>73.4</td><td>23.6</td><td>0</td></tr>
<tr><td>P32</td><td>DMBA</td><td>IPDI</td><td>a-3</td><td>—</td><td>225</td><td>330</td><td>90</td><td>0</td><td>33.3</td><td>73.4</td><td>17.7</td><td>0</td></tr>
<tr><td>P33</td><td>DMBA</td><td>IPDI</td><td>a-3</td><td>GLM</td><td>26</td><td>330</td><td>169</td><td>120</td><td>3.9</td><td>73.4</td><td>33.2</td><td>19.2</td></tr>
<tr><td>P34</td><td>DMBA</td><td>IPDI</td><td>a-3</td><td>GLM</td><td>65</td><td>330</td><td>130</td><td>120</td><td>9.6</td><td>73.4</td><td>25.5</td><td>19.2</td></tr>
<tr><td>P35</td><td>DMBA</td><td>IPDI</td><td>a-3</td><td>GLM</td><td>135</td><td>330</td><td>60</td><td>120</td><td>20.0</td><td>73.4</td><td>11.8</td><td>19.2</td></tr>
<tr><td>P36</td><td>DMBA</td><td>IPDI</td><td>a-3</td><td>GLM</td><td>165</td><td>330</td><td>30</td><td>120</td><td>24.4</td><td>73.4</td><td>5.9</td><td>19.2</td></tr>
</table>

TABLE 2

<table>
<tr><td colspan="13">Chain polymer</td></tr>
<tr><td></td><td colspan="4">Kind of chain polymer forming compound</td><td colspan="4">Used amount of chain polymer forming compound (mmol)</td><td colspan="4">Used amount of chain polymer forming compound (g)</td></tr>
<tr><td>Kind</td><td>For hydro-philic group</td><td>For Unit (1) and/or Compar-ative NCO</td><td>For Unit (2) or Compar-ative diol</td><td>For poly-merizable group</td><td>For hydro-philic group</td><td colspan="2">For Unit (1) and/or Compar-ative NCO</td><td>For Unit (2) or Compar-ative diol</td><td>For poly-merizable group</td><td>For hydro-philic group</td><td>For Unit (1) and/or Compar-ative NCO</td><td>For Unit (2) or Compar-ative diol</td><td>For poly-merizable group</td></tr>
<tr><td>P37</td><td>DMBA</td><td>IPDI</td><td>a-3</td><td>—</td><td>100</td><td colspan="2">330</td><td>225</td><td>0</td><td>14.8</td><td>73.4</td><td>44.2</td><td>0</td></tr>
<tr><td>P38</td><td>DMBA</td><td>IPDI</td><td>a-3</td><td>—</td><td>100</td><td colspan="2">330</td><td>225</td><td>0</td><td>14.8</td><td>73.4</td><td>44.2</td><td>0</td></tr>
<tr><td>P39</td><td>DMBA</td><td>IPDI</td><td>a-3</td><td>—</td><td>100</td><td colspan="2">330</td><td>225</td><td>0</td><td>14.8</td><td>73.4</td><td>44.2</td><td>0</td></tr>
<tr><td>P40</td><td>DMBA</td><td>IPDI</td><td>a-3</td><td>—</td><td>100</td><td colspan="2">330</td><td>225</td><td>0</td><td>14.8</td><td>73.4</td><td>44.2</td><td>0</td></tr>
<tr><td>P41</td><td>DMBA</td><td>IPDI</td><td>a-3</td><td>—</td><td>100</td><td colspan="2">330</td><td>225</td><td>0</td><td>14.8</td><td>73.4</td><td>44.2</td><td>0</td></tr>
<tr><td>P42</td><td>DMBA</td><td>IPDI</td><td>a-3</td><td>—</td><td>100</td><td colspan="2">330</td><td>225</td><td>0</td><td>14.8</td><td>73.4</td><td>44.2</td><td>0</td></tr>
<tr><td>P43</td><td>DMBA</td><td>IPDI</td><td>a-3</td><td>GLM</td><td>100</td><td colspan="2">330</td><td>125</td><td>100</td><td>14.8</td><td>73.4</td><td>24.5</td><td>16.0</td></tr>
<tr><td>P44</td><td>DMBA</td><td>IPDI</td><td>a-3</td><td>GLM</td><td>100</td><td colspan="2">330</td><td>125</td><td>100</td><td>14.8</td><td>73.4</td><td>24.5</td><td>16.0</td></tr>
<tr><td>P45</td><td>DMBA</td><td>IPDI</td><td>a-3</td><td>GLM</td><td>100</td><td colspan="2">330</td><td>125</td><td>100</td><td>14.8</td><td>73.4</td><td>24.5</td><td>16.0</td></tr>
<tr><td>P46</td><td>DMBA</td><td>IPDI</td><td>a-3</td><td>GLM</td><td>100</td><td colspan="2">330</td><td>125</td><td>100</td><td>14.8</td><td>73.4</td><td>24.5</td><td>16.0</td></tr>
<tr><td>P47</td><td>DMBA</td><td>IPDI</td><td>a-3</td><td>GLM</td><td>100</td><td colspan="2">330</td><td>125</td><td>100</td><td>14.8</td><td>73.4</td><td>24.5</td><td>16.0</td></tr>
<tr><td>P48</td><td>DMBA</td><td>IPDI</td><td>a-3</td><td>GLM</td><td>100</td><td colspan="2">330</td><td>125</td><td>100</td><td>14.8</td><td>73.4</td><td>24.5</td><td>16.0</td></tr>
<tr><td>P49</td><td>DMBA</td><td>IPDI/TMHDI = 3/2 (molar ratio)</td><td>a-3</td><td>GLM</td><td>165</td><td colspan="2">198/132</td><td>30</td><td>120</td><td>24.5</td><td>44.0/27.8</td><td>6.0</td><td>19.3</td></tr>
<tr><td>P50</td><td>DMBA</td><td>IPDI/TMHDI = 1/4 (molar ratio)</td><td>a-3</td><td>GLM</td><td>165</td><td colspan="2">66/264</td><td>30</td><td>120</td><td>24.5</td><td>14.7/55.5</td><td>5.9</td><td>19.2</td></tr>
<tr><td>P51</td><td>DMBA</td><td>IPDI</td><td>b-5</td><td>—</td><td>101</td><td colspan="2">330</td><td>215</td><td>0</td><td>14.9</td><td>73.4</td><td>140.9</td><td>0</td></tr>
</table>

TABLE 2-continued

| | Kind of chain polymer forming compound | | | | Used amount of chain polymer forming compound (mmol) | | | | Used amount of chain polymer forming compound (g) | | | |
|---|---|---|---|---|---|---|---|---|---|---|---|---|
| Kind | For hydrophilic group | For Unit (1) and/or Comparative NCO | For Unit (2) or Comparative diol | For polymerizable group | For hydrophilic group | For Unit (1) and/or Comparative NCO | For Unit (2) or Comparative diol | For polymerizable group | For hydrophilic group | For Unit (1) and/or Comparative NCO | For Unit (2) or Comparative diol | For polymerizable group |
| P52 | DMBA | IPDI | b-5 | GLM | 102 | 330 | 118 | 102 | 15.1 | 73.4 | 77.4 | 16.3 |
| P53 | DMBA | IPDI/TMHDI = 2/3 (molar ratio) | a-1 | — | 101 | 132/198 | 215 | 0 | 14.9 | 29.3/41.6 | 31.0 | 0 |
| P54 | DMBA | IPDI/TMHDI = 1/9 (molar ratio) | a-1 | — | 101 | 33/297 | 215 | 0 | 14.9 | 7.3/62.5 | 31.0 | 0 |
| R1 | DMBA | TMHDI | HDDO | — | 104 | 330 | 246 | 0 | 15.4 | 69.4 | 49.8 | 0 |
| R2 | DMBA | IPDI | HDDO | — | 101 | 330 | 216 | 0 | 14.9 | 73.4 | 55.8 | 0 |

TABLE 3

| | Kind of chain polymer forming compound | | | | Used amount of chain polymer forming compound (mmol) | | | | Used amount of chain polymer forming compound (g) | | | |
|---|---|---|---|---|---|---|---|---|---|---|---|---|
| Kind | For hydrophilic group | For Unit (1) and/or Comparative NCO | For Unit (2) or Comparative diol | For polymerizable group | For hydrophilic group | For Unit (1) and/or Comparative NCO | For Unit (2) or Comparative diol | For polymerizable group | For hydrophilic group | For Unit (1) and/or Comparative NCO | For Unit (2) or Comparative diol | For polymerizable group |
| P55 | DMBA | IPDI | b-5 | GLM | 99 | 330 | 92 | 138 | 14.6 | 73.4 | 60.0 | 22.1 |
| P56 | DMBA | MDI | a-3 | — | 67 | 330 | 269 | 0 | 9.9 | 82.6 | 52.9 | 0 |
| P57 | DMBA | IPDI | b-6 | — | 67 | 330 | 264 | 0 | 9.9 | 73.4 | 79.3 | 0 |
| P58 | DMBA | IPDI | b-5 | — | 133 | 330 | 202 | 0 | 19.7 | 73.4 | 132.2 | 0 |
| P59 | DMPA | HMDI | a-3/ BisAGlyDA | — | 126 | 330 | 63/126 | 0 | 16.9 | 86.6 | 12.4/61.1 | 0 |
| P60 | DMPA | HMDI | a-3/ BisAGlyDMA | — | 126 | 330 | 63/126 | 0 | 16.9 | 86.6 | 12.4/64.6 | 0 |

Example 1

<Preparation of Water Dispersion>
—Preparation of Oil Phase Component—
Ethyl acetate, a 30 mass % solution of Polymer P1, a polymerizable monomer SR833S manufactured by Sartomer, a polymerizable monomer SR399E manufactured by Sartomer, and a photopolymerization initiator IRGACURE (registered trademark) 819 manufactured by BASF SE were mixed and stirred for 15 minutes, so as to obtain 45.7 g of an oil phase component having the solid content of 30 mass %.

In the preparation of the oil phase component, the used amount of the 30 mass % solution of Polymer P1 was an amount in which the content (mass %) of Polymer P1 with respect to the solid content of the manufactured particles was a value presented in Table 4.

In the preparation of the oil phase component, used amounts of SR833S ("SR833" in Table 4) and SR399E ("SR399" in Table 4) were amounts in which the respective contents with respect to the solid content of the manufactured particles are values presented in Table 4.

In the preparation of the oil phase components, the used amounts of the photopolymerization initiator IRGACURE 819 were amounts in which the content with respect to the solid content of the manufactured particles are 3.0 mass %.

SR833S was a difunctional polymerizable monomer having a cyclic structure and specifically tricyclodecanedimethanol diacrylate.

SR399E was a pentafunctional polymerizable monomer that did not have a cyclic structure and specifically dipentaerythritol pentaacrylate.

The photopolymerization initiator IRGACURE 819 was an acylphosphine oxide-based photopolymerization initiator and specifically bis(2,4,6-trimethylbenzoyl)-phenylphosphine oxide.

—Preparation of Water Phase Component—
Distilled water (43.1 g) and sodium hydroxide as the neutralizing agent were mixed and stirred for 15 minutes, so as to prepare a water phase component.

The used amount of sodium hydroxide as the neutralizing agent was adjusted such that a degree of neutralization in the manufactured particles was 90%.

Specific amounts of sodium hydroxide were obtained by a calculation equation below.

Amount (g) of sodium hydroxide=Total amount (g) of oil phase component×(Solid content concentration (mass %) of oil phase component/100)×(Content (mass %) of Chain Polymer P1 with respect to the solid content amount of oil phase component/100)×acid value (mmol/g) of Chain Polymer P1×0.9×Molecular weight (g/mol) of sodium hydroxide/1,000

The oil phase component and the water phase component were mixed with each other, and the obtained mixture was emulsified for 10 minutes at 12,000 rpm by using a homogenizer at room temperature. The obtained emulsion was added to distilled water (15.3 g), and the obtained liquid was heated to 50° C. and was stirred for five hours at 50° C., so as to distill ethyl acetate.

The liquid from which ethyl acetate was distilled was diluted with distilled water such that the content of the solid content was 20 mass %, so as to obtain a water dispersion of the particles.

<Preparation of Ink>

The respective components of the composition were mixed so as to manufacture ink jet ink.

—Composition of Ink—

The above water dispersion . . . 82 parts

Pigment dispersion liquid (Pro-jet Cyan APD1000 (manufactured by FUJIFILM Imaging Colorants, Inc.), pigment concentration 14 mass %) . . . 13 parts Fluorine-based surfactant (manufactured by DuPont, Capstone FS-31, solid content 25 mass %) . . . 0.3 parts 2-Methylpropane diol . . . 4.7 parts <Evaluation>

The following evaluation was performed by using the ink obtained above.

The results are presented in Table 4.

(Pencil Hardness of Cured Film)

The base material was coated with the ink preserved within one day at room temperature after preparation so as to form a coating film having a thickness of 12 µm.

As the base material, a polystyrene (PS) sheet ("falcon hi impact polystyrene" manufactured by Robert Home Group Ltd.).

The above coating was performed by using a No. 2 bar of a K hand coater manufactured by RK PRINT COAT INSTRUMENTS Ltd.

Subsequently, the coating film was dried at 60° C. for three minutes.

The coating film after drying was irradiated with ultraviolet rays (UV) so as to cure the coating film and obtain the cured film.

In the irradiation of the ultraviolet rays (UV), an experimental UV mini conveyor device CSOT (manufactured by GS Yuasa International Ltd.) equipped with an ozone-less metal halide lamp MAN250L as an exposure light source and setting a conveyor speed of 35 m/minute and exposure intensity of 2.0 W/cm$^2$ was used.

With respect to the cured film, pencil hardness was measured based on JIS K5600-5-4 (1999).

As the pencil used in the measurement of the pencil hardness, UNI (registered trademark) manufactured by Mitsubishi Pencil Co., Ltd.

The allowable range of the pencil hardness was HB or harder and preferably H or harder. A cured film having a pencil hardness of B or less is not desirable since it is likely that scratches may be generated during handling.

(Jettability of Ink)

The ink preserved within one day at room temperature after preparation was ejected for 30 minutes from a head of an ink jet printer (SP-300 V manufactured by Roland DG Corporation), and the ejection was stopped.

After five minutes have elapsed from the stop of the ejection, the ink was ejected from the head to the base material, so as to form a solid image of 5 cm×5 cm.

These images were visually observed, and whether dots were missed due to the occurrence of a non-ejecting nozzle was checked, and jettability of the ink was evaluated according to the following evaluation standards.

In the evaluation standards below, one of which the jettability of the ink was most excellent was A.

—Evaluation Standards of Jettability—

A: Dot omission due to occurrence of a non-ejecting nozzle or the like was not observed and a satisfactory image was able to be obtained.

B: Dot omission due to occurrence of a non-ejecting nozzle or the like was slightly observed but the dot omission did not cause any problems in practical use.

C: Dot omission due to occurrence of a non-ejecting nozzle or the like was generated and the image was not able to be used in practice.

D: Ink was not able to be ejected from a head.

(Preservation Stability of Ink)

The ink preserved within one day at room temperature after preparation was sealed in a container and was left at 60° C. for two weeks.

With respect to the ink after two weeks had elapsed, evaluation which was the same as the jettability evaluation was performed, and the preservation stability of the ink was evaluated according to the same evaluation standard.

In the evaluation standards, one in which the preservation stability of the ink was most excellent was A.

(Time Curability of Ink)

The ink preserved within one day at room temperature after preparation was sealed in a container and was left at 60° C. for two weeks.

Evaluation which was the same as the pencil hardness of the cured film was performed by using the ink after two weeks had elapsed.

The pencil hardness of the cured film in a case where the ink before the elapse of time (that is, the ink preserved within one day at room temperature after preparation) and the pencil hardness of the cured film in a case where the ink after two weeks had elapsed was used were compared with each other, and the time curability of the ink was evaluated according to the evaluation standards.

According to the evaluation standards, A and B mean that the time curability of the ink was excellent (that is, decrease of the curing properties of the ink due to the elapse of time was suppressed).

—Evaluation Standards of Time Curability—

A: The pencil hardness of a cured film in a case where the ink after two weeks had elapsed was the same as the pencil hardness of a cured film in a case where the ink before the elapse of time was used.

B: The pencil hardness of a cured film in a case where the ink after two weeks had elapsed was lower than the pencil hardness of a cured film in a case where the ink before the elapse of time was used by one rank.

C: The pencil hardness of a cured film in a case where the ink after two weeks had elapsed was lower than the pencil hardness of a cured film in a case where the ink before the elapse of time was used by two ranks.

D: The pencil hardness of a cured film in a case where the ink after two weeks had elapsed was lower than the pencil hardness of a cured film in a case where the ink before the elapse of time was used by three ranks.

(Adhesiveness of Cured Film)

A cured film was formed in the same manner as the formation of the cured film in the evaluation of the pencil hardness.

A cross hatch test was performed on the obtained cured film in conformity with ISO2409 (2013) (cross cut method), and the adhesiveness of the cured film to polystyrene (PS) substrate was evaluated according to the following evaluation standards.

In this cross hatch test, 25 cuts of 1 mm square square lattice with a cut interval of 1 mm were formed.

In the following evaluation standards, 0, 1, and 2 are practically acceptable levels.

In the following evaluation standards, the ratio (%) in which the lattices were peeled off was a value obtained by the following equation. The total number of lattices in the following equation was 25.

Ratio (%) in which lattices were peeled off=[(The number of lattices in which peeling was performed)/(the total number of the lattices)]×100

—Evaluation Standards of Adhesiveness of Cured Film—
0: A ratio (%) in which lattices were peeled off was 0%.
1: A ratio (%) in which lattices were peeled off was greater than 0% and 5% or less.
2: A ratio (%) in which lattices were peeled off was greater than 5% and 15% or less.
3: A ratio (%) in which lattices were peeled off was greater than 15% and 35% or less.
4: A ratio (%) in which lattices were peeled off was greater than 35% and 65% or less.
5: A ratio (%) in which lattices were peeled off was greater than 65%.

The PS base material used in the evaluation of the adhesiveness of the cured film was a hydrophobic base material that did not have a polar group on the surface, and thus was different from a polyethylene terephthalate (PET) base material and a polyvinyl chloride (PVC) base material which had a polar group on the surface. Therefore, in the image formation using aqueous ink, the PS base material was a base material in which the adhesiveness of an image (cured film) and a base material was hardly obtained compared with a PET base material and a PVC base material.

Accordingly, the evaluation of the adhesiveness of the cured film using the PS base material was adhesiveness evaluation in a strict condition. Therefore, the excellent evaluation results of the adhesiveness of the cured film mean that the adhesiveness of the cured film to the base material was extremely excellent.

Examples 2 to 48

The same operation as in Example 1 was performed except for changing Polymer P1 used in the preparation of the aqueous dispersion to polymers presented in Tables 4 and 5.
The results are presented in Tables 4 and 5.

Examples 49 to 53

The same operations as in Examples 23, 24, 20, 25, and 26 were performed except for not using SR833S and SR399E.
The results are presented in Table 5.

Examples 54 and 55

The same operation as in Examples 3 and 51 was performed except for adding (ITX: 2-isopropylthioxanthone) as a sensitizer to the oil phase component.
In each of the examples, the amount of the sensitizer (ITX: 2-isopropylthioxanthone) was adjusted so that the content thereof with respect to the solid content of the manufactured particles was 1.0 mass %.
The results are presented in Table 5.

Examples 56 to 60

The same operation as in Example 3 was performed except for changing kinds and amounts of the polymerizable compound as presented in Table 5.
The results are presented in Table 5.
Details of the polymerizable compound in Table 5 are as below.

SR833 . . . SR833S manufactured by Sartomer. The name of the compound is tricyclodecanedimethanol diacrylate. This compound is a difunctional radical polymerizable compound (radical polymerizable monomer) including a cyclic structure.

CD406 . . . CD406 manufactured by Sartomer. The name of the compound is cyclohexane dimethanol diacrylate. This compound is a difunctional radical polymerizable compound (radical polymerizable monomer) including a cyclic structure.

SR399 . . . SR399E manufactured by Sartomer. The name of the compound is dipentaerythritol pentaacrylate. This compound is a pentafunctional radical polymerizable compound (radical polymerizable monomer) that does not include a cyclic structure.

SR306 . . . SR306H manufactured by Sartomer. The name of the compound is tripropylene glycol diacrylate. This compound is a difunctional radical polymerizable compound (radical polymerizable monomer) that does not have a cyclic structure.

A-TMPT . . . A-TMPT manufactured by Shin-Nakamura Chemical Co., Ltd. The name of the compound is trimethylolpropane triacrylate. This compound is a trifunctional radical polymerizable compound (radical polymerizable monomer) that does not include a cyclic structure.

Examples 61 to 64

The same operation as in Example 3 was performed except for changing the amounts of the chain polymer and the polymerizable compound as presented in Table 5.
The results are presented in Table 5.

Examples 65 to 68

The same operation as in Example 1 was performed except for changing Polymer P1 used in the preparation of the aqueous dispersion to polymers presented in Table 5.
The results are presented in Table 5.

Comparative Examples 1 and 2

The same operation as in Example 1 was performed except for changing Polymer P1 used in the preparation of the aqueous dispersion to polymers presented in Table 5.
The results are presented in Table 5.

Comparative Example 3

An ink containing urethane acrylate was prepared in the same manner as in Example 1 of JP2013-237781A. The same evaluation as in Example 1 was performed by using the obtained ink,
The results are presented in Table 5.

TABLE 4

| | | Particle | | | | | | | | | | | Polymerizable compound | | | | | | | Evaluation result | | | | |
|---|---|---|---|---|---|---|---|---|---|---|---|---|---|---|---|---|---|---|---|---|---|---|---|---|---|
| | | Chain polymer | | | | | | | | | | | With cyclic structure | | Without cyclic structure | | | | C=C value | pencil hard- ness | Jett- ability | Preser- vation stability | Time cura- bility | Adhes- iveness |
| | | Chain polymer forming compound | | | | | | | | | | | | | | | | | | | | | | | |
| | | For hydro- philic group | For Unit (1) and/or Compar- ative NCO | For Unit (2) or Compar- ative diol | For polyme- rizable group | Amount of Unit (1) and (2) (%) | Ring value (mmol/g) | Acid value (mmol/g) | C=C value (mmol/g) | Mw | Amount (%) | | Kind | Amount (%) | Kind | Amount (%) | Initi- ator | Sensi- tizer | (mmol/g) | | | | | |
| | Kind | | | | | | | | | | | | | | | | | | | | | | | | |
| Example 1 | P1 | DMBA | IPDI | a-1 | — | 88 | 4.56 | 0.84 | 0.00 | 18001 | 40 | | SR833 | 28.5 | SR399 | 28.5 | Y | N | 4.50 | H | A | A | B | 0 |
| Example 2 | P2 | DMBA | IPDI | a-2 | — | 89 | 5.80 | 0.76 | 0.00 | 23001 | 40 | | SR833 | 28.5 | SR399 | 28.5 | Y | N | 4.50 | H | A | A | A | 0 |
| Example 3 | P3 | DMBA | IPDI | a-3 | — | 89 | 7.47 | 0.77 | 0.00 | 21001 | 40 | | SR833 | 28.5 | SR399 | 28.5 | Y | N | 4.50 | H | A | A | A | 0 |
| Example 4 | P4 | DMBA | IPDI | a-4 | — | 89 | 5.43 | 0.77 | 0.00 | 22001 | 40 | | SR833 | 28.5 | SR399 | 28.5 | Y | N | 4.50 | H | A | A | B | 0 |
| Example 5 | P5 | DMBA | IPDI | a-5 | — | 88 | 4.36 | 0.80 | 0.00 | 20001 | 40 | | SR833 | 28.5 | SR399 | 28.5 | Y | N | 4.50 | H | A | A | A | 0 |
| Example 6 | P6 | DMBA | IPDI | b-1 | — | 87 | 4.61 | 0.85 | 0.00 | 18000 | 40 | | SR833 | 28.5 | SR399 | 28.5 | Y | N | 4.50 | H | A | A | B | 0 |
| Example 7 | P7 | DMBA | IPDI | b-2 | — | 93 | 3.39 | 0.45 | 0.00 | 25000 | 40 | | SR833 | 28.5 | SR399 | 28.5 | Y | N | 4.50 | H | A | A | A | 0 |
| Example 8 | P8 | DMBA | IPDI | b-3 | — | 90 | 5.38 | 0.71 | 0.00 | 23000 | 40 | | SR833 | 28.5 | SR399 | 28.5 | Y | N | 4.50 | H | A | A | A | 0 |
| Example 9 | P9 | DMBA | IPDI | b-4 | — | 91 | 4.72 | 0.62 | 0.00 | 22000 | 40 | | SR833 | 28.5 | SR399 | 28.5 | Y | N | 4.50 | H | A | A | B | 1 |
| Example 10 | P10 | DMBA | IPDI | c-1 | — | 89 | 4.16 | 0.76 | 0.00 | 21001 | 40 | | SR833 | 28.5 | SR399 | 28.5 | Y | N | 4.50 | H | A | B | B | 1 |
| Example 11 | P11 | DMBA | IPDI | c-2 | — | 88 | 4.33 | 0.80 | 0.00 | 22001 | 40 | | SR833 | 28.5 | SR399 | 28.5 | Y | N | 4.50 | H | A | B | B | 1 |
| Example 12 | P12 | DMBA | HXDI | a-3 | — | 88 | 8.03 | 0.83 | 0.00 | 20001 | 40 | | SR833 | 28.5 | SR399 | 28.5 | Y | N | 4.50 | H | A | A | B | 0 |
| Example 13 | P13 | DMBA | HXDI | b-1 | — | 86 | 5.01 | 0.92 | 0.00 | 17000 | 40 | | SR833 | 28.5 | SR399 | 28.5 | Y | N | 4.50 | H | B | A | A | 0 |
| Example 14 | P14 | DMBA | HMDI | a-3 | — | 90 | 9.07 | 0.70 | 0.00 | 19001 | 40 | | SR833 | 28.5 | SR399 | 28.5 | Y | N | 4.50 | H | B | A | A | 0 |
| Example 15 | P15 | DMBA | HMDI | b-1 | — | 89 | 6.66 | 0.76 | 0.00 | 16000 | 40 | | SR833 | 28.5 | SR399 | 28.5 | Y | N | 4.50 | H | A | A | B | 0 |
| Example 16 | P16 | DMBA | XDI | a-2 | — | 88 | 6.34 | 0.84 | 0.00 | 19000 | 40 | | SR833 | 28.5 | SR399 | 28.5 | Y | N | 4.50 | H | A | A | A | 0 |
| Example 17 | P17 | DMBA | XDI | b-1 | — | 86 | 5.10 | 0.94 | 0.00 | 19000 | 40 | | SR833 | 28.5 | SR399 | 28.5 | Y | N | 4.50 | 2H | A | A | B | 1 |
| Example 18 | P18 | DMBA | IPDI | a-3 | GLM | 76 | 5.31 | 0.79 | 0.79 | 21001 | 40 | | SR833 | 28.5 | SR399 | 28.5 | Y | N | 4.82 | 2H | A | A | A | 0 |
| Example 19 | P19 | DMBA | IPDI | a-3 | D-212 | 65 | 4.54 | 0.67 | 1.35 | 22000 | 40 | | SR833 | 28.5 | SR399 | 28.5 | Y | N | 5.04 | 2H | A | A | B | 1 |
| Example 20 | P20 | DMBA | IPDI | a-3 | GLM | 76 | 5.31 | 0.79 | 0.79 | 21001 | 40 | | SR833 | 28.5 | SR399 | 28.5 | Y | N | 4.82 | 2H | A | A | A | 0 |
| Example 21 | P21 | DMBA | IPDI | a-3 | GLM | 74 | 4.65 | 0.83 | 0.83 | 20000 | 40 | | SR833 | 28.5 | SR399 | 28.5 | Y | N | 4.83 | 2H | A | A | A | 0 |
| Example 22 | P22 | DMBA | IPDI | a-3 | GLM | 83 | 3.16 | 0.57 | 0.57 | 21000 | 40 | | SR833 | 28.5 | SR399 | 28.5 | Y | N | 4.73 | H | A | A | A | 0 |
| Example 23 | P23 | DMBA | IPDI | a-3 | GLM | 86 | 7.04 | 0.77 | 0.15 | 21000 | 40 | | SR833 | 28.5 | SR399 | 28.5 | Y | N | 4.56 | H | A | A | A | 0 |
| Example 24 | P24 | DMBA | IPDI | a-3 | GLM | 81 | 6.18 | 0.78 | 0.47 | 20000 | 40 | | SR833 | 28.5 | SR399 | 28.5 | Y | N | 4.69 | H | A | A | A | 0 |
| Example 25 | P25 | DMBA | IPDI | a-3 | GLM | 73 | 4.86 | 0.79 | 0.95 | 21000 | 40 | | SR833 | 28.5 | SR399 | 28.5 | Y | N | 4.88 | H | A | A | A | 0 |
| Example 26 | P26 | DMBA | IPDI | a-3 | GLM | 68 | 3.96 | 0.80 | 1.28 | 23000 | 40 | | SR833 | 28.5 | SR399 | 28.5 | Y | N | 5.01 | H | A | B | A | 0 |
| Example 27 | P27 | DMBA | IPDI | a-3 | — | 97 | 8.95 | 0.19 | 0.00 | 22000 | 40 | | SR833 | 28.5 | SR399 | 28.5 | Y | N | 4.50 | H | A | A | A | 0 |
| Example 28 | P28 | DMBA | IPDI | a-3 | — | 93 | 8.17 | 0.49 | 0.00 | 21000 | 40 | | SR833 | 28.5 | SR399 | 28.5 | Y | N | 4.50 | H | A | A | A | 0 |
| Example 29 | P29 | DMBA | IPDI | a-3 | — | 84 | 6.74 | 1.05 | 0.00 | 21000 | 40 | | SR833 | 28.5 | SR399 | 28.5 | Y | N | 4.50 | H | A | A | A | 0 |
| Example 30 | P30 | DMBA | IPDI | a-3 | — | 81 | 6.11 | 1.30 | 0.00 | 24000 | 40 | | SR833 | 28.5 | SR399 | 28.5 | Y | N | 4.50 | H | A | B | A | 0 |
| Example 31 | P31 | DMBA | IPDI | a-3 | — | 77 | 5.47 | 1.55 | 0.00 | 22000 | 40 | | SR833 | 28.5 | SR399 | 28.5 | Y | N | 4.50 | H | A | B | A | 0 |
| Example 32 | P32 | DMBA | IPDI | a-3 | — | 73 | 4.81 | 1.81 | 0.00 | 21000 | 40 | | SR833 | 28.5 | SR399 | 28.5 | Y | N | 4.50 | H | B | B | A | 0 |
| Example 33 | P33 | DMBA | IPDI | a-3 | GLM | 82 | 6.44 | 0.20 | 0.93 | 21000 | 40 | | SR833 | 28.5 | SR399 | 28.5 | Y | N | 4.87 | 2H | B | B | A | 0 |

TABLE 4-continued

| | | Particle | | | | | | | | | | | | | | | | Evaluation result | | | |
|---|---|---|---|---|---|---|---|---|---|---|---|---|---|---|---|---|---|---|---|---|---|
| | | Chain polymer | | | | | | | | | Polymerizable compound | | | | | | | | | | | |
| | | Chain polymer forming compound | | | | | | | | | With cyclic structure | | Without cyclic structure | | | | | | | | | |
| | Kind | For hydrophilic group | For Unit (1) and/or Comparative NCO | For Unit (2) or Comparative diol | For polymerizable group | Amount Comparative Unit (1) and (2) (%) | Ring value (mmol/g) | Acid value (mmol/g) | C=C value (mmol/g) | Mw | Amount (%) | Kind | Amount (%) | Kind | Amount (%) | Initiator | Sensitizer | C=C value (mmol/g) | pencil hardness | Jettability | Preservation stability | Curability | Time | Adhesiveness |
| Example 34 | P34 | DMBA | IPDI | a-3 | GLM | 77 | 5.62 | 0.51 | 0.94 | 21000 | 40 | SR833 | 28.5 | SR399 | 28.5 | Y | N | 4.88 | 2H | A | A | A | A | 0 |
| Example 35 | P35 | DMBA | IPDI | a-3 | GLM | 68 | 4.08 | 1.09 | 0.97 | 20000 | 40 | SR833 | 28.5 | SR399 | 28.5 | Y | N | 4.89 | 2H | A | A | A | A | 1 |
| Example 36 | P36 | DMBA | IPDI | a-3 | GLM | 64 | 3.40 | 1.34 | 0.98 | 21000 | 40 | SR833 | 28.5 | SR399 | 28.5 | Y | N | 4.89 | 2H | A | A | A | A | 1 |

TABLE 5

| | | Particle | | | | | | | | | |
|---|---|---|---|---|---|---|---|---|---|---|---|
| | | Chain polymer | | | | | | | | | |
| | | Chain polymer forming compound | | | | | | | | | |
| | Kind | For hydro-philic group | For Unit (1) and/or Comparative NCO | For Unit (2) or Comparative diol | For polymerizable group | Amount of Unit (1) and (2) (%) | Ring value (mmol/g) | Acid value (mmolg) | C=C value (mmol/g) | Mw | Amount (%) |
| Example 37 | P37 | DMBA | IPDI | a-3 | — | 89 | 7.58 | 0.76 | 0.00 | 6000 | 40 |
| Example 38 | P38 | DMBA | IPDI | a-3 | — | 89 | 7.58 | 0.76 | 0.00 | 13000 | 40 |
| Example 39 | P39 | DMBA | IPDI | a-3 | — | 89 | 7.58 | 0.76 | 0.00 | 18000 | 40 |
| Example 40 | P40 | DMBA | IPDI | a-3 | — | 89 | 7.58 | 0.76 | 0.00 | 32000 | 40 |
| Example 41 | P41 | DMBA | IPDI | a-3 | — | 89 | 7.58 | 0.76 | 0.00 | 54000 | 40 |
| Example 42 | P42 | DMBA | IPDI | a-3 | — | 89 | 7.58 | 0.76 | 0.00 | 110000 | 40 |
| Example 43 | P43 | DMBA | IPDI | a-3 | GLM | 76 | 5.46 | 0.78 | 0.78 | 5000 | 40 |
| Example 44 | P44 | DMBA | IPDI | a-3 | GLM | 76 | 5.46 | 0.78 | 0.78 | 11000 | 40 |
| Example 45 | P45 | DMBA | IPDI | a-3 | GLM | 76 | 5.46 | 0.78 | 0.78 | 16000 | 40 |
| Example 46 | P46 | DMBA | IPDI | a-3 | GLM | 76 | 5.46 | 0.78 | 0.78 | 30000 | 40 |
| Example 47 | P47 | DMBA | IPDI | a-3 | GLM | 76 | 5.46 | 0.78 | 0.78 | 50000 | 40 |
| Example 48 | P48 | DMBA | IPDI | a-3 | GLM | 76 | 5.46 | 0.78 | 0.78 | 105000 | 40 |
| Example 49 | P23 | DMBA | IPDI | a-3 | GLM | 86 | 7.04 | 0.77 | 0.15 | 20000 | 97 |
| Example 50 | P24 | DMBA | IPDI | a-3 | GLM | 81 | 6.18 | 0.78 | 0.47 | 20000 | 97 |
| Example 51 | P20 | DMBA | IPDI | a-3 | GLM | 76 | 5.31 | 0.79 | 0.79 | 21000 | 97 |
| Example 52 | P25 | DMBA | IPDI | a-3 | GLM | 73 | 4.86 | 0.79 | 0.95 | 21000 | 97 |
| Example 53 | P26 | DMBA | IPDI | a-3 | GLM | 68 | 3.96 | 0.80 | 1.28 | 23000 | 97 |
| Example 54 | P3 | DMBA | IPDI | a-3 | — | 89 | 7.47 | 0.77 | 0.00 | 21000 | 40 |
| Example 55 | p20 | DMBA | IPDI | a-3 | GLM | 76 | 5.31 | 0.79 | 0.79 | 21000 | 96 |
| Example 56 | P3 | DMBA | IPDI | a-3 | — | 89 | 7.47 | 0.77 | 0.00 | 21000 | 40 |
| Example 57 | P3 | DMBA | IPDI | a-3 | — | 89 | 7.47 | 0.77 | 0.00 | 21000 | 40 |
| Example 58 | P3 | DMBA | IPDI | a-3 | — | 89 | 7.47 | 0.77 | 0.00 | 21000 | 40 |
| Example 59 | P3 | DMBA | IPDI | a-3 | — | 89 | 7.47 | 0.77 | 0.00 | 21000 | 40 |
| Example 60 | P3 | DMBA | IPDI | a-3 | — | 89 | 7.47 | 0.77 | 0.00 | 21000 | 40 |
| Example 61 | P3 | DMBA | IPDI | a-3 | — | 89 | 7.47 | 0.77 | 0.00 | 21000 | 10 |
| Example 62 | P3 | DMBA | IPDI | a-3 | — | 89 | 7.47 | 0.77 | 0.00 | 21000 | 20 |
| Example 63 | P3 | DMBA | IPDI | a-3 | — | 89 | 7.47 | 0.77 | 0.00 | 21000 | 50 |
| Example 64 | P3 | DMBA | IPDI | a-3 | — | 89 | 7.47 | 0.77 | 0.00 | 21000 | 70 |
| Example 65 | P49 | DMBA | IPDI/TMHDI = 3/2 (molar ratio) | a-3 | GLM | 41 | 2.38 | 1.36 | 0.99 | 20000 | 40 |
| Example 66 | P50 | DMBA | IPDI/TMHDI = 1/4 (molar ratio) | a-3 | GLM | 17 | 1.30 | 1.38 | 1.00 | 20000 | 40 |
| Example 67 | P51 | DMBA | IPDI | b-5 | — | 94 | 3.32 | 0.44 | 0.00 | 20000 | 40 |
| Example 68 | P52 | DMBA | IPDI | b-5 | GLM | 83 | 3.11 | 0.56 | 0.56 | 20000 | 40 |
| Comparative Example 1 | R1 | DMBA | TMHDI | HDDO | — | 0 | 0.00 | 0.77 | 0.00 | 19000 | 40 |
| Comparative Example 2 | R2 | DMBA | IPDI | HDDO | — | 51 | 2.29 | 0.80 | 0.00 | 19000 | 40 |
| Comparative Example 3 | — | *1 | IPDI | *2 | *3 | 17 | 0.76 | 0.00 | 4.52 | 5600 | 69 |

| | Particle | | | | | | | | | | |
|---|---|---|---|---|---|---|---|---|---|---|---|
| | Polymerizable compound | | | | | | | | | | |
| | With cyclic structure | | Without cyclic structure | | | | | | Evaluation result | | |
| | Kind | Amount (%) | Kind | Amount (%) | Initiator | Sensitizer | C=C value (mmol/g) | pencil hardness | Jettability | Preservation stability | Time curability | Adhesiveness |
| Example 37 | SR833 | 28.5 | SR399 | 28.5 | Y | N | 4.50 | H | B | B | A | 0 |
| Example 38 | SR833 | 28.5 | SR399 | 28.5 | Y | N | 4.50 | H | A | A | A | 0 |
| Example 39 | SR833 | 28.5 | SR399 | 28.5 | Y | N | 4.50 | H | A | A | A | 0 |
| Example 40 | SR833 | 28.5 | SR399 | 28.5 | Y | N | 4.50 | H | A | A | A | 0 |
| Example 41 | SR833 | 28.5 | SR399 | 28.5 | Y | N | 4.50 | H | A | A | A | 0 |
| Example 42 | SR833 | 28.5 | SR399 | 28.5 | Y | N | 4.50 | H | B | B | A | 0 |
| Example 43 | SR833 | 28.5 | SR399 | 28.5 | Y | N | 4.81 | 2H | B | B | A | 0 |
| Example 44 | SR833 | 28.5 | SR399 | 28.5 | Y | N | 4.81 | 2H | A | A | A | 0 |
| Example 45 | SR833 | 28.5 | SR399 | 28.5 | Y | N | 4.81 | 2H | A | A | A | 0 |

TABLE 5-continued

| | | | | | | | | | | | | |
|---|---|---|---|---|---|---|---|---|---|---|---|---|
| Example 46 | SR833 | 28.5 | SR399 | 28.5 | Y | N | 4.81 | 2H | A | A | A | 0 |
| Example 47 | SR833 | 28.5 | SR399 | 28.5 | Y | N | 4.81 | 2H | A | A | A | 0 |
| Example 48 | SR833 | 28.5 | SR399 | 28.5 | Y | N | 4.81 | 2H | B | B | A | 0 |
| Example 49 | — | 0 | — | 0 | Y | N | 0.15 | HB | A | A | A | 0 |
| Example 50 | — | 0 | — | 0 | Y | N | 0.45 | F | A | A | A | 0 |
| Example 51 | — | 0 | — | 0 | Y | N | 0.77 | F | A | A | A | 0 |
| Example 52 | — | 0 | — | 0 | Y | N | 0.92 | F | A | A | A | 0 |
| Example 53 | — | 0 | — | 0 | Y | N | 1.25 | F | A | A | A | 1 |
| Example 54 | SR833 | 28.0 | SR399 | 28.0 | Y | Y | 4.42 | 2H | A | A | A | 0 |
| Example 55 | — | 0 | — | 0 | Y | Y | 0.76 | H | A | A | A | 0 |
| Example 56 | SR833 | 57.0 | — | 0 | Y | N | 3.75 | H | A | A | A | 0 |
| Example 57 | — | 0 | SR306 | 57.0 | Y | N | 3.80 | H | A | A | A | 1 |
| Example 58 | CD406 | 57.0 | — | 0 | Y | N | 4.52 | H | A | A | A | 0 |
| Example 59 | — | 0 | A-TMPT | 57.0 | Y | N | 5.78 | H | A | A | A | 1 |
| Example 60 | — | 0 | SR399 | 57.0 | Y | N | 5.25 | H | A | A | A | 1 |
| Example 61 | SR833 | 43.5 | SR399 | 43.5 | Y | N | 6.87 | H | B | B | B | 0 |
| Example 62 | SR833 | 38.5 | SR399 | 38.5 | Y | N | 6.08 | H | A | A | A | 0 |
| Example 63 | SR833 | 23.5 | SR399 | 23.5 | Y | N | 3.71 | H | A | A | A | 0 |
| Example 64 | SR833 | 13.5 | SR399 | 13.5 | Y | N | 2.13 | F | A | A | A | 0 |
| Example 65 | SR833 | 28.5 | SR399 | 28.5 | Y | N | 4.89 | H | B | B | B | 2 |
| Example 66 | SR833 | 28.5 | SR399 | 28.5 | Y | N | 4.89 | H | B | B | B | 2 |
| Example 67 | SR833 | 28.5 | SR399 | 28.5 | Y | N | 4.50 | H | A | A | A | 0 |
| Example 68 | SR833 | 28.5 | SR399 | 28.5 | Y | N | 4.50 | 2H | A | A | A | 0 |
| Comparative Example 1 | SR833 | 28.5 | SR833 | 28.5 | Y | N | 4.50 | F | C | C | D | 5 |
| Comparative Example 2 | SR833 | 28.5 | SR833 | 28.5 | Y | N | 4.50 | F | C | C | C | 3 |
| Comparative Example 3 | — | 0 | #802 | 23.0 | Y | N | 5.40 | D | D | D | D | 5 |

—Descriptions of Tables 4 and 5 (and Tables 6 to 9 Provided Below)—

An "amount (%)" in the section of "chain polymer" means a content (mass %) of the chain polymer with respect to a solid content amount of particles, and an "amount (%)" in the section of "polymerizable compound" means a content (mass %) of a polymerizable compound with respect to a solid content amount of particles.

An "amount (%) of Unit (1) and Unit (2)" means a total amount (mass %) of Structural Units (1) and (2) with respect to a total amount of a chain polymer.

A "ring value (mmol/g)" means a millimolar number (mmol) of a cyclic structure included in Structural Units (1) and (2) in 1 g of a chain polymer.

A "acid value (mmol/g)" means a total millimolar number (mmol) of a carboxy group and a salt of a carboxy group in 1 g of a chain polymer.

In the section of "initiator" and the section of "sensitizer", "Y" means containing, and "N" means not containing.

A "C=C value (mmol/g)" in the section of "chain polymer" means a millimolar number (mmol) of an ethylenic double bond (C=C) in 1 g of the chain polymer.

A "C=C value (mmol/g)" in the section of "particles" means a millimolar number (mmol) of an ethylenic double bond (C=C) in 1 g of the solid content of the particles.

In Tables 4 and 5, the descriptions are omitted, but degrees of neutralization of the chain polymers in Examples 1 to 68 and Comparative Examples 1 and 2 were all 90%. A degree of neutralization of the chain polymer in Comparative Example 3 were 0%.

In Comparative Example 3, *1 was methoxy PEG1000, methoxy PEG2000, and polypropylene glycol (above, corresponding to the nonionic group introducing compounds), *2 was 1,12-dodecanediol (corresponding to comparative diol), and *3 was dipentaerythritol pentaacrylate.

As presented in Tables 4 and 5, with the ink of Examples 1 to 68 in which the particles in the ink included the chain polymer including Units (1) and (2), it was possible to form a cured film (image) having excellent adhesiveness to a base material (PS base material). The ink of Examples 1 to 68 was excellent in properties such as preservation stability and time curability (curing properties after the elapse of time).

In contrast, in Comparative Example 1 in which the chain polymer did not include Units (1) and (2) and Comparative Example 2 and 3 in which the chain polymer did not include Unit (2), the adhesiveness of the cured film to the base material was decreased.

In the ink of Comparative Examples 1 to 3, compared with the ink of Examples 1 to 68, preservation stability and time curability were deteriorated.

In the comparison of Examples 33 to 36 with Examples 65 to 66, it was understood that, in a case where the content of Units (1) and (2) in the chain polymer was 60 mass % or greater (Examples 33 to 36), the preservation stability of the ink and the adhesiveness of the cured film to the base material was improved.

In the comparison between Example 17 with other examples, it was understood that, compared with a case where the chain polymer in the particles does not include an aliphatic ring (Example 17), in a case where an aliphatic ring was included (other examples), the adhesiveness of the cured film to the base material was improved.

In Examples 1 to 5, it was understood that, in a case where the chain polymer in the particles includes at least one of two or more single ring structures and one or more fused ring structures (Examples 2 to 4), time curability of the ink is improved.

In Examples 27 to 31, it was understood that, in a case where an acid value of the chain polymer in the particles is 0.30 mmol/g to 1.50 mmol/g (Examples 28 to 30), the preservation stability of the ink was improved.

In Examples 37 to 48, it was understood that, a weight-average molecular weight (Mw) of the chain polymer in the particles was 10,000 to 100,000 (Examples 38 to 41 and 44 to 47), the preservation stability of the ink was improved.

In Example 49 and other examples (for example, Examples 50 to 53), it was understood that, in a case where a C=C value (amount of ethylenic double bond (C=C) included in particles) of the particles was 0.30 mmol/g or greater, the pencil hardness of the cured film was improved.

In the comparison between Example 3 and Example 20, it was understood that, compared with Example 3 in which the particles included C=C and the chain polymer did not include C=C, in Example 20 in which the particles included C=C, and the chain polymer did not include C=C, the pencil hardness of the cured film was improved.

In Examples 56 to 60, it was understood that, in a case where the polymerizable compound included one or more cyclic structures and two or more (meth)acryloyl groups in one molecule (Examples 56 and 58), the adhesiveness between the cured film and the base material was improved.

In Examples 61 to 64, it was understood that, in a case where an amount of the chain polymer with respect to the solid content of the particles was 20 mass % or greater (Examples 62 to 64), the preservation stability of the ink was improved.

Example 69

The same operation was performed as in Example 68 except for changing the kind and the amount of the polymerizable compound as presented in Table 6.

With respect to the cured film, the water resistance and the alcohol resistance were evaluated as below.

(Water Resistance of Cured Film)

A cured film was formed in the same manner as the formation of the cured film in the evaluation of the pencil hardness.

The surface of the obtained cured film was rubbed while applying a load of 2 N to the cured film by using BEMCOT M-3II (Asahi Kasei Corporation) impregnated with water and the water resistance of the cured film was evaluated according to the evaluation standard based on the number of times of rubbing until the substrate was exposed.

In the evaluation standards, A to E were in the allowable range in practical use.

—Evaluation Standards of Water Resistance of Cured Film—

A: A substrate was not exposed even in the step of 100 times of rubbing.

B: A substrate was not exposed even in the step of greater than 90 times and less than 100 times of rubbing.

C: A substrate was not exposed even in the step of greater than 80 times and less than 90 times of rubbing.

D: A substrate was not exposed even in the step of greater than 70 times and less than 80 times of rubbing.

E: A substrate was not exposed even in the step of greater than 50 times and less than 70 times of rubbing.

(Alcohol Resistance of Cured Film)

The same operation as in the water resistance of the cured film was performed except for changing BEMCOT (registered trademark) M-3II impregnated with water to BEMCOT M-3II impregnated with isopropyl alcohol, and the alcohol resistance of the cured film was evaluated by the same evaluation standards as in the water resistance of the cured film.

With respect to the ink of Examples 3, 7, 9, 67, and 68 described above, the water resistance and the alcohol resistance described above were evaluated.

The evaluation results of Example 69 were presented in Table 6.

In Table 6, a molar ratio (in Table 6, a molar ratio [(A) unit/aliphatic ring unit]) of the structural unit including Bisaryl Structure (A) with respect to the structural unit including an aliphatic ring and a content (mass %; in Table 6, an "amount (%) of aliphatic ring unit") of the structural unit including an aliphatic ring in a chain polymer was presented.

In Table 6, for comparison, evaluation results of Examples 3, 7, 9, 67, and 68 are presented.

Examples 70 and 71

The same operation was performed as in Example 68 except for changing kinds and amounts of the polymerizable compounds as presented in Table 6 and adding (ITX: 2-isopropylthioxanthone) as a sensitizer to the oil phase component. In the same manner as in Example 69, the water resistance and the alcohol resistance were evaluated on the cured film.

The amount of the sensitizer (ITX: 2-isopropylthioxanthone) was adjusted such that the content thereof with respect to the solid content of the manufactured particles was 1.0 mass %.

Results are provided in Table 6.

Example 72

The same operation as Example 71 was performed except for changing Polymer P52 used in the preparation of the water dispersion to Polymer P55.

Polymer P55 was synthesized in the same manner as in Polymer P52 except for changing the amount (mass %) of Units (1) and (2) with respect to the polymer total amount as presented in Table 6, by decreasing the total amount of the compound for forming Unit (1) (IPDI) and the compound for forming Unit (2) (b-5) and increasing the amount of the polymerizable group introducing compound (GLM). Specific used amounts of the chain polymer forming compounds in the synthesization of Polymer P55 are as presented in Table 3.

Evaluation results of Example 72 are provided in Table 6.

Examples 73 and 74

The same operation as in Example 3 was performed except for changing Polymer P3 used in the preparation of the water dispersion to Polymers P56 and P57. With respect to the cured film, the water resistance and the alcohol resistance were evaluated in the same manner as in Example 69.

Evaluation results of Examples 73 and 74 are provided in Table 6.

Polymers P56 and P57 are synthesized as below.

That is, a 30 mass % solution of each of Polymers P56 and P57 was obtained in the same manner as in the synthesization of Polymer P3 except for changing the compound (chain polymer forming compound) for forming the chain polymer as presented in Table 6.

The used amounts of the chain polymer forming compounds were amounts in which an amount (mass %) of Units (1) and (2) with respect to the polymer total amount, a ring value (mmol/g) of the polymer, an acid value (mmol/g) of the polymer, and a C=C value (mmol/g) of the polymer were values presented in Table 6 (specific used amounts of each of the chain polymer forming compounds were as presented in Table 3). The weight-average molecular weight (Mw) of each of the polymers was as presented in Table 6.

As the compound for forming Unit (1) in Polymer P56 and the compound for forming Unit (2) in Polymer P57, respectively compounds below were used.

| Name | Structure | Molecular weight | The number of cycles structures in one molecule |
|---|---|---|---|
| Compound for forming Unit (1) (Polymer P56) | | | |
| MDI | 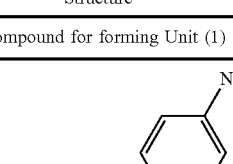 Chemical Formula: $C_{15}H_{10}N_2O_2$ Molecular Weight: 250.26 CLogP: 4.835 | 250.26 | 2 |
| Compound for forming Unit (2) (Polymer P57) | | | |
| b-6 | 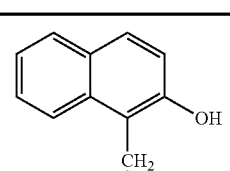 Molecular Weight: 300.35 | 300.26 | 4 |

TABLE 6

| | | Particle | | | | | | | | | | |
|---|---|---|---|---|---|---|---|---|---|---|---|---|
| | | Chain polymer | | | | | | | | | | |
| | | Chain polymer forming compound | | | | | Molar | Amount | | | | |
| | Kind | For hydro- philic group | For Unit (1) | For Unit (2) | For polyme- rizable group | Amount of Unit (1) and (2) (%) | ratio [(A unit/ alicyclic unit] | of alicyclic unit (%) | Ring value (mmol/ g) | Acid value (mmol/ g) | C = C value (mmol/ g) | Mw | Amount (%) |
| Example 3 | p3 | DMBA | IPDI | a-3 | — | 89 | 0 | 89 | 7.47 | 0.77 | 0.00 | 21000 | 40 |
| Example 73 | p56 | DMBA | MDI | a-3 | — | 93 | 0.80 | 36 | 10.10 | 0.46 | 0.00 | 20000 | 40 |
| Example 74 | p57 | DMBA | IPDI | b-6 | — | 94 | 0.80 | 48 | 8.53 | 0.41 | 0.00 | 19000 | 40 |
| Example 7 | p7 | DMBA | IPDI | b-2 | — | 93 | 0.66 | 33 | 3.39 | 0.45 | 0.00 | 25000 | 40 |
| Example 9 | p9 | DMBA | IPDI | b-4 | — | 91 | 0.66 | 46 | 4.72 | 0.62 | 0.00 | 22000 | 40 |
| Example 67 | p51 | DMBA | IPDI | b-5 | — | 94 | 0.68 | 31 | 3.32 | 0.44 | 0.00 | 20000 | 40 |
| Example 68 | p52 | DMBA | IPDI | b-5 | GLM | 83 | 0.38 | 42 | 3.11 | 0.56 | 0.56 | 20000 | 40 |
| Example 69 | p52 | DMBA | IPDI | b-5 | GLM | 83 | 0.38 | 42 | 3.11 | 0.56 | 0.56 | 20000 | 40 |
| Example 70 | p52 | DMBA | IPDI | b-5 | GLM | 83 | 0.38 | 42 | 3.11 | 0.56 | 0.56 | 20000 | 40 |
| Example 71 | p52 | DMBA | IPDI | b-5 | GLM | 83 | 0.38 | 42 | 3.11 | 0.56 | 0.56 | 20000 | 40 |
| Example 72 | p55 | DMBA | IPDI | b-5 | GLM | 78 | 0.28 | 43 | 3.02 | 0.58 | 0.81 | 20000 | 40 |

| | Particle | | | | | | | | | | | |
|---|---|---|---|---|---|---|---|---|---|---|---|---|
| | Polymerizable compound | | | | | | | | | | | |
| | With cyclic structure | | Without cyclic structure | | | | C = C value (mmol/ g) | Evaluation result | | | | | |
| | Kind | Amount (%) | Kind | Amount (%) | Initi- ator | Sensi- tizer | | pencil hard- ness | Jett- ability | Preser- vation stability | Time cura- bility | Adhes- iveness | Water resist- ance | Alcohol resist- ance |
| Example 3 | SR833 | 28.5 | SR399 | 28.5 | Y | N | 4.50 | H | A | A | A | 0 | E | E |
| Example 73 | SR833 | 28.5 | SR399 | 28.5 | Y | N | 4.50 | H | A | A | A | 0 | D | E |
| Example 74 | SR833 | 28.5 | SR399 | 28.5 | Y | N | 4.50 | H | A | A | A | 0 | D | D |
| Example 7 | SR833 | 28.5 | SR399 | 28.5 | Y | N | 4.50 | H | A | A | A | 0 | C | D |
| Example 9 | SR833 | 28.5 | SR399 | 28.5 | Y | N | 4.50 | H | A | A | A | 0 | C | C |
| Example 67 | SR833 | 28.5 | SR399 | 28.5 | Y | N | 4.50 | H | A | A | A | 0 | B | C |
| Example 68 | SR833 | 28.5 | SR399 | 28.5 | Y | N | 4.50 | 2H | A | A | A | 0 | A | B |
| Example 69 | SR833 | 57.0 | — | — | Y | N | 4.72 | 2H | A | A | A | 0 | A | B |
| Example 70 | SR833 | 28.0 | SR399 | 28.0 | Y | Y | 4.65 | 2H | A | A | A | 0 | A | B |
| Example 71 | SR833 | 56.0 | — | — | Y | Y | 4.65 | 2H | A | A | A | 0 | A | B |
| Example 72 | SR833 | 56.0 | — | — | Y | Y | 4.75 | 2H | A | A | A | 0 | A | A |

As presented in Table 6, in Examples 7, 9, and 67 to 74 in which at least one of Units (1) and (2) included Bisaryl Structure (A), compared with Example 3 in which none of Units (1) and (2) did not include Bisaryl Structure (A), the water resistance and the alcohol resistance of the cured film (image) were improved.

Examples 7, 9, and 67 to 72 in which Bisaryl Structure (A) was Bisaryl Structure (A2) (that is, bisphenol structure) were excellent in the water resistance and the alcohol resistance of the cured film (image) compared with Example 74 in which Bisaryl Structure (A) was a bisnaphthylene structure.

Example 67 (using b-5) in which the arylene group in Bisaryl Structure (A) was an arylene group substituted with a halogen atom was excellent in the water resistance and the alcohol resistance of the cured film (image), compared with Example 9 (using b-4) in which an arylene group in Bisaryl Structure (A) was an unsubstituted arylene group.

Example 7, 9, and 67 to 72 in which L (linking group) of Bisaryl Structure (A) was a sulfonyl group (—SO$_2$— group) or a dimethylmethylene group (—C(CH$_3$)$_2$— group) were excellent in the water resistance and the alcohol resistance of the cured film (image), compared with Examples 73 and 74 in which L (linking group) of Bisaryl Structure (A) was a methylene group (—CH$_2$— group).

Examples 68 to 72 in which the chain polymer includes a polymerizable group were excellent in the water resistance and the alcohol resistance of the cured film (image) compared with Examples 7, 9, 67, 73, and 74 in which the chain polymer did not include a polymerizable group.

In Examples 7, 9, and 67 to 72, in view of the water resistance and the alcohol resistance of the cured film (image), a molar ratio [(A) unit/aliphatic ring unit] (that is, molar ratio of structural unit including Bisaryl Structure (A) with respect to structural unit including aliphatic ring) in the chain polymer was preferably 0.10 to 1.00, more preferably 0.10 to 0.80, even more preferably 0.10 to 0.70, and particularly preferably 0.10 to 0.60.

Examples 75 and 76

The same operation as in Example 71 was performed except for changing Polymer P56 used in the preparation of the water dispersion to Polymer P59 and P60.

Evaluation results of Examples 75 and 76 are provided in Table 7.

Polymer P59 and P60 were synthesized in the same manner as below.

That is, a 30 mass % solution of each of Polymer P59 and P60 was obtained in the same manner as in the synthesization of Polymer P3 except for changing the chain polymer forming compound as presented in Table 7.

The used amounts of the chain polymer forming compounds were amounts in which an amount (mass %) of Units (1) and (2) with respect to the polymer total amount, a ring value (mmol/g) of the polymer, an acid value (mmol/g) of the polymer, and a C=C value (mmol/g) of the polymer were values presented in Table 7 (specific used amounts of each of the chain polymer forming compounds were as presented in Table 3). The weight-average molecular weight (Mw) of each of the polymers was as presented in Table 7.

BisAGlyDA and BisAGlyDMA as the compound for forming Unit (2) used in the synthesization of Polymers P59 and P60 and DMPA as the hydrophilic group compound were respectively compounds below.

Each of BisAGlyDA and BisAGlyDMA was corresponding to the compound for forming Unit (2), and functioned as a polymerizable group introducing compound since BisAGlyDA and BisAGlyDMA had a polymerizable group.

| Name | Structure | Molecular weight | The number of cycles structures in one molecule |
|---|---|---|---|
| Compound for forming Unit (2) | | | |
| BisAGlyDA | 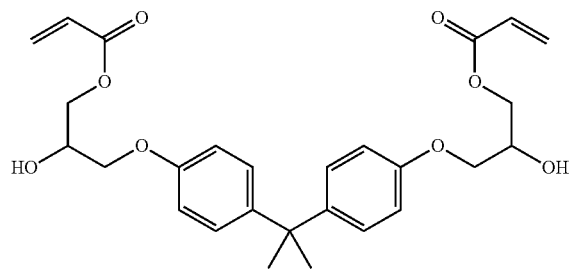 [SMILES: C=CC(=O)OCC(O)COc1ccc(C(C)(C)c2ccc(OCC(O)COC(=O)C=C)cc2)cc1] | 484.55 | 2 |

Chemical Formula: C$_{27}$H$_{32}$O$_8$
Molecular Weight: 484.55

-continued

| Name | Structure | Molecular weight | The number of cycles structures in one molecule |
|---|---|---|---|
| BisAGlyDMA | Chemical Formula: $C_{29}H_{36}O_8$<br>Molecular Weight: 512.60 | 512.60 | 2 |
| Hyrophilic group introducing compound | | | |
| DMPA | Chemical Formula: $C_5H_{10}O_4$<br>Molecular Weight: 134.13 | 134.13 | 0 |

TABLE 7

| | Particle | | | | | | | | | | | | |
|---|---|---|---|---|---|---|---|---|---|---|---|---|---|
| | Chain polymer | | | | | | | | | | | | Polymerizable compound |
| | Chain polymer forming compound | | | | Amount of Unit (1) and (2) (%) | Molar ratio [(A unit/ alicyclic unit] | Amount of alicyclic unit (%) | Ring value (mmol/g) | Acid value (mmol/g) | C=C value (mmol/g) | Mw | Amount (%) | With cyclic structure Kind |
| | Kind | For hydrophilic group | For Unit (1) | For Unit (2) | | | | | | | | | |
| Example 75 | p59 | DmpA | HMDI | a-3/BisAGlyDA | 90 | 0.32 | 56 | 6.22 | 0.71 | 1.42 | 10000 | 40 | SR833 |
| Example 76 | P60 | DMPA | HMDI | a-3/BisAGlyDMA | 91 | 0.32 | 55 | 6.10 | 0.70 | 1.40 | 10000 | 40 | SR833 |

| | Particle | | | | | | | Evaluation result | | | | | |
|---|---|---|---|---|---|---|---|---|---|---|---|---|---|
| | Polymerizable compound | | | | | | | | | | | | |
| | With cyclic structure Amount (%) | Without cyclic structure Kind | Amount (%) | Initiator | Sensitizer | C=C value (mmol/g) | pencil hardness | Jettability | Preservation stability | Time curability | Adhesiveness | Water resistance | Alcohol resistance |
| Example 75 | 56.0 | — | — | Y | Y | 4.99 | 2H | A | A | A | 0 | A | A |
| Example 76 | 56.0 | — | — | Y | Y | 4.99 | 2H | A | A | A | 0 | A | A |

As presented in 7, in the same manner as Example 71, each of Examples 75 and 76 obtained excellent results as in Example 71 with respect to the water resistance and the alcohol resistance of the cured film (image), since at least one of Units (1) and (2) includes Bisaryl Structure (A).

In the same manner as in Example 71 including a structural unit (structural unit derived from GLM) having a polymerizable group, each of Examples 75 and 76 obtained excellent results as in Example 71 with respect to the pencil hardness of the cured film (image), since Unit (2) had a polymerizable group.

Example 101

The ink of Example 101 was manufactured in the same manner except for changing SR833S and SR399E to Trixene™ BI7982 (thermopolymerizable monomer; block isocyanate; Baxenden Chemicals Ltd.) obtained by distilling propylene glycol monomethyl ether under reduced pressure in the conditions of 60° C. and 2.67 kPa (20 torr) and not using IRGACURE 819 in "preparation of water dispersion" and "preparation of ink" of Example 1.

Here, the mass of Trixene™ BI7982 obtained by distilling propylene glycol monomethyl ether under reduced pressure in the conditions of 60° C. and 2.67 kPa (20 torr) was the same mass as the total mass of SR833S and SR399E in Example 1.

Hereinafter, "Trixene™ BI7982 obtained by distilling propylene glycol monomethyl ether under reduced pressure in the conditions of 60° C. and 2.67 kPa (20 torr)" is also referred to as "BI7982".

Example 101 was evaluated in the same manner as the evaluation of Example 1 by using the ink of Example 101 except for the followings.

In the evaluation of Example 101, the coating film after drying was cured by changing the operation of "irradiating the coating film after drying with UV" in the evaluation of Example 1 to an operation of heating the coating film after drying by an oven at 160° C. for five minutes.

Results are provided in Table 8.

Example 102

The ink of Example 102 was manufactured in the same manner except for changing SR833S and SR399E to EPICLON™ 840 (thermopolymerizable oligomer having epoxy group, DIC Corporation; hereinafter also referred to as "EP840") and changing IRGACURE 819 to 2-phenylimidazole (thermal curing accelerator) in the same mass in "preparation of water dispersion" and "preparation of ink" of Example 1.

Here, the mass of EP840 was the same mass as the total mass of SR833S and SR399E in Example 1.

The same evaluation as Example 101 was performed by using the ink of Example 102.

Results are provided in Table 8.

Examples 103 to 105

The ink was manufactured in the same manner as in Example 101 except for changing the kind of chain polymer as presented in Table 8, and evaluation was performed in the same manner as in Example 101 by using the obtained ink.

Results are provided in Table 8.

Comparative Example 101

The ink of Comparative Example 1 was manufactured in the same manner except for changing SR833S and SR399E to BI7982 and not using IRGACURE 819 in "preparation of water dispersion" and "preparation of ink" of Comparative Example 1.

Here, the mass of BI7982 was the same mass as the total mass of SR833S and SR399E in Comparative Example 1.

The same evaluation of Example 101 was performed by using the ink of Comparative Example 101.

Results are provided in Table 8.

TABLE 8

| | | | | Particle | | | | | | |
|---|---|---|---|---|---|---|---|---|---|---|
| | | | | Chain polymer | | | | | | |
| | | | Chain polymer forming compound | | | | | | | |
| | Kind | For hydrophilic group | For Unit (1) and/or Comparative NCO | For Unit (2) and/or Comparative diol | For polymerizable group | Amount of Unit (1) and (2) (%) | Ring value (mmol/g) | Acid value (mmol/g) | Mw |
|---|---|---|---|---|---|---|---|---|---|
| Example 101 | P1 | DMBA | IPDI | a-1 | — | 88 | 4.56 | 0.84 | 18000 |
| Example 102 | P1 | DMBA | IPDI | a-1 | — | 88 | 4.56 | 0.84 | 18000 |
| Example 103 | P53 | DMBA | IPDI/TMHDI = 2/3 (molar ratio) | a-1 | — | 52 | 2.97 | 0.86 | 18000 |
| Example 104 | P54 | DMBA | IPDI/TMHDI = 1/9 (molar ratio) | a-1 | — | 33 | 2.14 | 0.87 | 18000 |
| Example 105 | P51 | DMBA | IPDI | b-5 | — | 94 | 3.32 | 0.44 | 20000 |
| Comparative Example 101 | R1 | DMBA | TMHDI | HDDO | — | 0 | 0.00 | 0.77 | 19000 |

TABLE 8-continued

| | Particle | | | | Evaluation result | | | | |
|---|---|---|---|---|---|---|---|---|---|
| | Chain polymer | Thermo-polymerizable compound | | Thermal curing | pencil | | Preservation | Time | Adhesiveness |
| | Amount (%) | Kind | Amount (%) | accelerator | hardness | Jettability | stability | curability | |
| Example 101 | 41.5 | BI7982 | 58.5 | N | H | A | A | A | 0 |
| Example 102 | 40.0 | EP840 | 57.0 | Y | H | A | A | A | 0 |
| Example 103 | 41.5 | BI7982 | 58.5 | N | H | B | B | B | 1 |
| Example 104 | 41.5 | BI7982 | 58.5 | N | H | B | B | B | 2 |
| Example 105 | 41.5 | BI7982 | 58.5 | N | H | A | A | A | 0 |
| Comparative Example 101 | 41.5 | BI7982 | 58.5 | N | F | C | C | D | 5 |

As presented in Table 8, according to the inks of Examples 101 to 105 in which the particles in the ink included the chain polymer including Units (1) and (2), it was possible to form a cured film (image) excellent in the adhesiveness to the base material (PS base material). The ink of Examples 101 to 105 was excellent in properties such as preservation stability and time curability (curing properties after the elapse of time).

In contrast, in Comparative Example 101 in which the chain polymer did not include Units (1) and (2), the adhesiveness of the cured film to the base material was decreased. The ink of Comparative Example 101 was deteriorated in the preservation stability compared with the ink of Examples 101 and 102.

As the results of Examples 101 to 105, it was understood that, in a case where the content of Units (1) and (2) in the chain polymer was 60 mass % or greater (Examples 101, 102, and 105), the adhesiveness of cured film to the base material, the preservation stability of the ink, and the time curability of the ink were improved.

Example 106

The same operation as Example 102 was performed except for changing the kind of the chain polymer as presented in Table 9.

With respect to the cured film, the evaluation of the water resistance and the alcohol resistance was performed in the same manner as in Example 69.

With respect to the ink of Example 105 described above, the evaluation of the water resistance and the alcohol resistance was performed in the same manner.

Evaluation results of Example 106 are provided in Table 9.

In Table 9, a molar ratio (in Table 9, molar ratio [(A) unit/aliphatic ring unit] of the structural unit including Bisaryl Structure (A) with respect to the structural unit including an aliphatic ring and the content (mass %; in Table 9, an "amount (%)" of an aliphatic ring unit") of the structural unit including an aliphatic ring in the chain polymer are presented.

Evaluation results of Example 105 are provided in Table 9.

Example 107

The same operation as Example 105 was performed except for changing Polymer P51 used in the preparation of the water dispersion to Polymer P58.

Polymer P58 was synthesized by changing the balance between the amount of the hydrophilic group introducing compound and the total amount of the compound for forming Unit (1) and the compound for forming Unit (2) in the synthesization of Polymer P51.

Results are provided in Table 9.

Examples 108, 110, and 111

The same operation as Example 105 was performed except for changing Polymer P51 used in the preparation of the water dispersion to the polymer presented in Table 9.

Results are provided in Table 9.

Example 109

The same operation as Example 106 was performed except for changing Polymer P51 used in the preparation of the water dispersion to the polymer presented in Table 9.

Results are provided in Table 9.

TABLE 9

| | Particle | | | | | | | | | | | |
|---|---|---|---|---|---|---|---|---|---|---|---|---|
| | Chain polymer | | | | | | | | | | | |
| | | Chain polymer forming compound | | | | Amount of Unit (1) and (2) (%) | Molar ratio [(A) unit/ alicyclic unit] | Amount of alicyclic unit (%) | Ring value (mmol/g) | Acid value (mmol/g) | Mw |
| | Kind | For hydrophilic group | For Unit (1) | For Unit (2) | For polymerizable group | | | | | | |
| Example 108 | p3 | DMBA | IPDI | a-3 | — | 89 | 0 | 89 | 7.47 | 0.77 | 21000 |
| Example 109 | p3 | DMBA | IPDI | a-3 | — | 89 | 0 | 89 | 7.47 | 0.77 | 21000 |

TABLE 9-continued

| | | | | | | | | | | | |
|---|---|---|---|---|---|---|---|---|---|---|---|
| Example 110 | p7 | DMBA | IPDI | b-2 | — | 93 | 0.66 | 33 | 3.39 | 0.45 | 25000 |
| Example 111 | p9 | DMBA | IPDI | b-4 | — | 91 | 0.66 | 46 | 4.72 | 0.62 | 22000 |
| Example105 | P51 | DMBA | IPDI | b-5 | — | 94 | 0.68 | 31 | 3.32 | 0.44 | 20000 |
| Example 106 | P51 | DMBA | IPDI | b-5 | — | 94 | 0.68 | 31 | 3.32 | 0.44 | 20000 |
| Example 107 | P58 | DMBA | IPDI | b-5 | — | 91 | 0.60 | 50 | 3.26 | 0.59 | 20000 |

| | Chain polymer | Thermo-polymerizable compound | | Thermal curing accelerator | Evaluation result | | | | | | |
|---|---|---|---|---|---|---|---|---|---|---|---|
| | Amount (%) | Kind | Amount (%) | | pencil hardness | Jett-ability | Preservation stability | Time curability | Adhesiveness | Water resistance | Alcohol resistance |
| Example 108 | 41.5 | BI7982 | 58.5 | N | H | A | A | A | 0 | E | E |
| Example 109 | 40.0 | EP840 | 57.0 | Y | H | A | A | A | 0 | E | E |
| Example 110 | 41.5 | BI7982 | 58.5 | N | H | A | A | A | 0 | C | D |
| Example 111 | 41.5 | BI7982 | 58.5 | N | H | A | A | A | 0 | C | C |
| Example 105 | 41.5 | BI7982 | 58.5 | N | H | A | A | A | 0 | B | C |
| Example 106 | 40.0 | EP840 | 57.0 | Y | H | A | A | A | 0 | B | C |
| Example 107 | 41.5 | BI7982 | 58.5 | N | H | A | A | A | 0 | B | B |

As presented in Table 9, in Examples 105 to 107, 110, and 111 in which at least one of Units (1) and (2) included Bisaryl Structure (A), compared with Examples 108 and 109 in which none of Units (1) and (2) did not include Bisaryl Structure (A), the water resistance and the alcohol resistance of the cured film (image) were improved.

Disclosures in JP2016-169840 filed on Aug. 31, 2016 and JP2016-252732 filed on Dec. 27, 2016 are incorporated to the present specification by reference herein in its entirety.

All documents, patent applications and technical specifications recited in the present specification are incorporated herein by reference in the present specification to the same extent as if each individual publication, patent applications and technical standard was specifically and individually indicated to be incorporated by reference.

What is claimed is:

1. An ink jet ink composition comprising:
water; and
particles including a chain polymer including Structural Unit (1), Structural Unit (2), and a hydrophilic group and a polymerizable group,
wherein the particles include an ethylenic double bond, and
wherein, in a case where a millimolar number of the ethylenic double bond in 1 g of a solid content of the particles is defined as the C=C value of the particles, a C=C value of the particles is 0.30 mmol/g or greater,

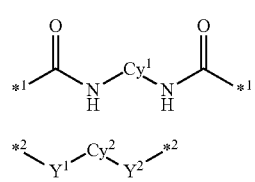

in Structural Units (1) and (2), $Cy^1$ and $Cy^2$ each independently represent a divalent organic group having 3 to 30 carbon atoms including a cyclic structure, $Y^1$ and $Y^2$ each independently represent an oxygen atom, a sulfur atom, or a $-NR^1-$ group, $R^1$ represents a hydrogen atom or a hydrocarbon group having 1 to 10 carbon atoms,

*1 in Structural Unit (1) represents a bonding position to a structural unit other than Structural Unit (1), and *2 in Structural Unit (2) represents a bonding position to a structural unit other than Structural Unit (2).

2. The ink jet ink composition according to claim 1, wherein a total content of Structural Units (1) and (2) is 60 mass % or greater with respect to a total amount of the chain polymer.

3. The ink jet ink composition according to claim 1, wherein, in a case where a total millimolar number of the cyclic structure included in Structural Units (1) and (2) in 1 g of the chain polymer is defined as a ring value of the chain polymer, the ring value of the chain polymer is 3.00 mmol/g or greater.

4. The ink jet ink composition according to claim 1, wherein at least one of $Cy^1$ or $Cy^2$ includes an aliphatic ring as the cyclic structure.

5. The ink jet ink composition according to claim 1, wherein at least one of $Cy^1$ or $Cy^2$ includes two or more cyclic structures.

6. The ink jet ink composition according to claim 1, wherein at least one of $Cy^1$ or $Cy^2$ includes Bisaryl Structure (A),

*—$Ar^1$-L-$Ar^2$—*      (A)

in Bisaryl Structure (A), $Ar^1$ and $Ar^2$ each independently represent an arylene group, L represents a single bond or a divalent linking group, and two *'s each represent a bonding position.

7. The ink jet ink composition according to claim 6, wherein at least one of $Ar^1$ or $Ar^2$ is an arylene group substituted with at least one halogen atom.

8. The ink jet ink composition according to claim 6, wherein any one of $Cy^1$ or $Cy^2$ includes an aliphatic ring, and the other of $Cy^1$ or $Cy^2$ includes Bisaryl Structure (A).

9. The ink jet ink composition according to claim 8, wherein, in the chain polymer, a molar ratio of the structural unit including Bisaryl Structure (A) to the structural unit including an aliphatic ring is 0.10 to 1.00.

10. The ink jet ink composition according to claim 1, wherein the hydrophilic group is at least one selected from the group consisting of a carboxy group and a salt of a carboxy group.

11. The ink jet ink composition according to claim 10, wherein, in a case where a total millimolar number of the carboxy group and the salt of a carboxy group in 1 g of the chain polymer is defined as an acid value of the chain polymer, the acid value of the chain polymer is 0.30 mmol/g to 1.50 mmol/g.

12. The ink jet ink composition according to claim 1, wherein a weight-average molecular weight of the chain polymer is 10,000 to 100,000.

13. The ink jet ink composition according to claim 1, wherein the polymerizable group of the particles is a photopolymerizable group, and wherein the particles include a photopolymerizable compound as a compound having the photopolymerizable group.

14. The ink jet ink composition according to claim 13, wherein at least one kind of the photopolymerizable compound includes one or more cyclic structures and two or more (meth)acryloyl groups in a molecule.

15. The ink jet ink composition according to claim 13, wherein the chain polymer has a photopolymerizable group.

16. The ink jet ink composition according to claim 1, wherein a solid content amount of the particles is 50 mass % or greater with respect to a solid content amount of the ink jet ink composition.

17. The ink jet ink composition according to claim 1, wherein a content of the chain polymer is 20 mass % or greater with respect to a solid content amount of the particles.

18. An image forming method comprising:
applying the ink jet ink composition according to claim 1 to a plastic base material by an ink jet method; and
curing the ink jet ink composition applied to the plastic base material.

19. An ink jet ink composition comprising:
water; and
particles including a chain polymer including Structural Unit (1), Structural Unit (2), and a hydrophilic group and a polymerizable group,
wherein the polymerizable group of the particles is a thermopolymerizable group,
wherein the thermopolymerizable group is at least one selected from the group consisting of an oxetanyl group, an aziridinyl group, an azetidinyl group, a ketone group, an aldehyde group, and a blocked isocyanate group, and
wherein the particles include a thermopolymerizable compound as a compound including the thermopolymerizable group,

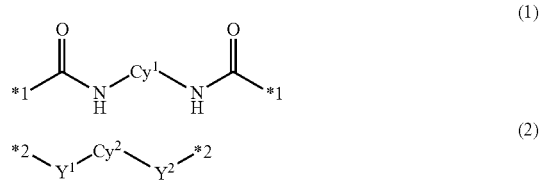

in Structural Units (1) and (2), Cy1 and Cy2 each independently represent a divalent organic group having 3 to 30 carbon atoms including a cyclic structure, Y1 and Y2 each independently represent an oxygen atom, a sulfur atom, or a —NR1- group, R1 represents a hydrogen atom or a hydrocarbon group having 1 to 10 carbon atoms,

*1 in Structural Unit (1) represents a bonding position to a structural unit other than Structural Unit (1), and *2 in Structural Unit (2) represents a bonding position to a structural unit other than Structural Unit (2).

20. An ink jet ink composition comprising:
water; and
particles including a chain polymer including Structural Unit (1), Structural Unit (2), and a hydrophilic group and a polymerizable group,
wherein a total content of Structural Units (1) and (2) is 60 mass % or greater with respect to a total amount of the chain polymer, and
wherein the hydrophilic group is at least one selected from the group consisting of a carboxy group and a salt of a carboxy group,

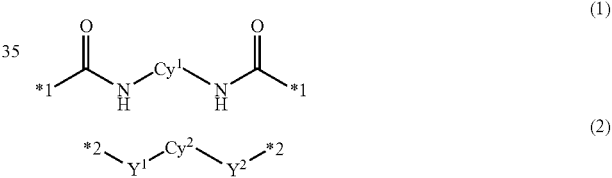

in Structural Units (1) and (2), Cy1 and Cy2 each independently represent a divalent organic group having 3 to 30 carbon atoms including a cyclic structure, Y1 and Y2 each independently represent an oxygen atom, a sulfur atom, or a —NR1- group, R1 represents a hydrogen atom or a hydrocarbon group having 1 to 10 carbon atoms,

*1 in Structural Unit (1) represents a bonding position to a structural unit other than Structural Unit (1), and *2 in Structural Unit (2) represents a bonding position to a structural unit other than Structural Unit (2).

* * * * *